United States Patent [19]

Newkirk et al.

[11] Patent Number: 5,420,085

[45] Date of Patent: May 30, 1995

[54] METHODS OF MAKING COMPOSITE ALUMINUM NITRIDE CERAMIC ARTICLES HAVING EMBEDDED FILLER

[75] Inventors: Marc S. Newkirk, Newark, Del.;
Harry R. Zwicker, Glen Mills, Pa.;
Andrew W. Urquhart, Newark, Del.;
Harold D. Lesher, Wilmington, Del.;
Terry D. Claar, Newark, Del.;
Michael K. Aghajanian, Bel Air, Md.;
John P. Biel, Jr., Newark, Del.

[73] Assignee: Lanxide Technology Company, LP, Newark, Del.

[21] Appl. No.: 7,387

[22] Filed: Jan. 21, 1993

Related U.S. Application Data

[60] Continuation of Ser. No. 811,895, Dec. 20, 1991, abandoned, which is a continuation of Ser. No. 443,733, Nov. 30, 1989, abandoned, which is a continuation-in-part of Ser. No. 415,180, Sep. 29, 1989, abandoned, which is a division of Ser. No. 265,835, Nov. 1, 1988, Pat. No. 4,916,113, which is a continuation of Ser. No. 819,397, Jan. 17, 1986, Pat. No. 4,851,375, which is a continuation-in-part of Ser. No. 697,876, Feb. 4, 1985, abandoned.

[51] Int. Cl.$^6$ .................. C04B 35/65; C04B 35/58
[52] U.S. Cl. .................. 501/98; 501/89; 501/92
[58] Field of Search .................. 501/96, 98, 89, 92

[56] References Cited

U.S. PATENT DOCUMENTS 1,362,237 12/1920 Ros .................. 423/618
2,741,822 4/1956 Udy .................. 25/157

(List continued on next page.)

FOREIGN PATENT DOCUMENTS 0116809 8/1984 European Pat. Off. .
0155831 9/1985 European Pat. Off. .
0169067 1/1986 European Pat. Off. .

OTHER PUBLICATIONS

"Oxidation of Molten Aluminum Alloys, Reaction with Refractories"–M. Drouzy and M. Richard–Mar., 1974 Fonderie, France No. 332 pp. 121–128.
"Refractories for Aluminum Alloy Melting Furnaces'-'–B. Clavaud and V. Jost–Sep., 1980–Lillian Brassinga (from French) Jan., 1985.

*Primary Examiner*—Karl Group
*Attorney, Agent, or Firm*—Mark G. Mortenson; Jeffrey R. Ramberg

[57] ABSTRACT

A method of making self-supporting ceramic composite structures having filler embedded therein includes infiltrating a permeable mass of filler with polycrystalline material comprising an oxidation reaction product obtained by oxidation of a parent metal such as aluminum and optionally, containing therein non-oxidized constituents of the parent metal. The structure is formed by placing a parent metal adjacent to a permeable filler and heating the assembly to melt the parent metal and provide a molten body of parent metal which is contacted with a suitable vapor-phase oxidant. Within a certain temperature region and optionally, aided by one or more dopants in or on the parent metal, molten parent metal will migrate through previously formed oxidation reaction product into contact with the oxidant, causing the oxidation reaction product to grow so as to embed the adjacent filler and provide the composite structure. In a preferred embodiment, a parent metal comprising aluminum is oxidized by a vapor-phase oxidant comprising nitrogen to form a ceramic matrix comprising an aluminum nitride oxidation reaction product. In a particularly preferred embodiment, one or more protective coatings are applied to the filler prior to formation of the aluminum nitride oxidation reaction product matrix.

19 Claims, 48 Drawing Sheets

U.S. PATENT DOCUMENTS

| | | | |
|---|---|---|---|
| 3,108,887 | 10/1963 | Lenie | 501/99 X |
| 3,255,027 | 6/1966 | Talsma | 106/65 |
| 3,262,763 | 7/1966 | Bechtold | 501/98 X |
| 3,296,002 | 1/1967 | Hare | 106/40 |
| 3,298,842 | 1/1967 | Seufert | 106/65 |
| 3,408,312 | 10/1968 | Richards et al. | 501/98 X |
| 3,419,404 | 12/1968 | Mao | 106/65 |
| 3,421,863 | 1/1969 | Bawa et al. | 29/182.5 |
| 3,437,468 | 4/1969 | Seufert | 51/298 |
| 3,473,938 | 10/1969 | Oberlin | 106/57 |
| 3,473,987 | 10/1969 | Sowards | 156/89 |
| 3,514,271 | 5/1970 | Yates | 501/96 X |
| 3,551,101 | 12/1970 | Matsuo | 423/412 |
| 3,649,310 | 4/1972 | Yates | 501/92 X |
| 3,669,695 | 6/1972 | Iler | 501/96 X |
| 3,789,096 | 1/1974 | Church | 264/60 |
| 3,864,154 | 2/1975 | Gazza et al. | 29/123 B |
| 3,973,977 | 8/1976 | Wilson | 106/62 |
| 4,354,991 | 10/1982 | Suzuki | 501/89 X |
| 4,478,785 | 10/1984 | Huseby | 501/96 X |
| 4,591,537 | 5/1986 | Aldinger | 501/96 X |
| 4,600,481 | 7/1986 | Sare et al. | 501/98 X |
| 4,713,360 | 12/1987 | Newkirk et al. | 501/128 X |
| 4,851,375 | 7/1989 | Newkirk et al. | 501/88 |
| 4,853,352 | 8/1989 | Newkirk et al. | 501/127 X |
| 4,882,306 | 11/1989 | Kennedy et al. | 501/87 |
| 4,916,113 | 4/1990 | Newkirk et al. | 501/128 X |
| 5,017,526 | 5/1991 | Newkirk et al. | 501/128 X |
| 5,017,533 | 5/1991 | Newkirk et al. | 501/127 |
| 5,019,541 | 5/1991 | Kantner et al. | 501/128 X |
| 5,051,382 | 9/1991 | Newkirk et al. | 501/98 X |
| 5,106,789 | 4/1992 | Lesher et al. | 501/98 X |
| 5,202,059 | 4/1993 | Kennedy | 252/389.31 |

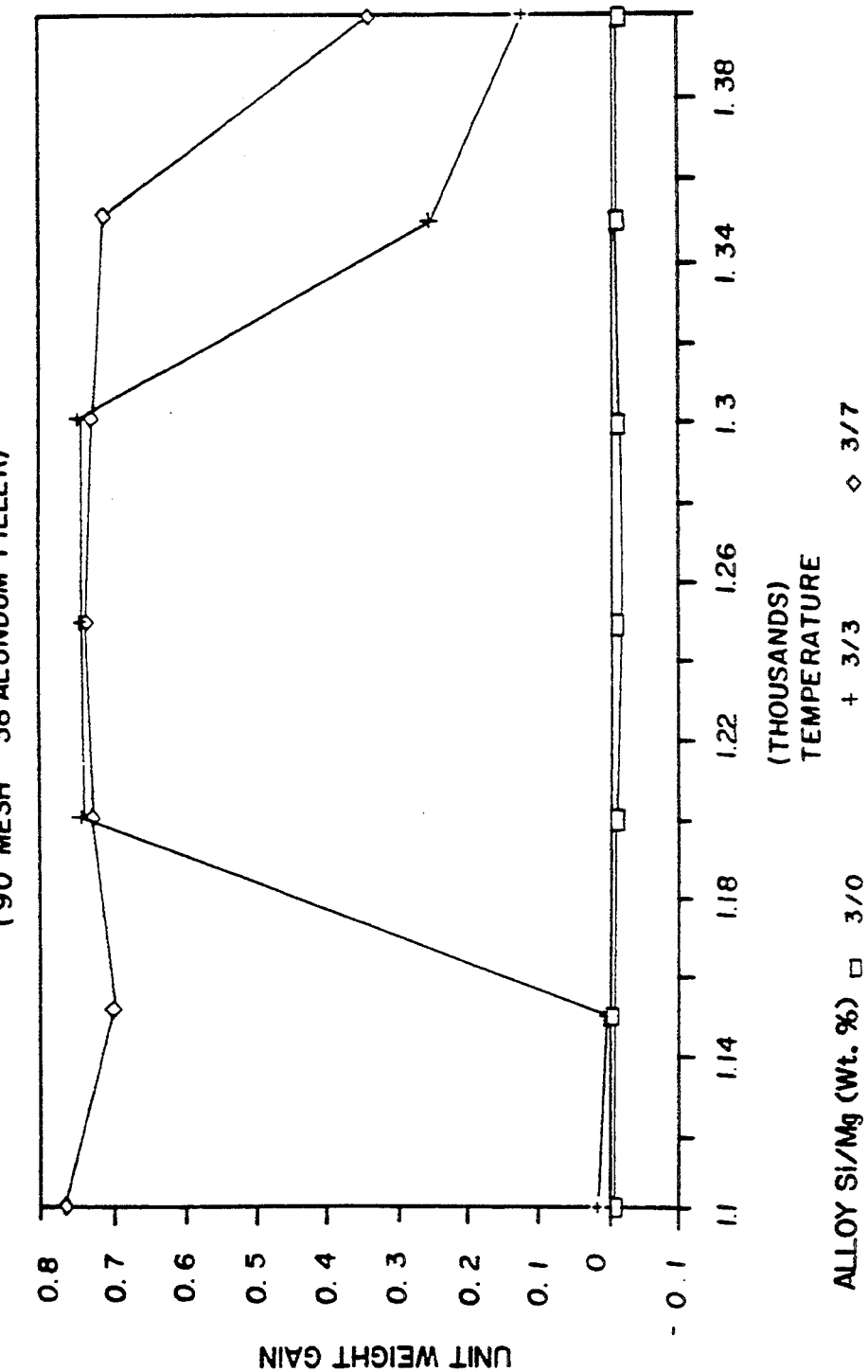

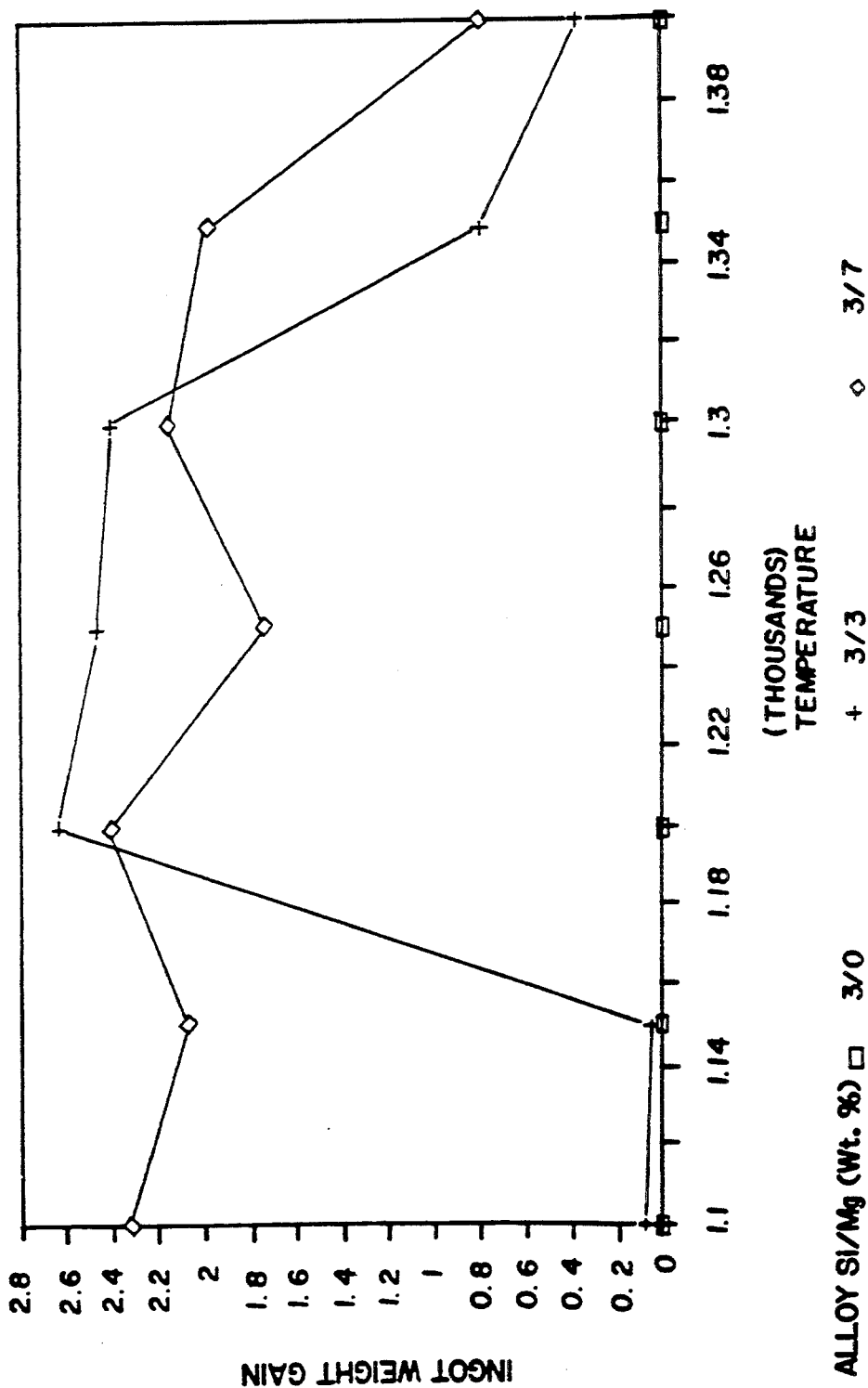

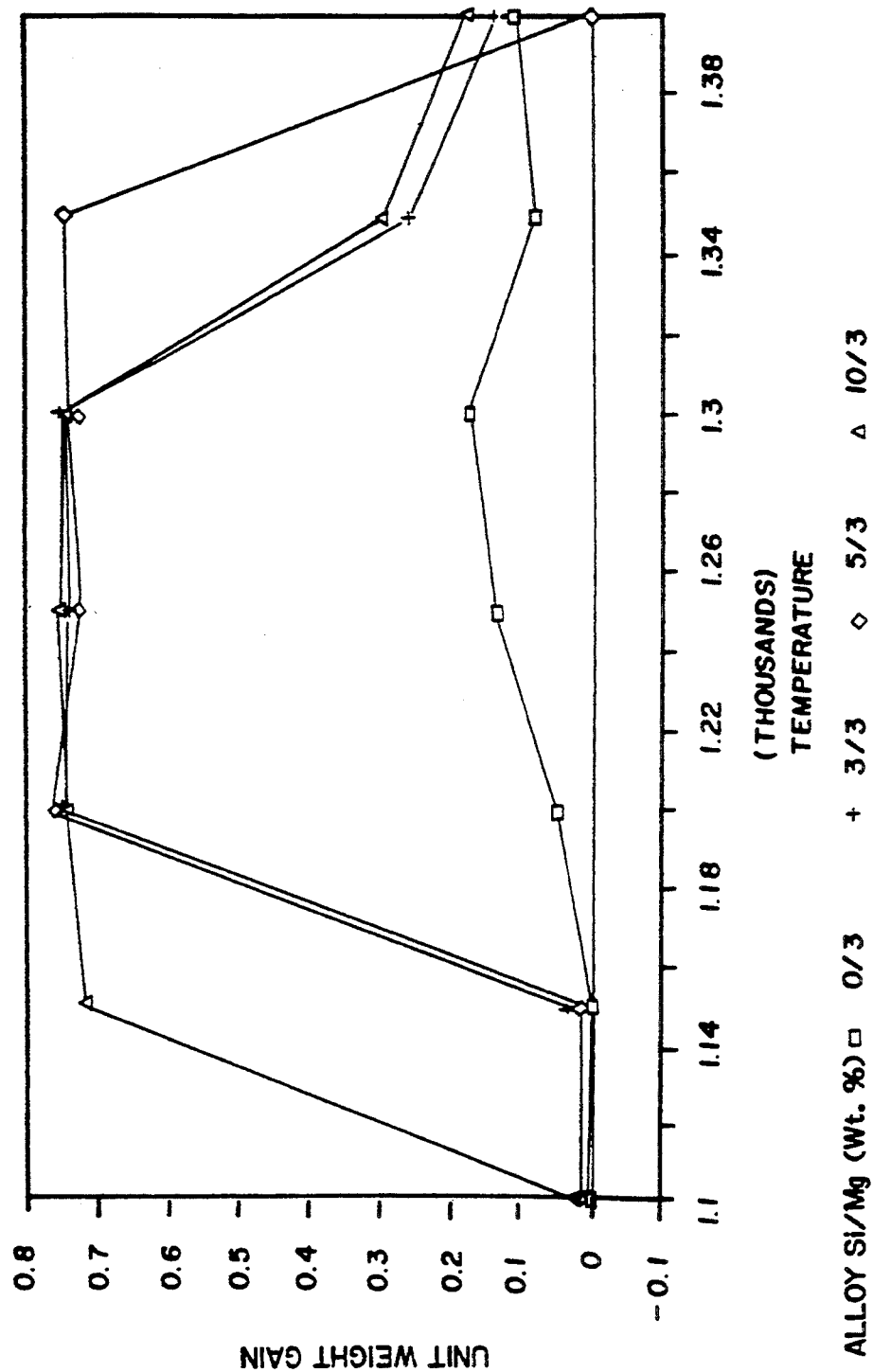

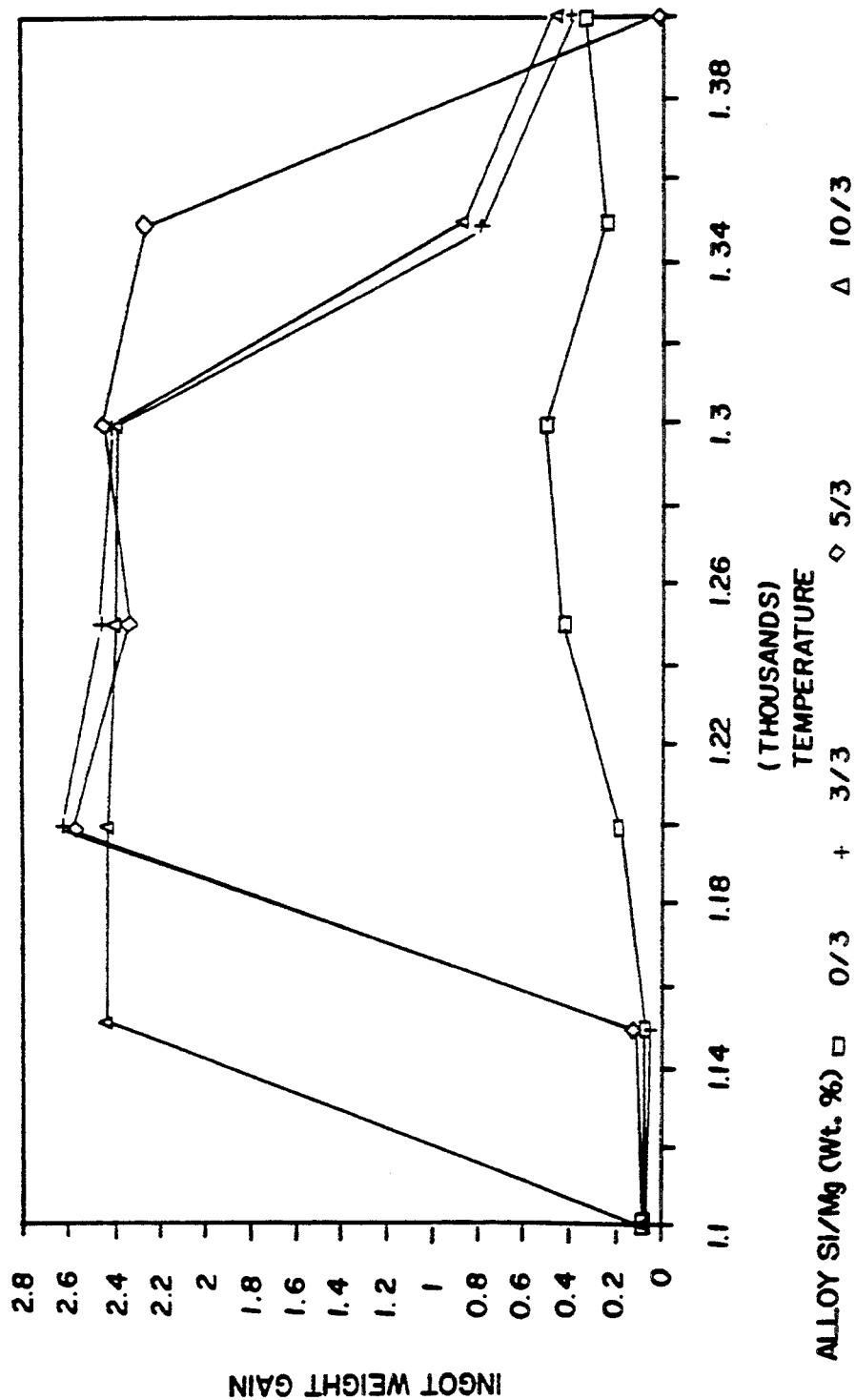

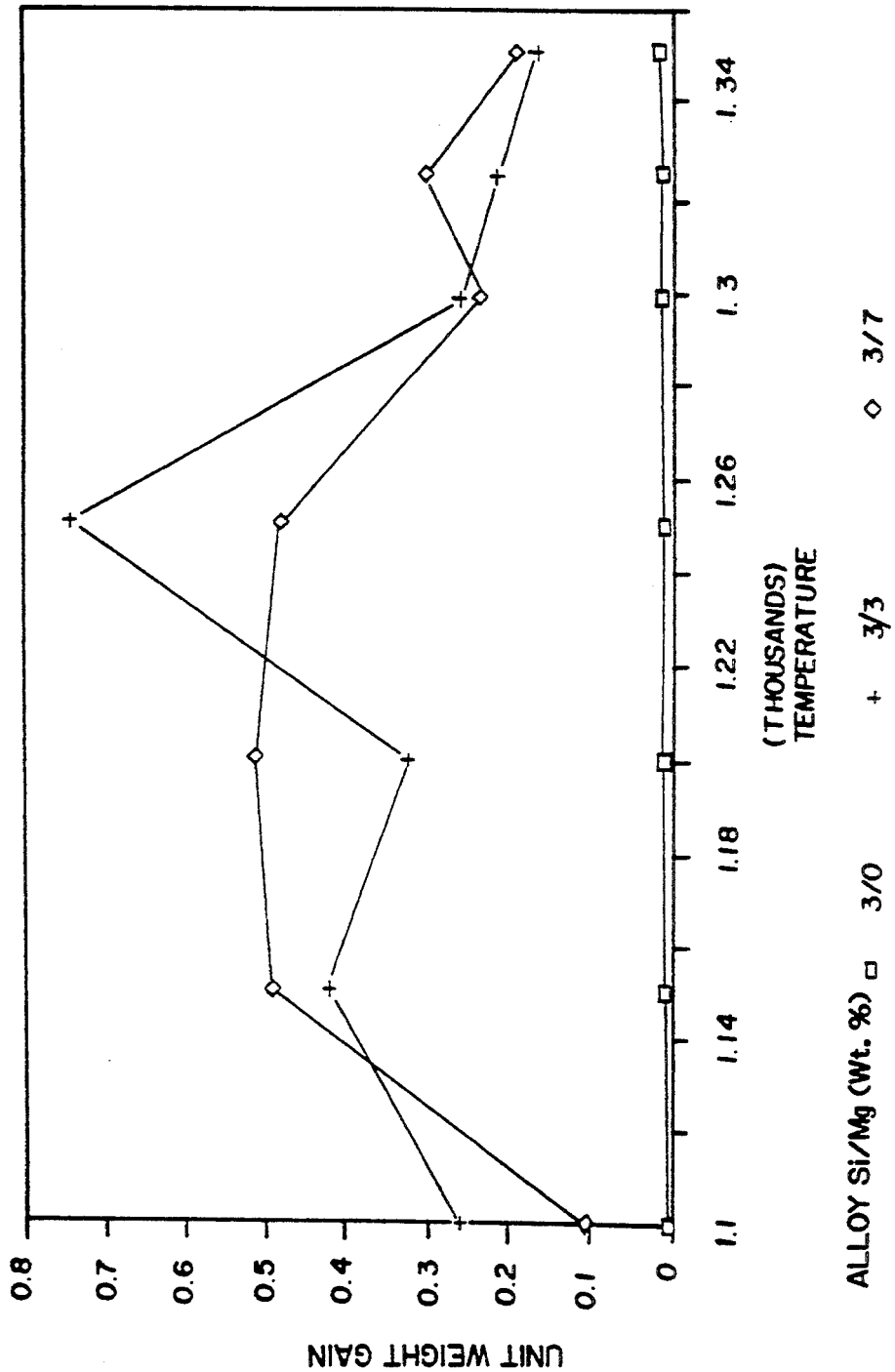

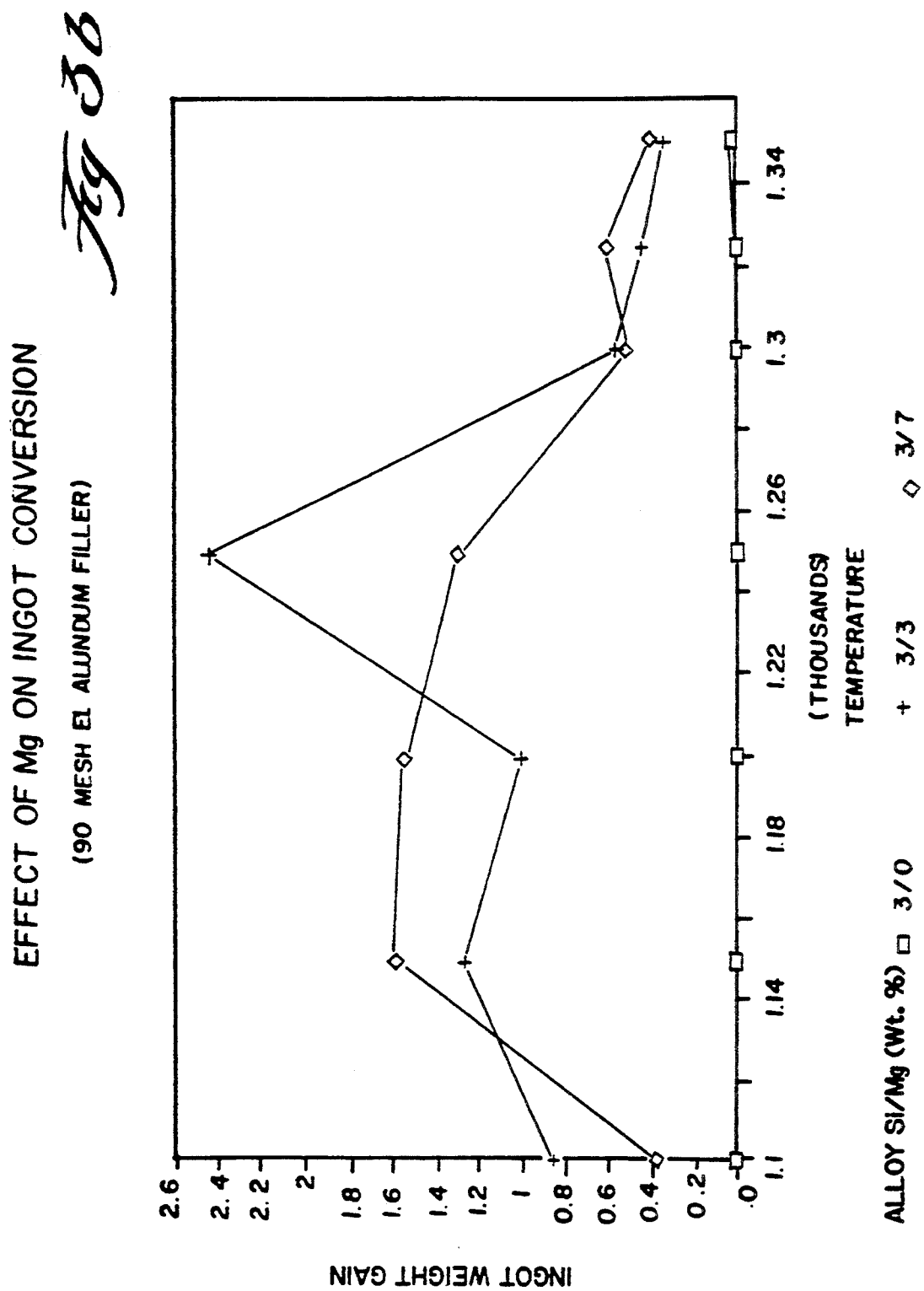

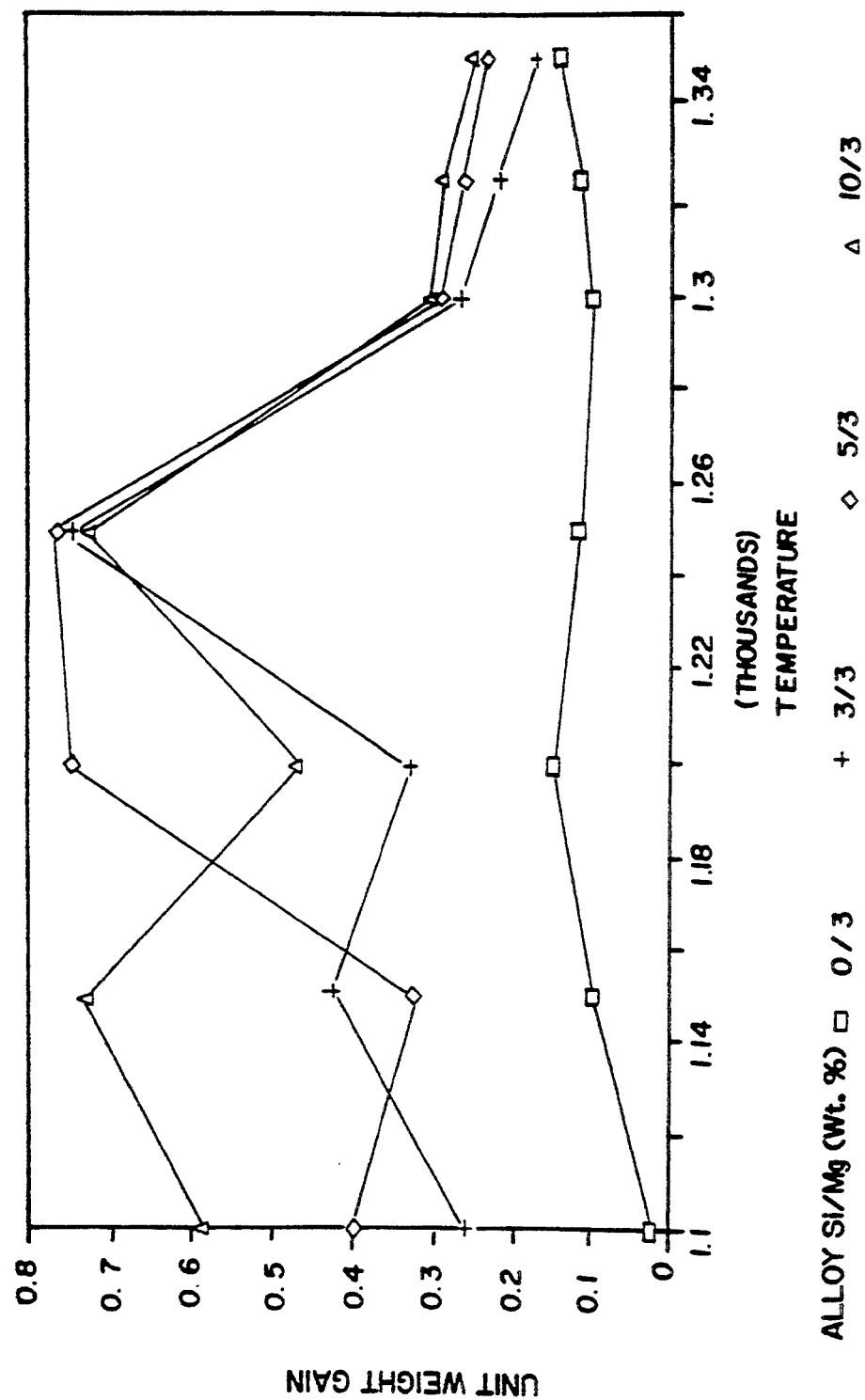

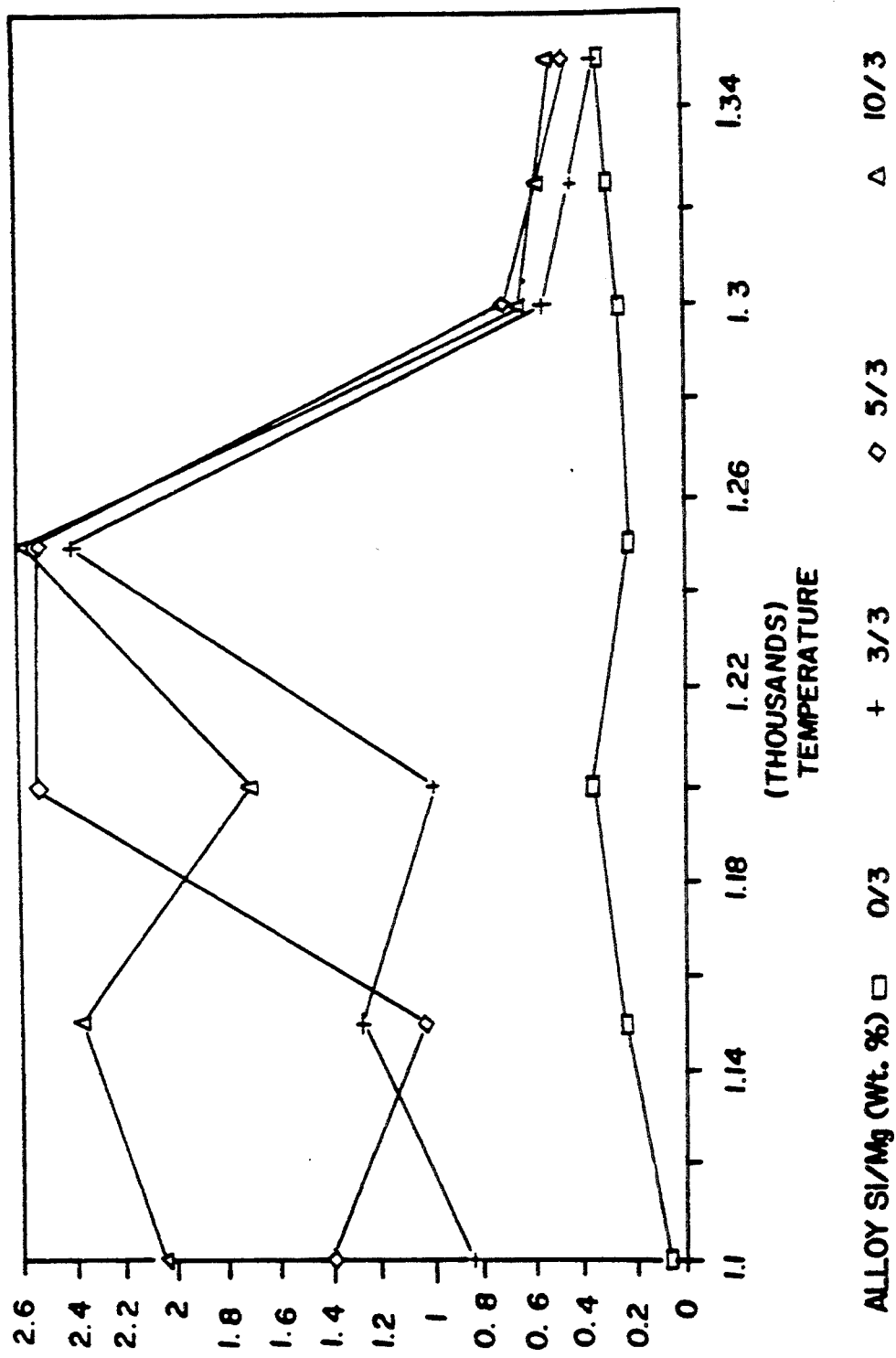

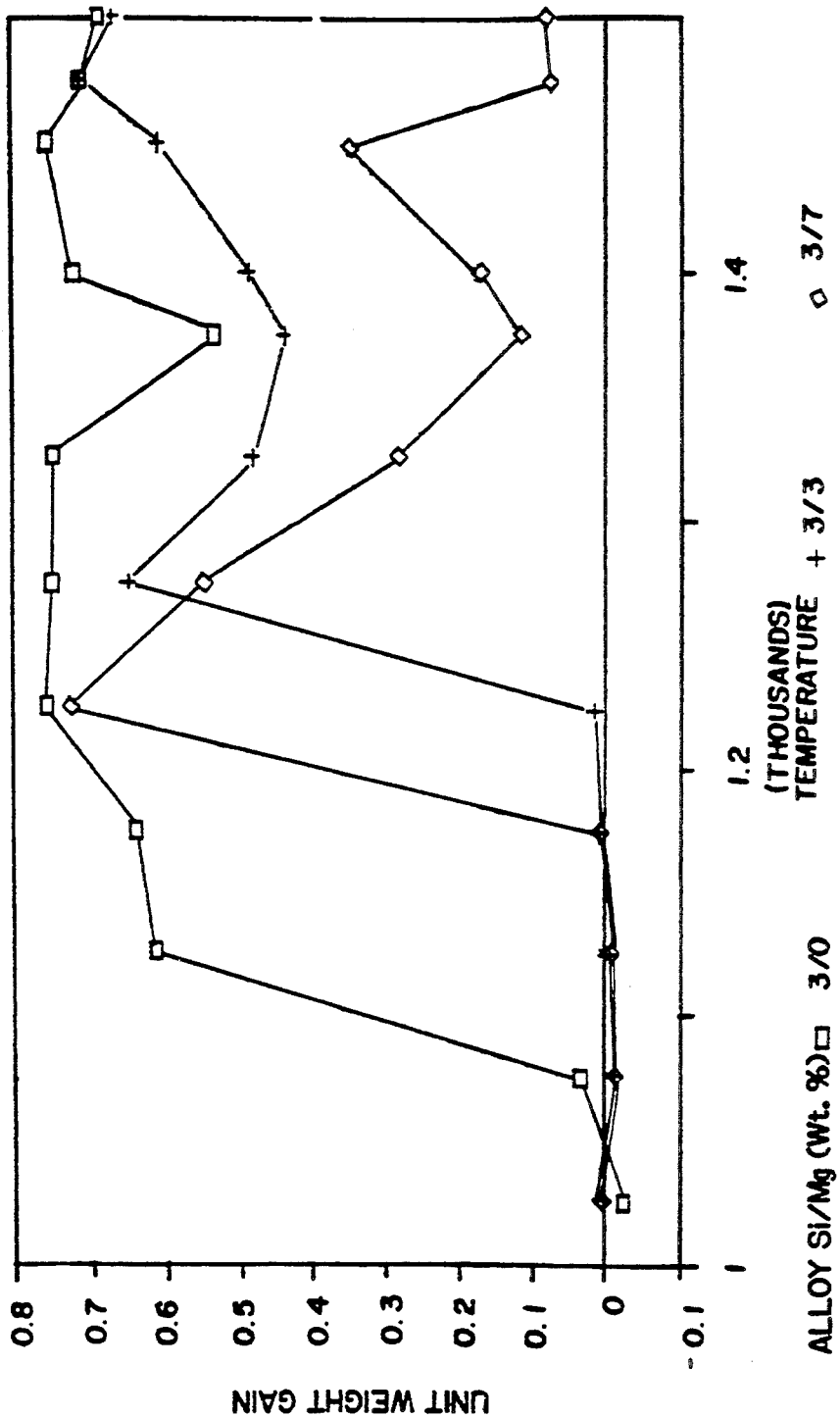

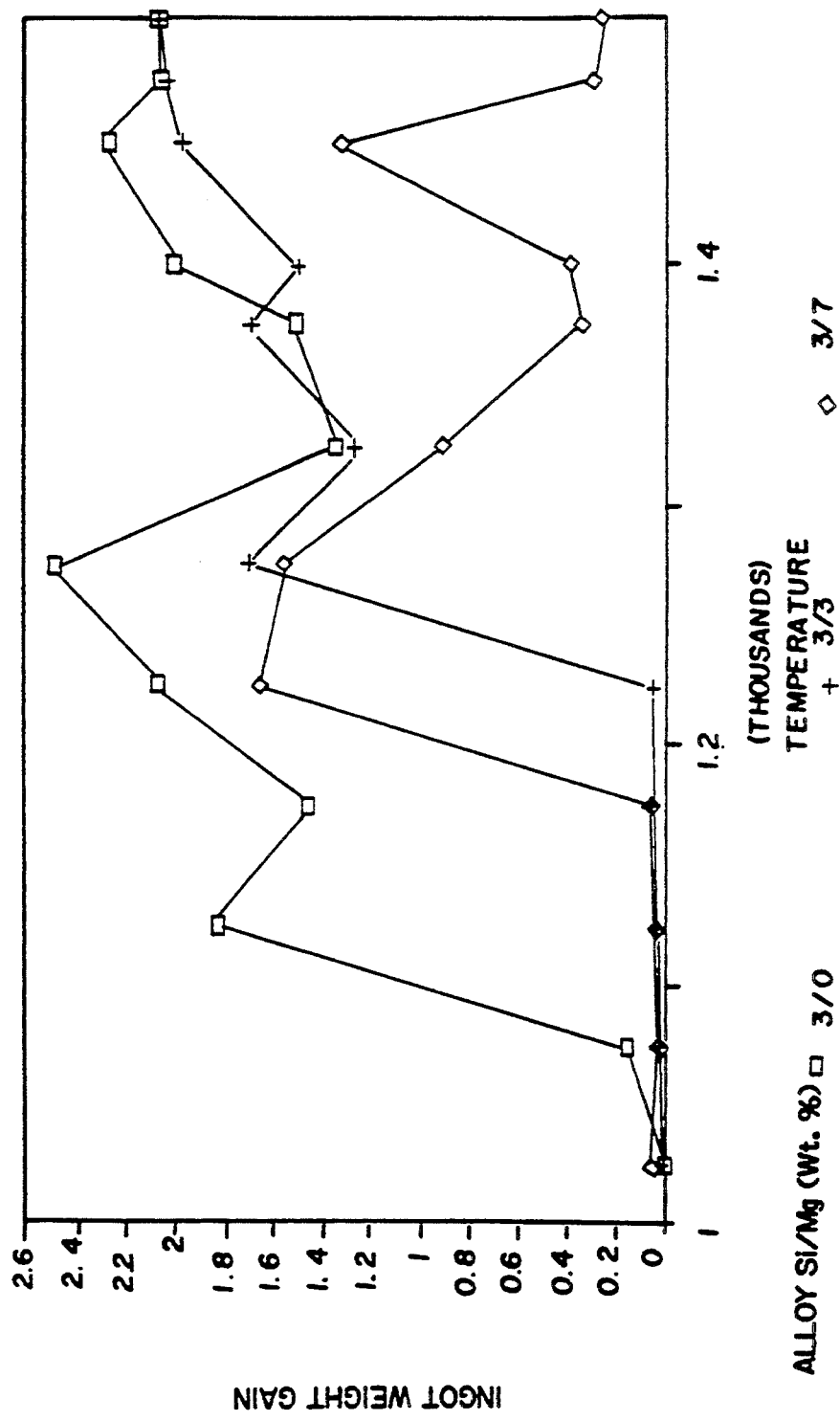

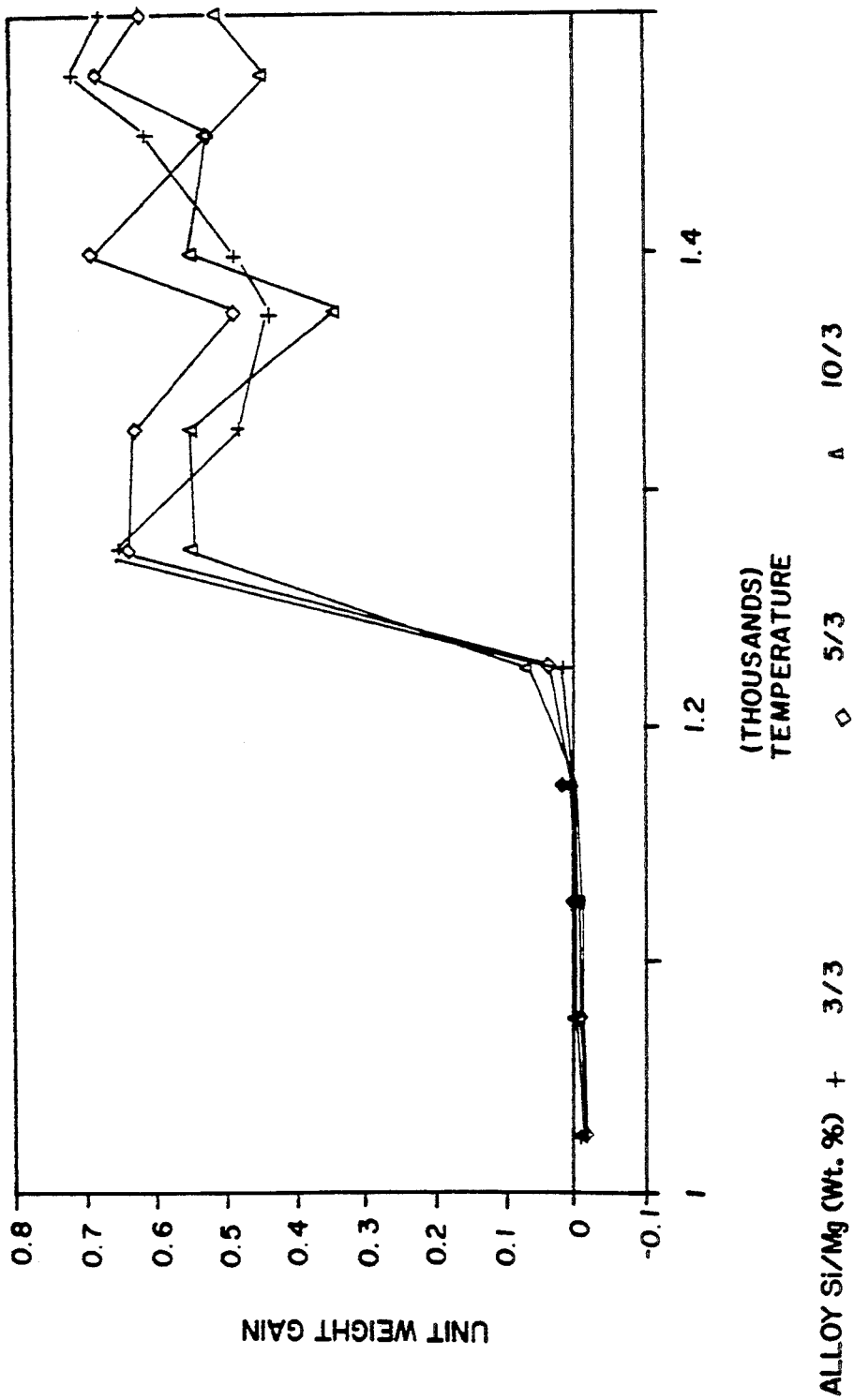

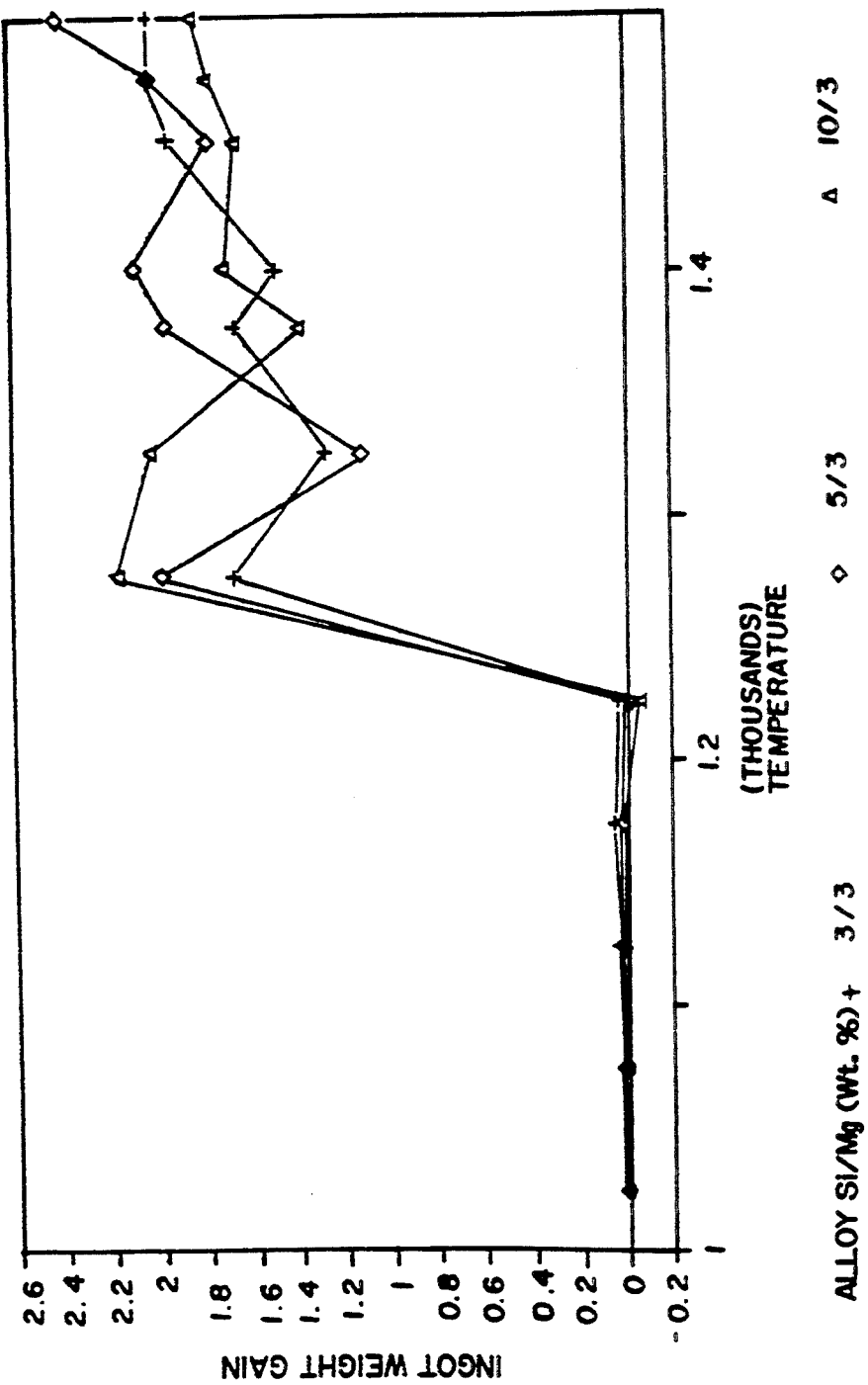

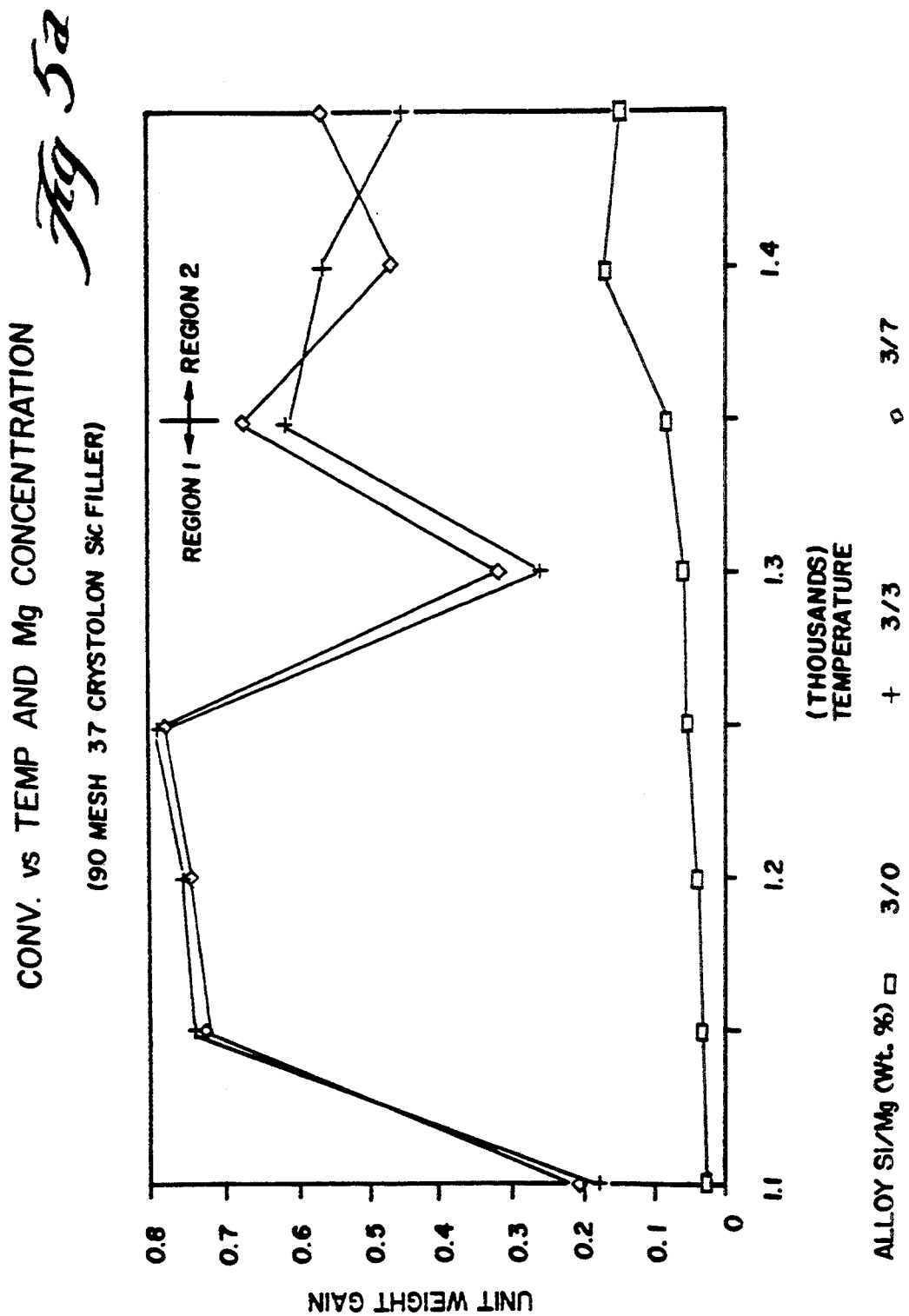

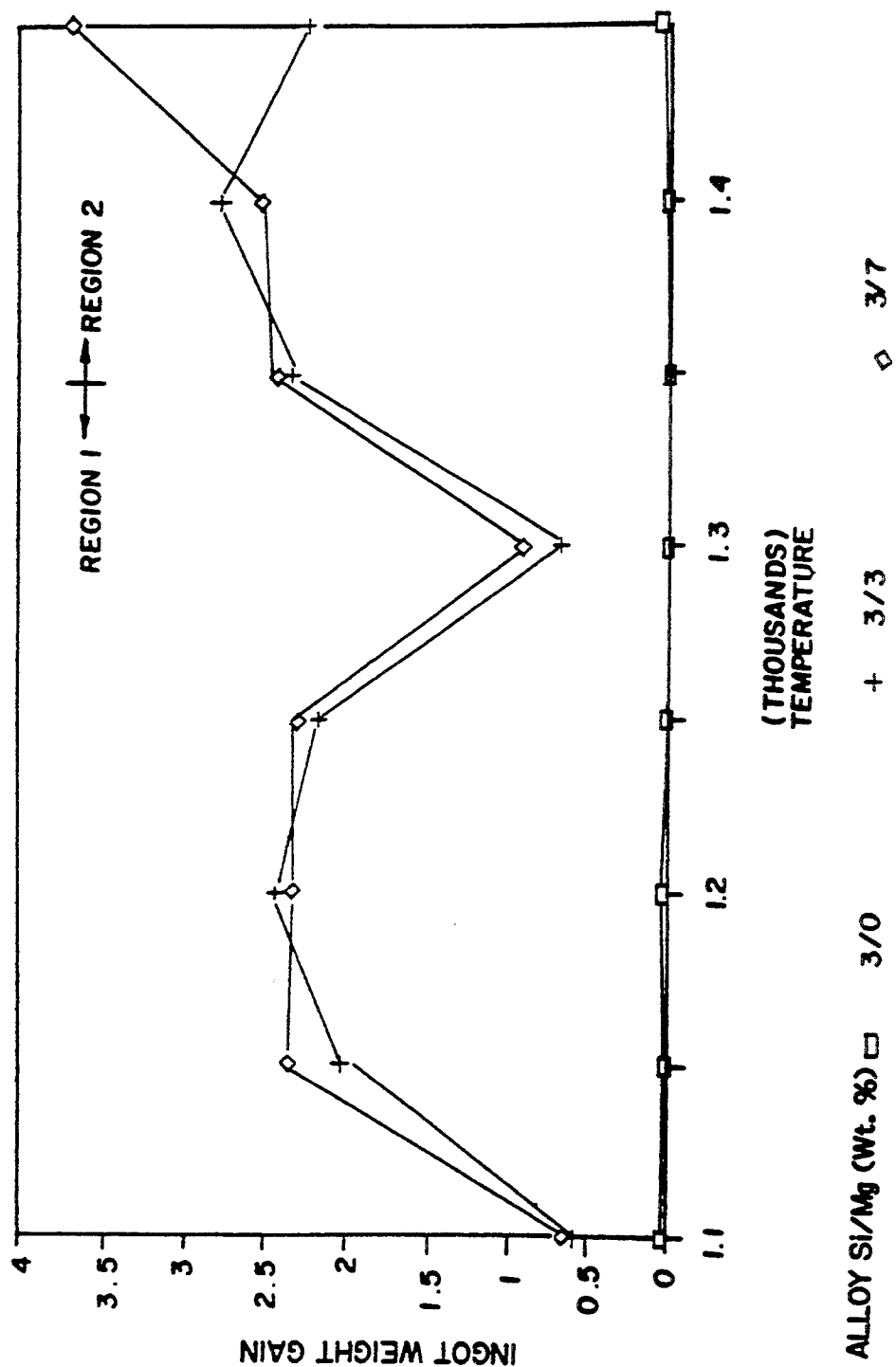

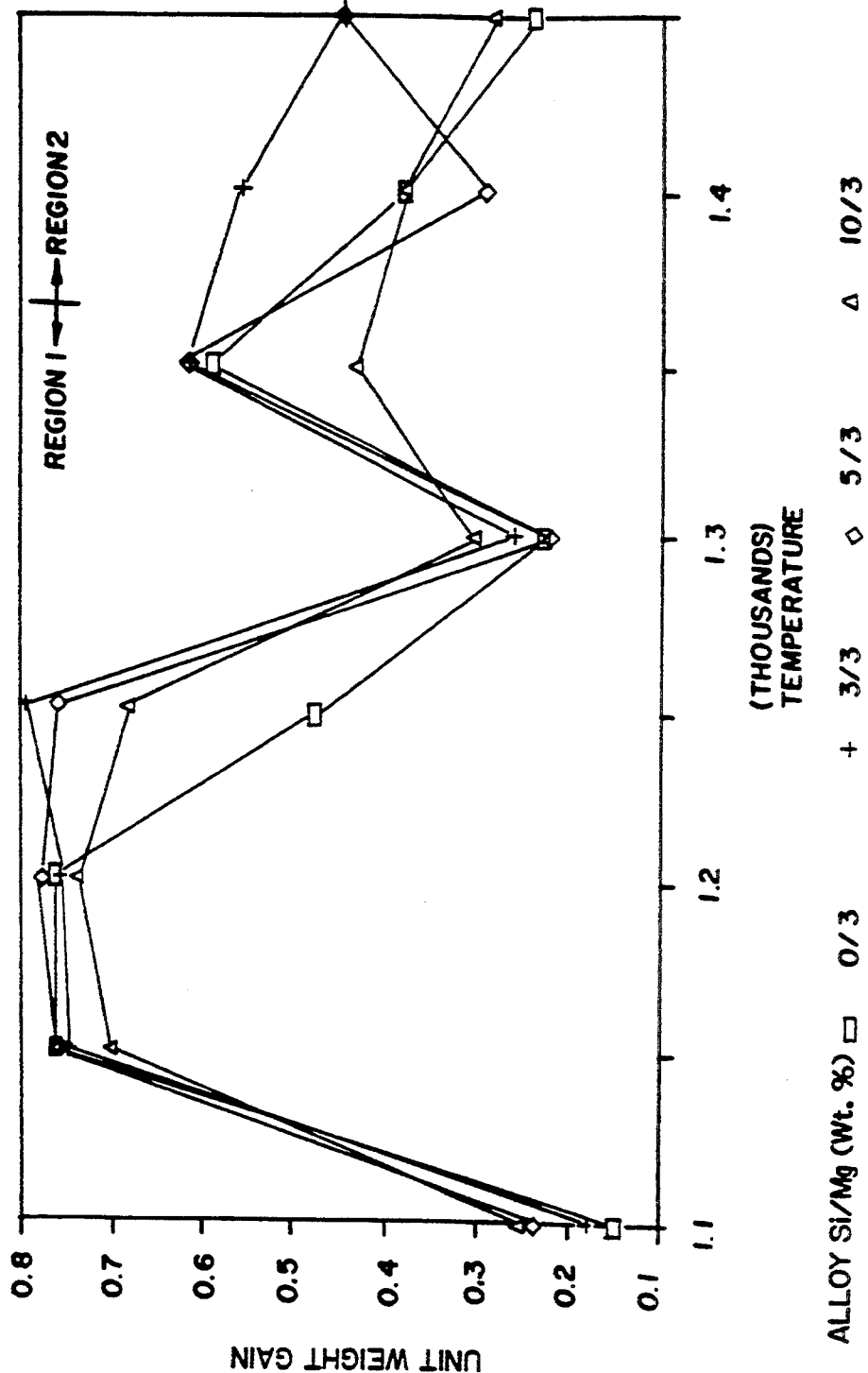

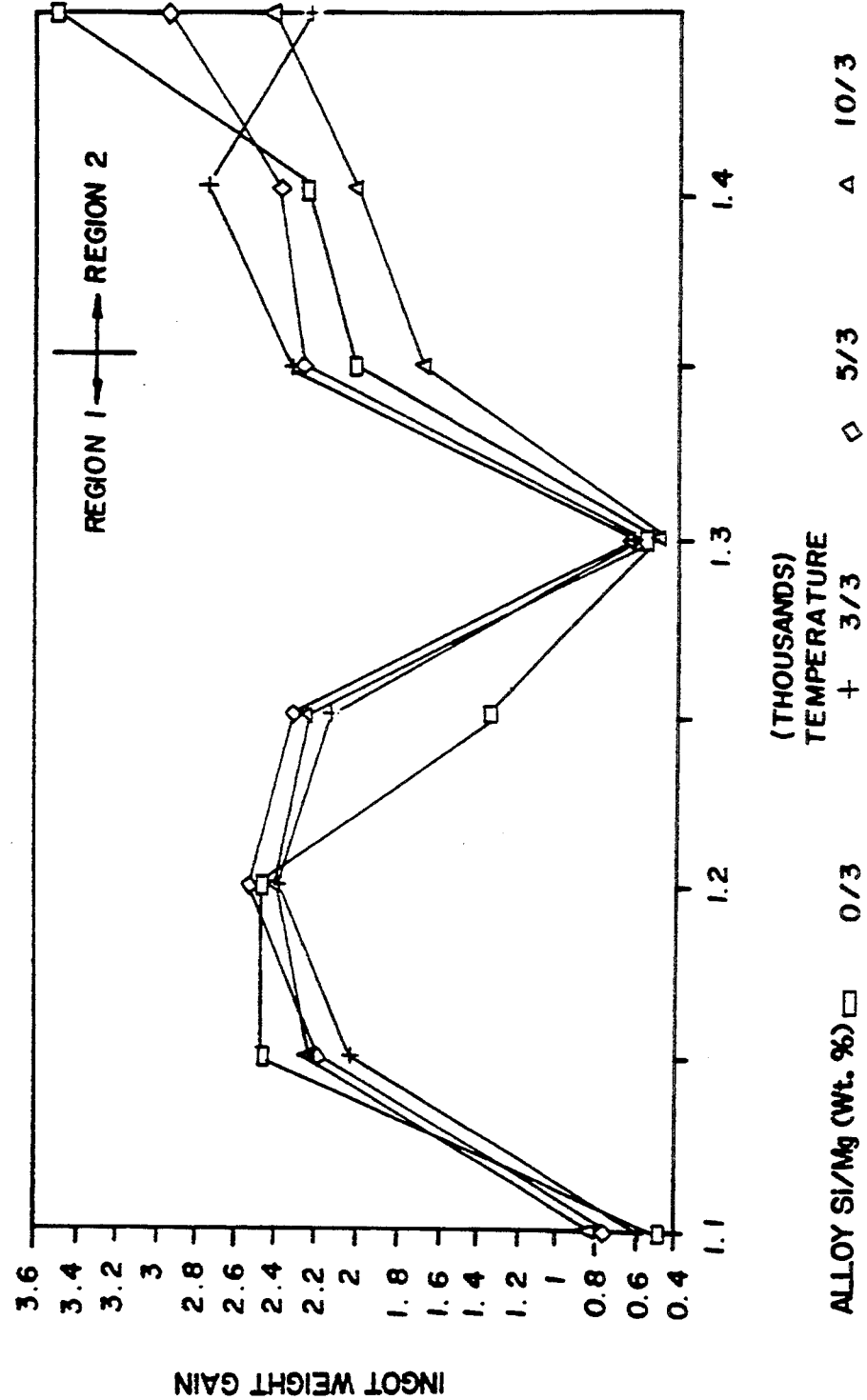

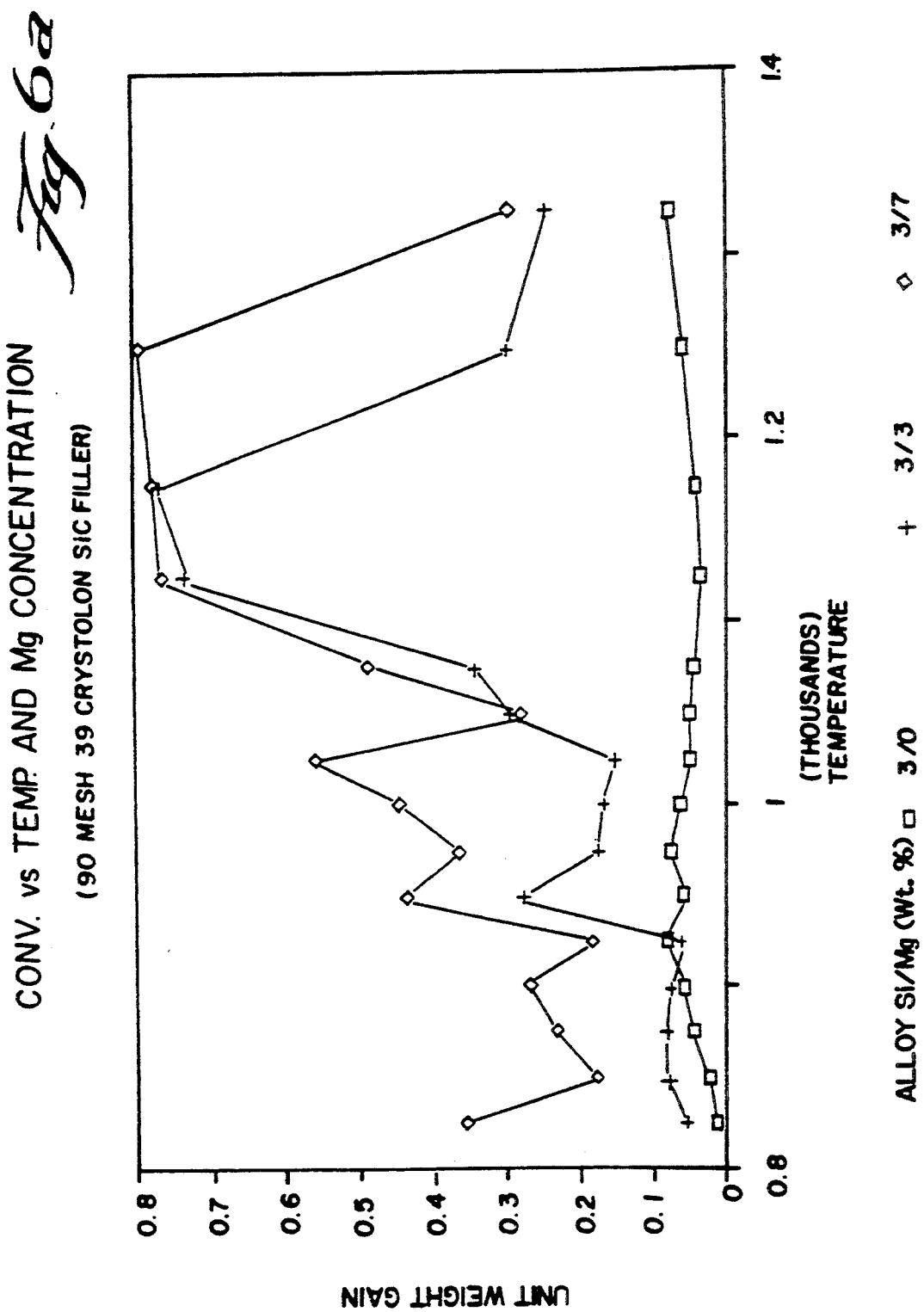

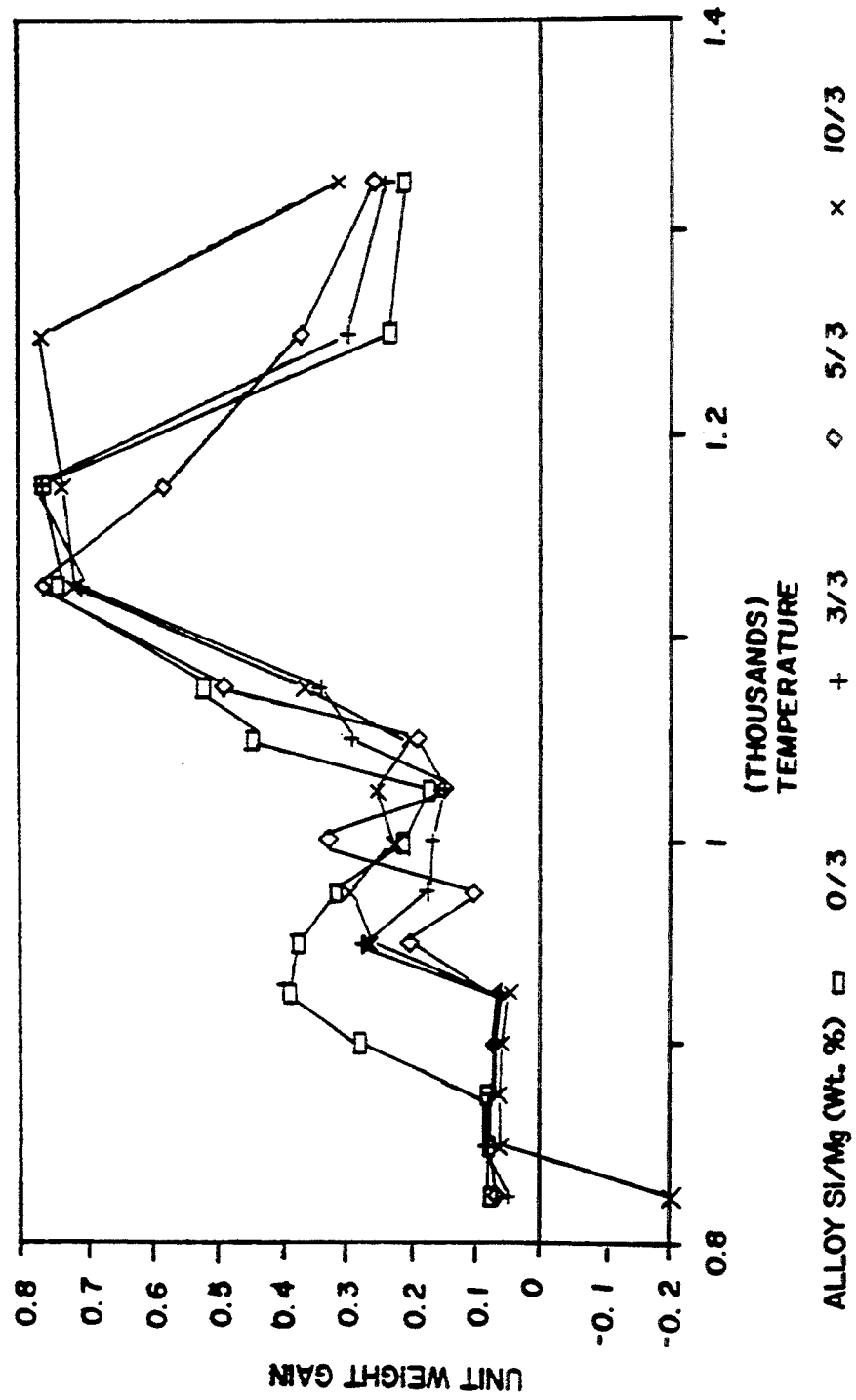

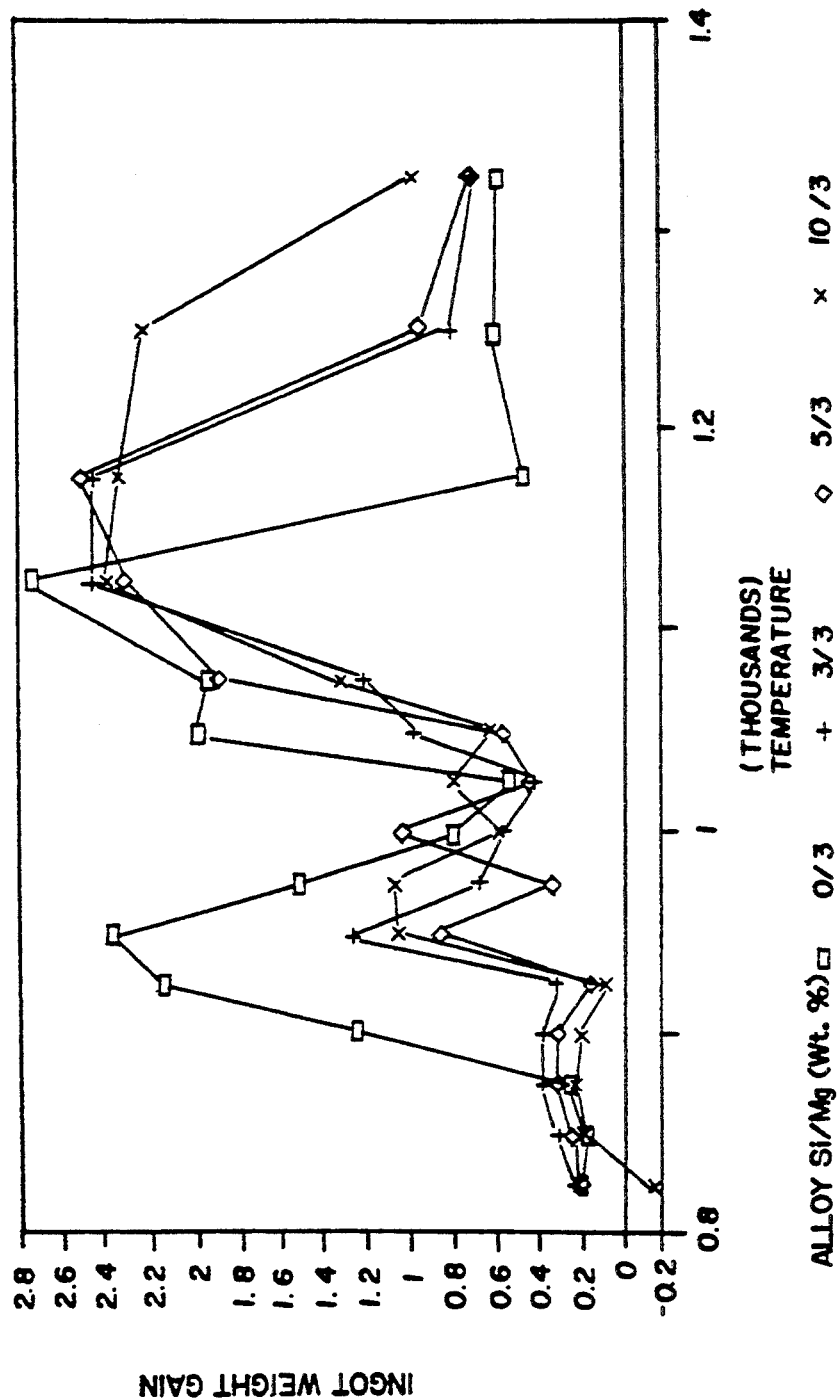

| POWDER | ‖ GROWTH DIRECTION | ⊥ GROWTH DIRECTION DOWN | ⊥ GROWTH DIRECTION UP | 25-1133 AlN | 4-0787 Al | 9-250 $Si_3N_4$ 28H | 33-1160 $\beta\ Si_3N_4$ | 27-1402 Si 8F | 9-97 $AlNi_3$ | 36-1334 $Al_2Si_2Sr$ |
|---|---|---|---|---|---|---|---|---|---|---|
| d(A) I | d(A) I | d(A) I | d(A) I | I hkl | I hkl | I hkl | I hkl | I hkl | I hkl | I hkl |
| | 3.889 8 | | | | | 30 110 | | | 40 100 | |
| | 3.703 1 | | | | | | | | | |
| | 3.348 1 | | | | | 30 200 | | | | |
| 3.256 5 | 3.279 2 | | | | | | 100 200 | | | 100 011 |
| | 3.136 2 | 3.132 3 | | | | | | 100 111 | | |
| | 3.032 3 | | | | | | | | | |
| | 2.883 2 | | | | | | | | | |
| | 2.811 2 | | | | | | 85 201 | | | |
| 2.660 100 | 2.697 100 | 2.692 100 | 2.692 100 | 100 100 | | | | | | |
| | 2.600 4 | | | | | 75 102 | 99 101 | | | 65 012 |
| | 2.541 3 | 2.520 2 | | | | 100 210 | | | 40 110 | |
| 2.462 64 | 2.491 68 | 2.485 96 | 2.487 74 | 60 002 | | | 93 210 | | | |
| | | | 2.464 4 | | | | | | | |
| | | 2.410 7 | 2.414 4 | | | | | | | |
| | | 2.405 5 | 2.407 46 | | | | | | | |
| 2.344 80 | 2.371 86 | 2.367 76 | 2.368 76 | 80 101 | | | | | | |
| 2.321 24 | 2.343 20 | 2.339 20 | 2.338 12 | | | 100 111 | | | | |
| | | | 2.329 4 | | | 60 211 | 9 111 | | | |
| 2.309 18 | 2.306 2 | | | | | | | | | |
| | 2.192 3 | | | | | | 10 300 | | | |
| | | | 2.167 6 | | | | 31 201 | | | |
| | | | 2.158 5 | | | 30 202 | | | | |
| | 2.081 12 | | | | | 55 301 | | | 100 111 | 55 110 |
| 2.009 15 | 2.029 9 | 2.024 7 | 2.033 4 | | 47 200 | | | | | |
| 2.000 13 | | 2.020 7 | | | | | | | | |
| | 1.918 1 | | | | | | | 55 220 | | |
| 1.817 24 | 1.829 30 | 1.826 27 | 1.827 24 | 25 102 | | | 37 301 | | | 18 021 |
| | 1.764 1 | | | | | | | | | |
| | 1.666 1 | | | | | | 30 311 | | | |
| | 1.635 1 | | | | | | | | | |
| | | | 1.570 3 | | | 35 321 | | | | |
| 1.544 51 | 1.557 62 | 1.554 38 | 1.554 44 | 40 110 | | | | | | |
| | 1.466 2 | | | | | 70 321 | | | | |
| 1.427 10 | 1.435 8 | 1.433 3 | | | 22 220 | 55 303 | | | | |
| | | 1.425 2 | | | | | | | | |
| | | 1.419 7 | | | | 60 411 | | | | |
| | 1.413 50 | 1.412 34 | 1.412 33 | 30 103 | | | | | | |
| 1.406 33 | | | 1.401 3 | | | 20 004 | | | | |
| | 1.381 2 | | | | | 12 104 | | | | |
| | 1.373 8 | | | | | 75 322 | | | | |
| | | | 1.356 1 | | | | 39 321 | | | 12 121 |
| | 1.348 10 | 1.345 3 | 1.346 4 | 5 200 | | 30 114 | | | | |
| 1.313 21 | 1.320 39 | 1.319 14 | 1.319 24 | 25 112 | | | | | | |
| | 1.302 14 | 1.305 2 | 1.300 9 | 10 201 | | 50 412 | | | | |
| 1.296 15 | | 1.299 7 | | | | | | 11 331 | | |
| | | 1.243 2 | | 1 004 | | | | | | |
| | | | 1.224 2 | 4 202 | 24 311 | | | | | |
| | | 1.188 3 | | | | | | | | |

Fig. 26

METHODS OF MAKING COMPOSITE ALUMINUM NITRIDE CERAMIC ARTICLES HAVING EMBEDDED FILLER

This is a continuation of application Ser. No. 07/811,895 filed on Dec. 20, 1991, now abandoned, which was a continuation of U.S. patent application Ser. No. 07/443,733, filed on Nov. 30, 1989, now abandoned, which was a continuation-in-part of U.S. patent application Ser. No. 07/415,180, filed Sep. 29, 1989, now abandoned, which was a divisional of Ser. No. 07/265,835, filed on Nov. 1, 1988, which issued on Apr. 10, 1990, as U.S. Pat. No. 4,916,113, which was a continuation of Ser. No. 06/819,397, filed on Jan. 17, 1986, which issued on Jul. 25, 1989, as U.S. Pat. No. 4,851,375, which was a continuation-in-part of Ser. No. 06/697,876, filed on Feb. 4, 1985, now abandoned.

BACKGROUND OF THE INVENTION

1. Field of the Invention

The present invention broadly relates to novel composite ceramic structures and to novel methods of making the same. In particular, the invention relates to composite ceramic structures having a polycrystalline matrix surrounding or embedding substantially inert filler materials and/or active filler materials and to methods of making the structures by "growing" an oxidation reaction product from a parent metal into a permeable mass of filler material.

2. Background

Traditional methods of preparing ceramic articles do not readily lend themselves to the preparation of ceramic matrix composite materials, especially fiber- and/or wire-reinforced ceramic composite structures. A composite structure is one which comprises a heterogeneous material, body or article made of two or more different materials which are intimately combined in order to attain desired properties of the composite. For example, two different materials may be intimately combined by embedding one in a matrix of the other. A ceramic composite structure typically comprises a ceramic matrix which encloses one or more diverse kinds of filler materials such as particulates, fibers, rods or the like.

Traditional methods of preparing ceramic articles involve the following general steps: (1) Preparation of material in powder form. (2) Grinding or milling of powders to obtain very fine particles. (3) Formation of the powders into a body having the desired geometry (with allowance for shrinkage during subsequent processing). For example, this step might be accomplished by uniaxial pressing, isostatic pressing, injection molding, tape casting, slip casting or any of several other techniques. (4) Densification of the body by heating it to an elevated temperature such that the individual powder particles merge together to form a coherent structure. Preferably, this step is accomplished without the application of pressure (i.e., by sintering), although in some cases an additional driving force is required and can be provided through the application of external pressure either uniaxially (i.e., hot pressing) or isostatically, i.e., hot isostatic pressing. (5) Finishing, frequently by diamond grinding, as required.

In the preparation of ceramic matrix composite materials, the most serious difficulties with traditional methods arise in the densification step, number (4) above. The normally preferred method, pressureless sintering, can be difficult or impossible with particulate composites if the materials are not highly compatible. More importantly, normal sintering is impossible in most cases involving fiber composites even when the materials are compatible, because the merging together of the particles is inhibited by the fibers which tend to prevent the necessary displacements of the densifying powder particles. These difficulties have been, in some cases, partially overcome by forcing the densification process through the application of external pressure at high temperature. However, such procedures can generate many problems, including breaking or damaging of the reinforcing fibers by the external forces applied, limited capability to produce complex shapes (especially in the case of uniaxial hot pressing), and generally high costs resulting from low process productivity and the extensive finishing operations sometimes required.

Additional difficulties can also arise in the body formation step, number (3) above, if it is desired to maintain a particular distribution of the composite second phase within the matrix. For example, in the preparation of a fibrous ceramic composite, the powder and fiber flow processes involved in the formation of the body can result in non-uniformities and undesired orientations of the reinforcing fibers, with a consequent loss in performance characteristics.

Other methods are also used as means for forming ceramic matrix composites. For example, the formation of a matrix structure by the reaction of gaseous species to form the desired ceramic (a process known as chemical vapor deposition) is employed currently for silicon carbide fiber-reinforced silicon carbide matrix composites. This method has met with only limited success, partly because the matrix deposition process tends to occur on all of the composite second phase surfaces at once, such that matrix development only occurs until the growing surfaces intersect, with the trapping of porosity within the body being an almost inevitable consequence. In addition, the rate of matrix deposition has been so low as to make such composites prohibitively expensive for all but the most esoteric applications.

A second non-traditional approach involves the infiltration of the composite particles or fibers with a flowable organic material containing the necessary elements to form the desired ceramic matrix. Ceramic formation occurs by chemical reaction on heating this material to an elevated temperature. Once again, limited success has been achieved, in this case because elimination of the large amounts of volatile materials (necessary constituents of the initial flowable infiltrant composition) during the heating process tends to leave behind a porous and/or cracked ceramic body.

Seufert (U.S. Pat. No. 3,437,468) discloses certain composite materials made by a reaction process with molten aluminum. However, the matrix constituent of these materials inherently contains a large amount of magnesium aluminate spinel, a material of less desirable properties (for example, lower hardness) than certain other ceramics such as aluminum oxide. In addition, the process of the Seufert Patent requires that the ceramics be formed, in major part, by reaction of aluminum with magnesium oxide and silicon dioxide (in free or combined form) which reduces the flexibility of the process and dictates that substantial amounts of silicon (in addition to magnesium aluminate) will be present in the matrix of the final ceramic product.

DESCRIPTION OF COMMONLY OWNED PATENT APPLICATIONS

The subject matter of this application is related to that of several other Commonly Owned Patents and Commonly Owned and Copending Patent Applications. Particularly, these other Patents and Patent Applications describe novel methods for making ceramic matrix composite materials (hereinafter sometimes referred to as "Commonly Owned Ceramic Matrix Patent Applications") and metal matrix composite materials (hereinafter sometimes referred to as "Commonly Owned Metal Matrix Patent(s) and Patent Application(s)").

A novel approach to the formation of ceramic materials is disclosed generically in Commonly Owned U.S. Pat. No. 4,713,360, which issued on Dec. 15, 1987 in the names of Marc S. Newkirk et al and entitled "Novel Ceramic Materials and Methods for Making Same". This Patent discloses a method of producing self-supporting ceramic bodies grown as the oxidation reaction product of a molten parent precursor metal which is reacted with a vapor-phase oxidant to form an oxidation reaction product. Molten metal migrates through the formed oxidation reaction product to react with the oxidant thereby continuously developing a ceramic polycrystalline body which can, if desired, include an interconnected metallic component. The process may be enhanced by the use of one or more dopants alloyed with the parent metal. For example, in the case of oxidizing aluminum in air, it is desirable to alloy magnesium and silicon with the aluminum to produce alpha-alumina ceramic structures. This method was improved upon by the application of dopant materials to the surface of the parent metal, as described in Commonly Owned U.S. Pat. No. 4,853,352, which issued on Aug. 1, 1989, in the names of Marc S. Newkirk et al and entitled "Methods of Making Self-Supporting Ceramic Materials", a European counterpart to which was published in the EPO on Jan. 22, 1986.

A method for producing ceramic composite bodies having a predetermined geometry or shape is disclosed in Commonly Owned and Copending U.S. patent application Ser. No. 338,471, filed Apr. 14, 1989, which is a continuation of U.S. application Ser. No. 861,025, filed May 8, 1986 (and now abandoned), both in the names of Marc S. Newkirk et al, a European counterpart to which was published in the EPO on Jan. 22, 1986. In accordance with the method in this U.S. Patent Application, the developing oxidation reaction product infiltrates a permeable preform of filler material in a direction towards a defined surface boundary. It was discovered that high fidelity is more readily achieved by providing the preform with a barrier means, as disclosed in Commonly Owned U.S. patent application Ser. No. 295,488, filed Jan. 10, 1989, which is a continuation of U.S. patent application Ser. No. 861,024, filed May 8, 1986 (and now allowed), both in the names of Marc S. Newkirk et al., a European counterpart to which was published in the EPO on Nov. 11, 1987. This method produces shaped self-supporting ceramic bodies, including shaped ceramic composites, by growing the oxidation reaction product of a parent metal to a barrier means spaced from the metal for establishing a boundary or surface.

Ceramic composites having a cavity with an interior geometry inversely replicating the shape of a positive mold or pattern are disclosed in Commonly Owned U.S. patent application Ser. No. 329,794, filed Mar. 28, 1989, which is a divisional of U.S. Pat. No. 4,828,785, which issued May 9, 1989, both in the names of Marc S. Newkirk, et al., a European counterpart to which was published in the EPO on Sep. 2, 1987, and in U.S. Pat. No. 4,859,640, which issued on Aug. 22, 1989, a European counterpart to which was published in the EPO on Mar. 9, 1988.

The feeding of additional molten parent metal from a reservoir has been successfully utilized to produce thick ceramic matrix composite structures. Particularly, as disclosed in Copending and Commonly Owned U.S. patent application Ser. No. 168,358, filed Sep. 16, 1986, which is a continuation-in-part of U.S. patent application Ser. No. 908,067, filed Sep. 16, 1986 (and now allowed), both in the names of Marc S. Newkirk et al, and entitled "Reservoir Feed Method of Making Ceramic Composite Structures and Structures Made Thereby", a Euroepan counterpart to which was published in the EPO on Mar. 30, 1988, the reservoir feed method has been successfully applied to form ceramic matrix composite structures. According to the method of this Newkirk et al invention, the ceramic or ceramic composite body which is produced comprises a self-supporting ceramic composite structure which includes a ceramic matrix obtained by the oxidation reaction of a parent metal with an oxidant to form a polycrystalline material. In conducting the process, a body of the parent metal and a permeable filler are oriented relative to each other so that formation of the oxidation reaction product will occur in a direction toward and into the filler. The parent metal is described as being present as a first source and as a reservoir, the reservoir of metal communicating with the first source due to, for example, gravity flow. The first source of molten parent metal reacts with the oxidant to begin the formation of the oxidation reaction product. As the first source of molten parent metal is consumed, it is replenished, preferably by a continuous means, from the reservoir of parent metal as the oxidation reaction product continues to be produced and infiltrates the filler. Thus, the reservoir assures that ample parent metal will be available to continue the process until the oxidation reaction product has grown to a desired extent.

A method for tailoring the constituency of the metallic component of a ceramic matrix composite structure is disclosed in Copending and Commonly Owned U.S. patent application Ser. No. 07/389,506, filed on Aug. 2, 1989, which in turn is a continuation of U.S. patent application Ser. No. 07/908,454, filed Sep. 17, 1986, both of which are in the names of Marc S. Newkirk et al and entitled "Method for In Situ Tailoring the Metallic Component of Ceramic Articles and Articles Made Thereby".

Moreover, U.S. patent application Ser. No. 269,152, filed Nov. 9, 1988, which is a continuation of U.S. Pat. No. 4,818,734, issued Apr. 4, 1989, in the names of Robert C. Kantner et al., which was a Continuation-in-Part application of the above-mentioned Ser. No. 908,454, having the same title and also being Commonly Owned. This Patent and the above-mentioned application 908,454, disclose methods for tailoring the constituency of the metallic component (both isolated and interconnected) of ceramic and ceramic matrix composite bodies during formation thereof to impart one or more desirable characteristics to the resulting body. Thus, desired performance characteristics for the ceramic or ceramic composite body are advantageously achieved by incorporating the desired metallic component in situ, rather than from an extrinsic source, or by post-forming techniques.

As discussed in these Commonly Owned Ceramic Matrix Patent Applications and Patents, novel polycrystalline ceramic materials or polycrystalline ceramic composite materials are produced by the oxidation reaction between a parent metal and an oxidant (e.g., a solid, liquid and/or a gas). In accordance with the generic process disclosed in these Commonly Owned Ceramic Matrix Patent Applications and Patents, a parent metal (e.g., aluminum) is heated to an elevated temperature above its melting point but below the melting point of the oxidation reaction product to form a body of molten parent metal which reacts upon contact with an oxidant to form the oxidation reaction product. At this temperature, the oxidation reaction product, or at least a portion thereof, is in contact with and extends between the body of molten parent metal and the oxidant, and molten metal is drawn or transported through the formed oxidation reaction product and towards the oxidant. The transported molten metal forms additional fresh oxidation reaction product contact with the oxidant, at the surface of previously formed oxidation reaction product. As the process continues, additional metal is transported through this formation of polycrystalline oxidation reaction product thereby continually "growing" a ceramic structure of interconnected crystallites. The resulting ceramic body may contain metallic constituents, such as non-oxidized constituents of the parent metal, and/or voids. Oxidation is used in its broad sense in all of the Commonly Owned Ceramic Matrix Patent Applications and Patents and in this application, and refers to the loss or sharing of electrons by a metal to an oxidant which may be one or more elements and/or compounds. Accordingly, elements other than oxygen may serve as an oxidant.

In certain cases, the parent metal may require the presence of one or more dopants in order to influence favorably or to facilitate growth of the oxidation reaction product. Such dopants may at least partially alloy with the parent metal at some point during or prior to growth of the oxidation reaction product. For example, in the case of aluminum as the parent metal and air as the oxidant, dopants such as magnesium and silicon, to name but two of a larger class of dopant materials, can be alloyed with aluminum, and the created growth alloy is utilized as the parent metal. The resulting oxidation reaction product of such a growth alloy, in the case of using oxygen as an oxidant, comprises alumina, typically alpha-alumina.

Novel ceramic composite structures and methods of making the same are also disclosed and claimed in certain of the aforesaid Commonly Owned Ceramic Matrix Patent Applications and Patents which utilize the oxidation reaction to produce ceramic composite structures comprising a substantially inert filler (note: in some cases it may be desirable to use a reactive filler, e.g., a filler which is at least partially reactive with the advancing oxidation reaction product and/or parent metal) infiltrated by the polycrystalline ceramic matrix. A parent metal is positioned adjacent to a mass of permeable filler (or a preform) which can be shaped and treated to be self-supporting, and is then heated to form a body of molten parent metal which is reacted with an oxidant, as described above, to form an oxidation reaction product. As the oxidation reaction product grows and infiltrates the adjacent filler material, molten parent metal is drawn through previously formed oxidation reaction product within the mass of filler and reacts with the oxidant to form additional fresh oxidation reaction product at the surface of the previously formed oxidation reaction product, as described above. The resulting growth of oxidation reaction product infiltrates or embeds the filler and results in the formation of a ceramic composite structure of a polycrystalline ceramic matrix embedding the filler. As also discussed above, the filler (or preform) may utilize a barrier means to establish a boundary or surface for the ceramic composite structure.

E. S. Park and S. D. Poste disclose a novel method for making an open-cell rigid foam having a ceramic skeletal structure in Commony Owned U.S. Pat. No. 4,808,558, which issued on Feb. 28, 1989, a European counterpart to which was published in the EPO on Mar. 23, 1988. The foam is produced by reacting a precursor metal to produce an oxidation reaction product which grows through a permeable layer of inert filler material to form an open cell structure. The filler material, which is deposited as a thin permeable layer on the surfaces of a metal foam, is chosen such that it maintains the original foam structure at the oxidation temperature. The resulting ceramic foam may comprise a tubular structure. Thus, depending on the processing conditions used, the ceramic tubules may have metallic cores, or may be hollow. The examples disclosed in this Patent include AlN powder filler materials and a nitrogenous atmosphere.

Thus, the aforesaid Commonly Owned Ceramic Matrix Patent Applications and Patents describe the production of oxidation reaction products which are readily grown to desired sizes and thicknesses heretofore believed to be difficult, if not impossible, to achieve with conventional ceramic processing techniques.

The entire disclosures of all of the foregoing Commonly Owned Ceramic Matrix Patent Applications and U.S. Patents are expressly incorporated herein by reference.

SUMMARY OF THE INVENTION

In accordance with the present invention, there is provided a method for producing a self-supporting ceramic composite structure comprising (1) a ceramic matrix obtained by oxidation of a parent metal, e.g., an aluminum alloy, to form a polycrystalline material consisting essentially of (i) the oxidation reaction product (e.g., alpha-aluminum oxide) of said parent metal with a vapor-phase oxidant (e.g., oxygen) and, optionally, (ii) one or more non-oxidized constituents of the parent metal; and (2) a filler embedded by the matrix.

Generally, this invention is based upon the discovery that the growth of a polycrystalline material resulting from the oxidation of a metal (hereinafter referred to as the "parent metal" and defined below) as described in the above-referenced Commonly Owned Ceramic Matrix Patents and Patent Applications can be directed towards a permeable mass of filler material, sometimes herein referred to simply as "filler", which is placed adjacent the parent metal. The filler is engulfed and embedded within the growth of polycrystalline material to provide a composite ceramic structure. Under suitable process conditions, the molten parent metal oxidizes outwardly from its initial surface (i.e., the surface exposed to the oxidant) towards the oxidant and the filler by migrating through its own otherwise impermeable oxidation reaction product structure. The oxidation reaction product grows into the permeable mass of filler, which may comprise various refractory and/or non-refractory granular, fibrous, or other materials. This results in novel ceramic matrix composite structures comprising a dense matrix of a ceramic polycrystalline material embedding the filler material(s).

The mass or aggregate of filler material or materials is positioned adjacent to the parent metal in the assumed path of the oxidation reaction product growth therefrom. The filler material can comprise either a loose or bonded array or arrangement of materials, which array has interstices, openings, intervening spaces, or the like, to render it permeable to the oxidant and the oxidation reaction product growth. Further, the filler material may be homogeneous or heterogeneous, and as used herein and in the appended claims, the terms "filler" or "filler material" are intended to mean one or more materials unless indicated otherwise by the context. A matrix of the polycrystalline material resulting from the oxidation reaction product growth is simply grown around the filler material so as to embed the latter without substantially disturbing or displacing it. Thus, no external forces are involved which might damage or disturb the arrangement of the filler material and no awkward and costly high temperature, high pressure processes and facilities are required as in known conventional processes to achieve a dense composite ceramic structure. In addition, the stringent requirements of chemical and physical compatibility necessary for pressureless sintering to form ceramic composites are greatly reduced or eliminated by the present invention.

In the ceramic matrix growth process, the parent metal is heated to a temperature above its melting point but below the melting point of the oxidation reaction product thereby forming a body of molten parent metal which is reacted with the oxidant to form the oxidation reaction product. At this temperature or within this temperature range, the body of molten metal is in contact with at least a portion of the oxidation reaction product which extends between the body of molten metal and the oxidant. Molten metal is drawn through the oxidation reaction product towards the adjacent filler material to sustain the continued formation of oxidation reaction product at the interface between the oxidant and previously formed oxidation reaction product. The reaction is continued for a time sufficient to embed at least a portion of the filler material within the oxidation reaction product by growth of the latter, which optionally has therein inclusions of non-oxidized constituents of parent metal, to form the composite structure.

The products of the present invention generally are adaptable or fabricated, such as by machining, polishing, grinding, etc., for use as articles of commerce which, as used herein, are intended to include, without limitation, industrial, structural and technical ceramic bodies for applications where electrical, wear, thermal, structural or other features or properties are important or beneficial; and it is not intended to include recycle or waste materials such as might be produced as unwanted by-products in the processing of molten metal.

DEFINITIONS

"Active Filler", as used herein, means fillers which provide nucleation sites and/or act as catalysts for ceramic matrix formation.

"Alloy Side" as used herein refers to that side of the ceramic matrix composite which initially contacted molten metal before the oxidation reaction product of that molten metal and an oxidant infiltrated the preform or mass of filler material.

"Aluminum", as used herein, means and includes essentially pure metal (e.g., relatively pure, commercially available unalloyed aluminum) or other grades of metal and metal alloys such as the commercially available metals having impurities and/or alloying constituents such as iron, silicon, copper, magnesium, manganese, chromium, zinc, etc., therein. An aluminum alloy for purposes of this definition is an alloy or intermetallic compound in which aluminum is the major constituent.

"Balance Non-Oxidizing Gas", as used herein, means that any gas present in addition to the primary or oxidizing gas (if utilized) comprising the vapor-phase oxidant that is either an inert gas or a reducing gas which is substantially non-reactive with the parent metal under the process conditions. Any oxidizing gas which may be present as an impurity in the gas(es) used should be insufficient to oxidize the parent metal to any substantial extent under the process conditions.

"Barrier" or "barrier means", as used herein, means any material, compound, element, composition, or the like, which, under the process conditions, maintains some integrity, is not substantially volatile (i.e., the barrier material does not volatilize to such an extent that it is rendered non-functional as a barrier) and is preferably permeable to a vapor-phase oxidant (if utilized) while being capable of locally inhibiting, poisoning, stopping, interfering with, preventing, or the like, continued growth of the oxidation reaction product.

"Carcass" or "Parent Metal Carcass", as used herein, refers to any of the original body of parent metal remaining which has not been consumed during formation of the ceramic body, or the ceramic composite body, and typically, which remains in at least partial contact with the formed body. It should be understood that the carcass may also typically include some oxidized constituents of the parent metal and/or a second or foreign metal therein.

"Ceramic", as used herein, should not be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amounts of one or more metallic constituents (isolated and/or interconnected, depending on the processing conditions used to form the body) derived from the parent metal, or reduced from the oxidant or a dopant, most typically within a range of from about 1–40 percent by volume, but may include still more metal.

"Ceramic Matrix Composite" or "CMC" or "Ceramic Composite Body", as used herein, means a material comprising a two- or three-dimensionally interconnected ceramic which has embedded a preform or filler material, and may further include a parent metal phase embedded therein, possibly in a two- or three-dimensionally interconnected network. The ceramic may include various dopant elements to provide a specifically desired microstructure, or specifically desired mechanical, physical, or chemical properties in the resulting composite.

"Dopants", as used herein, means materials (parent metal constituents or constituents combined with and/or included in or on a filler, or combined with the oxidant) which, when used in combination with the parent metal, favorably influence or promote the oxidation reaction process and/or modify the growth process to alter the microstructure and/or properties of the product. While not wishing to be bound by any particular theory or explanation of the function of dopants, it appears that some dopants are useful in promoting oxidation reaction product formation in cases where appropriate surface energy relationships between the parent metal and its oxidation reaction product do not intrinsically exist so as to promote such formation. Dopants may be added to the filler material, they may be in the form of a gas, solid, or liquid under the process conditions, they may be included as constituents of the parent metal, or they may be added to any one of the constituents involved in the formation of the oxidation reaction product. Dopants may: (1) create favorable surface energy relationships which enhance or induce the wetting of the oxidation reaction product by the molten parent metal; and/or (2) form a "precursor layer" at the growth surface by reaction with alloy, oxidant, and/or filler, that (a) minimizes formation of a protective and coherent oxidation reaction product layer(s), (b) may enhance oxidant solubility (and thus permeability) in molten metal, and/or (c) allows for transport of oxidant from the oxidizing atmosphere through any precursor oxide layer to combine subsequently with the molten metal to form another oxidation reaction product; and/or (3) cause microstructural modifications of the oxidation reaction product as it is formed or subsequently and/or alter the metallic constituent composition and properties of such oxidation reaction product; and/or (4) enhance growth nucleation and uniformity of growth of oxidation reaction product.

"Filler", as used herein, means either single constituents or mixtures of constituents which are substantially non-reactive with and/or of limited solubility in the parent metal) and/or oxidation reaction product and may be single or multi-phase. Fillers may be provided in a wide variety of forms, such as powders, flakes, platelets, microspheres, whiskers, bubbles, etc., and may be either dense or porous. "Filler" may also include ceramic fillers, such as alumina or silicon carbide as fibers, chopped fibers, particulates, whiskers, bubbles, spheres, fiber mats, or the like, and coated fillers such as carbon fibers coated with alumina or silicon carbide to protect the carbon from attack, for example, by a molten aluminum parent metal. Fillers may also include metals. For example, refractory metals such as tungsten, tantalum and molybdenum could be used as fillers.

"Green", as used herein in conjunction with filler materials and preforms, refers to a filler material or preform before any growth of oxidation reaction product into the filler material or preform has occurred. Thus a filler material or preform that has been fired at an elevated temperature (for example, to volatilize a binder) should be considered to be "green" so long as the filler material or preform has not been infiltrated by either the parent metal or the oxidation reaction product.

"Growth Alloy", as used herein, means any alloy containing initially, or at some point during processing obtaining, a sufficient amount of requisite constituents to result in growth of oxidation reaction product therefrom. Growth alloy may differ from a parent metal in that the growth alloy may include constituents not present in the parent metal, but incorporated into the molten alloy during growth.

"Liquid-Phase Oxidant" or "Liquid Oxidant", as used herein, in means an oxidant in which the identified liquid is the sole, predominant or at least a significant oxidizer of the parent or precursor metal under the conditions of the process.

Reference to a liquid oxidant means one which is a liquid under the oxidation reaction conditions. Accordingly, a liquid oxidant may have a solid precursor, such as a salt, which is molten at the oxidation reaction conditions. Alternatively, the liquid oxidant may have a liquid precursor (e.g., a solution of a material) which is used to impregnate part or all of the filler and which is melted or decomposed at the oxidation reaction conditions to provide a suitable oxidant moiety. Examples of liquid oxidants as herein defined include low melting glasses.

If a liquid oxidant is employed in conjunction with the parent metal and a filler, typically, the entire bed of filler, or that portion comprising the desired ceramic body, is impregnated with the oxidant (e.g., by coating or immersion in the oxidant).

"Metal Matrix Composite" or "MMC", as used herein means a material comprising a two- or three-dimensionally interconnected alloy or matrix metal which has embedded a preform or filler material. The matrix metal may include various alloying elements to provide specifically desired mechanical and physical properties in the resulting composite.

A Metal "Different", as used herein, means a metal which does not contain, as a primary constituent, the same metal as the parent metal (e.g., if the primary constituent of the parent metal is aluminum, the "different" metal could have a primary constituent of, for example, nickel).

"Nitrogen-Containing Gas Oxidant", as used herein, means a particular gas or vapor in which nitrogen is the sole, predominant or at least a significant oxidizer of the parent or precursor metal under the conditions existing in the oxidizing environment utilized. The nitrogen could be molecular nitrogen (i.e., $N_2$) or could be contained in a compound such as $NH_3$.

"Oxidant", as used herein, means one or more suitable electron acceptors or electron sharers and may be a solid, a liquid or a gas or some combination of these (e.g., a solid and a gas) at the oxidation reaction conditions. Typical oxidants include, without limitation, oxygen, nitrogen, any halogen or a combination thereof, sulphur, phosphorus, arsenic, carbon, boron, selenium, tellurium, and or compounds and combinations thereof, for example, silica or silicates (as sources of oxygen), methane, ethane, propane, acetylene, ethylene, propylene (the hydrocarbon as a source of carbon), and mixtures such as air, $H_2/H_2O$ and $CO/CO_2$ (as sources of oxygen). The latter two (i.e., $H_2/H_2O$ and $CO/CO_2$) being useful in reducing the oxygen activity of the environment.

"Oxidation", as used herein means a chemical reaction in which an oxidant reacts with a parent metal, and that parent metal has given up electrons to or shared electrons with the oxidant.

"Oxidation Reaction Product", as used herein, means one or more metals in any oxidized state wherein the metal(s) has given up electrons to or shared electrons with another element, compound, or combination thereof. Accordingly, an "oxidation reaction product" under this definition includes the product of the reaction of one or more metals with one or more oxidants.

"Oxygen-Containing Gas Oxidant", as used herein, means a particular gas or vapor in which oxygen is the sole, predominant or at least a significant oxidizer of the parent or precursor metal under the conditions existing in the oxidizing environment utilized.

"Parent Metal", as used herein, means that metal(s) (e.g., aluminum, silicon, titanium, tin and/or zirconium) which is the precursor of a polycrystalline oxidation reaction product and includes that metal(s) as an essentially pure metal, a commercially available metal having impurities and/or alloying constituents therein, or an alloy in which that metal precursor is the major constituent. When a specified metal is mentioned as the parent or precursor metal (e.g., aluminum, etc. ), the metal identified should be read with this definition in mind unless indicated otherwise by the context.

A Metal "Different" from the parent metal means a metal which does not contain, as a primary constituent, the same metal as the parent metal (e.g., if the primary constituent of the parent metal is aluminum, the "different" metal could have a primary constituent of, for example, nickel).

"Preform" or "Permeable Preform", as used herein, means a porous mass of filler or filler material which is manufactured with at least one surface boundary which essentially defines a boundary for growing oxidation reaction product, such mass retaining sufficient shape integrity and green strength to provide dimensional fidelity prior to being infiltrated by the oxidation reaction product and/or parent metal. The mass should be sufficiently porous to allow: (1) the vapor-phase oxidant (if a vapor-phas oxidant is used) to permeate the preform and contact parent metal; and (2) be sufficiently permeable to accommodate development or growth of oxidation reaction product. A preform typically comprises a bonded array or arrangement of filler, either homogeneous or heterogeneous, and may be comprised of any suitable material (e.g., ceramic fibers, whiskers, etc. and/or any metal particulates, powders, fibers, whiskers, etc., and any combination thereof). A preform may exist either singularly or as an assemblage.

"Product Releasers", as used herein, means materials that facilitate the release of the ceramic matrix composite from the parent metal carcass after growth is substantially completed.

"Reactive Filler" means that the filler interacts with molten parent metal (e.g., is reduced by the parent metal and/or oxidation reaction product and thus modifies the composition of the parent metal and/or provides an oxidant for formation of the oxidation reaction product).

"Reservoir", as used herein, means a separate body of parent metal positioned relative to a mass of filler or a preform so that, when the metal is molten, the reservoir may flow to replenish, or in some cases to initially provide and subsequently replenish, that portion, segment or source of parent metal which is in contact with the filler or preform and infiltrating and/or reacting to form the oxidation reaction product. The reservoir may also be used to provide a metal which is different from the parent metal.

"Second or Foreign Metal", as used herein, means any suitable metal, combination of metals, alloys, intermetallic compounds, or sources of either, which is, or is desired to be, incorporated into the metallic component of a formed ceramic composite body in lieu of, in addition to, or in combination with unoxidized constituents of the parent metal. This definition includes intermetallic compounds, alloys, solid solutions or the like formed between the parent metal and a second metal.

"Solid-Phase Oxidant" or "Solid Oxidant", as used herein, means an oxidant in which the identified solid is the sole, predominant or at least a significant oxidizer of the parent or precursor metal under the conditions of the process. When a solid oxidant is employed in conjunction with the parent metal and a filler, it is usually dispersed throughout the entire bed of filler or that portion of the bed into which the oxidation reaction product will grow, the solid oxidant being, for example, particulates admixed with the filler or coatings on the filler particles. Any suitable solid oxidant may be thus employed including elements, such as boron or carbon, or reducible compounds, such as silicon dioxide or certain borides of lower thermodynamic stability than the boride reaction product of the parent metal. For example, when boron or a reducible boride is used as a solid oxidant for an aluminum parent metal, the resulting oxidation reaction product comprises aluminum boride.

In some instances, the oxidation reaction of the parent metal may proceed so rapidly with a solid oxidant that the oxidation reaction product tends to fuse due to the exothermic nature of the process. This occurrence can degrade the microstructural uniformity of the ceramic body. This rapid exothermic reaction can be ameliorated by mixing into the composition relatively inert fillers which absorb the excess heat. An example of such a suitable inert filler is one which is identical, or substantially identical, to the intended oxidation reaction product.

"Vapor-Phase Oxidant", as used herein, means an oxidant which contains or comprises a particular gas or vapor and further means an oxidant in which the identified gas or vapor is the sole, predominant or at least a significant oxidizer of the parent or precursor metal under the conditions obtained in the oxidizing environment utilized. For example, although the major constituent of air is nitrogen, the oxygen content of air is the sole oxidizer for the parent metal because oxygen is a significantly stronger oxidant than nitrogen. Air therefore falls within the definition of an "Oxygen-Containing Gas Oxidant" but not within the definition of a "Nitrogen-Containing Gas Oxidant" (an example of a "nitrogen-containing gas" oxidant is forming gas, which typically contains about 96 volume percent nitrogen and about 4 volume percent hydrogen) as those terms are used herein and in the claims.

"Weight Gain", as used herein, means the percentage weight gain of the ingot/filler combination with respect to the weight of the ingot alone before initiation of the oxidation reaction. The weight gain can therefore be calculated by measuring the weight of the ingot/filler after growth, subtracting the weight of the ingot/filler before growth dividing by the weight of the ingot before growth and multiplied by 100

BRIEF DESCRIPTION OF THE DRAWINGS

FIGS. 2A, 2B, 2C, 2D are graphs showing relative ingot weight gain and relative unit weight gain (as explained below) for a doped aluminum parent metal/filler material assembly treated in accordance with aspects of the present invention;

FIGS. 3A, 3B, 3C and 3D are graphs showing relative weight gains of various aluminum alloys treated in accordance with the present invention to embed in the oxidation reaction product thereof a particulate filler material of low purity;

FIGS. 4A, 4B, 4C and 4D are graphs showing relative ingot weight gain and relative unit weight gain for an aluminum parent metal assembly treated in accordance with the present invention to embed in the oxidation reaction product thereof 325 mesh magnesium aluminate spinel filler material;

FIGS. 5A, 5B, 5C and 5D are graphs showing relative ingot weight gain and relative unit weight gain for an aluminum parent metal assembly treated in accordance with the present invention to embed in the oxidation reaction product thereof 90 mesh, 98% pure SiC filler material;

FIGS. 6A, 6B, 6C and 6D are graphs showing relative ingot weight gain and relative unit weight gain for an aluminum parent metal treated in accordance with the present invention to embed in this oxidation reaction product thereof 90 mesh, 99% pure SiC filler material;

FIG. 26 is a tabular comparison of the x-ray diffraction data produced by the composite growth of Example 42 and the standard XRD data for AlN, Al, $Si_3N_4$, $Si_3N_4$(beta), Si, $AlNi_3$ and $Al_2Si_2Sr$;

DETAILED DESCRIPTION OF THE INVENTION AND PREFERRED EMBODIMENTS THEREOF

Figure 1A:
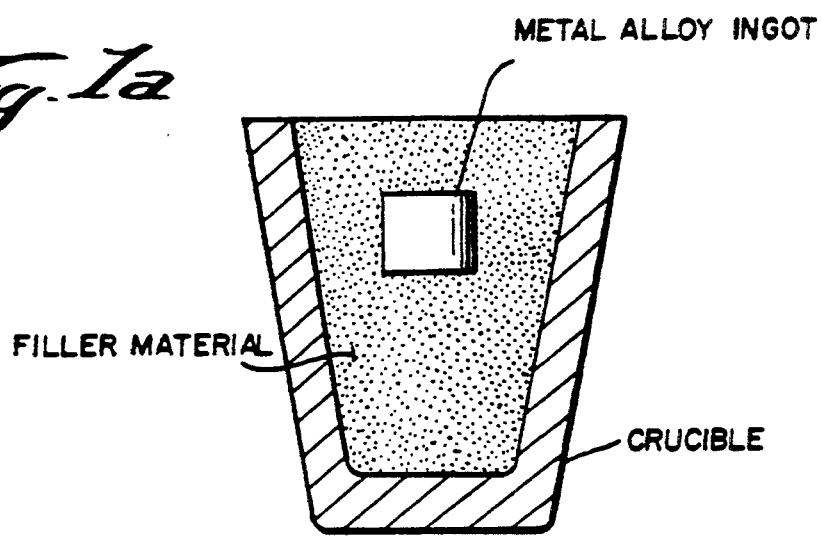
FIG. 1A is a schematic, vertical cross-sectional view showing an assembly of a parent metal ingot surrounded by a particulate filler material and confined within a refractory vessel.

In the practice of the present invention, the parent metal, which, for example, may comprise aluminum, silicon, zirconium, tin or titanium, and a permeable mass of filler material (it is noted that filler material is referred to primarily herein, however, it should be understood that in many instances a "preform" could be used instead of a filler material) are positioned adjacent to each other and oriented with respect to each other so that growth of the oxidation reaction product will be in a direction towards the filler material in order that the filler material, or a part thereof, will be infiltrated by the growing oxidation reaction product and embedded therein. This positioning and orientation of the parent metal and filler material with respect to each other may be accomplished by simply embedding a body of parent metal within a bed of particulate filler material as illustrated in FIG. 1A or by positioning one or more bodies of parent metal within, on or adjacent to a bed or other assembly of filler material. The filler may comprise, for example, a lattice of reinforcing rods, bars, wires, plates, platelets, hollow bodies, a bed of spheres (solid or hollow bubbles), powders or other particulates, aggregate, refractory fiber cloth, wire cloth, steelwool, fibers, tubes, tubules, pellets, whiskers, or the like, or a combination of the foregoing. The assembly is, in any case, arranged so that a direction of growth of the oxidation reaction product will be towards the filler material, and the oxidation reaction product will permeate or engulf at least a portion of the filler material such that void space between filler particles or articles will be filled in by the grown oxidation reaction product matrix.

When one or more dopant materials or dopants are required or desirable to promote or facilitate growth of the oxidation reaction product, the dopant(s) may be used on and/or in the parent metal and, alternatively or in addition, the dopant may be used on, or be provided by, the filler material.

Although the present invention is hereinafter described with a large emphasis on aluminum and specific embodiments of aluminum as the parent metal, this reference is for exemplary purposes only, and it is to be understood that other metals such as silicon, titanium, tin, zirconium, etc., also can be employed which meet, or can be doped to meet, the criteria of the invention.

In the case of employing aluminum or its alloys as the parent metal and an oxygen-containing gas as the oxidant in the process of the present invention, the appropriate amounts of dopants are alloyed into or applied to, etc., the parent metal, as described below in greater detail. The parent metal is then placed in a crucible or other refractory containing with the metal surface exposed to an adjacent or surrounding mass of permeable filler material in said container and in the presence of an oxidizing atmosphere (typically air at ambient atmospheric pressure). The resulting assembly is then heated within a furnace to elevate the temperature thereof into the region typically between about 850° C. to about 1450° C., or more preferably, between about 900° C. to about 1350° C. depending upon the filler material, dopant or the dopant concentrations, or the combination of any of these whereupon the parent metal transport begins to occur through the oxide skin normally protecting the aluminum parent metal.

The continued high temperature exposed of the parent metal to the oxidant allows the continued oxidation of parent metal to form a polycrystalline reaction product layer of increasing thickness. This growing oxidation reaction product progressively impregnates the permeable adjacent filler material with an interconnected oxidation reaction product matrix which also may contain non-oxidized parent metal constituents, thus forming a cohesive composite. The growing polycrystalline matrix impregnates or permeates the filler material at a substantially constant rate (that is, a substantially constant rate of thickness increase over time), provided sufficient air (or oxidizing atmosphere) interchange is allowed in the furnace to keep a relatively constant source of oxidant therein. Interchange of oxidizing atmosphere, in the case of air, can be conveniently provided by vents in the furnace. Growth of the matrix continues until at least one of the following occurs: (1) substantially all of the parent metal is consumed; (2) the oxidizing atmosphere is replaced by non-oxidizing atmosphere, is depleted of oxidant, or evacuated; or (3) the reaction temperature is altered to be substantially outside the reaction temperature envelope, e.g., below the melting point of the parent metal. Usually, the temperature is reduced by lowering the furnace temperature, and then the material is removed from the furnace.

Examples of fillers useful in the invention, depending upon parent metal and oxidation systems chosen, include one or more aluminum oxide, silicon carbide, silicon aluminum oxynitride, zirconium oxide, zirconium boride, titanium nitride, barium titanate, boron nitride, silicon nitride, ferrous alloys, e.g., iron-chromium-aluminum alloy, carbon, aluminum and mixtures thereof. However, any suitable filler may be employed in the invention, and three specific classes of useful fillers may be identified.

The first class of fillers contains those chemical species which, under the temperature and oxidizing conditions of the process, are not volatile, are thermodynamically stable and do not react with or dissolve excessively in the molten parent metal. Numerous materials are known to those skilled in the art as meeting such criteria in the case where aluminum parent metal and air or oxygen as the oxidant are employed. Such materials include the single-metal oxides of: aluminum, $Al_2O_3$; cerium, $CeO_2$; hafnium, $HfO_2$; lanthanum, $La_2O_3$; neodymium, $Nd_2O_3$; praseodymium, various oxides; samarium, $Sm_2O_3$; scandium, $Sc_2O_3$; thorium, $ThO_2$; uranium, $UO_2$; yttrium, $Y_2O_3$; and zirconium, $ZrO_2$. In addition a large number of binary, ternary, and higher order metallic compounds such as magnesium aluminate spinel, $MgO-Al_2O_3$, are contained in this class of stable refractory compounds.

The second class of suitable fillers are those which are not intrinsically stable in the oxidizing and high temperature environment of the process, but which, due to relatively slow kinetics of the degradation reactions, can be incorporated as a filler phase within the growing ceramic body. An example in the case of an alumina ceramic matrix is silicon carbide. This material would oxidize completely under the conditions necessary to oxidize aluminum with oxygen or air in accordance with the invention were it not for a protective layer of silicon oxide forming and covering the silicon carbide particles to limit further oxidation of the silicon carbide.

A third class of suitable fillers are those which are not, on thermodynamic or on kinetic grounds, expected to survive the oxidizing environment or exposure to molten metal necessary for practice of the invention. Such fillers can be made compatible with the process of the present invention (1) if the oxidizing environment is made less active, or (2) through the application of a coating thereto, which makes the species kinetically non-reactive in the oxidizing environment. An example of such a class of fillers would be carbon fiber employed in conjunction with a molten aluminum parent metal. If the aluminum is to be oxidized with air or oxygen at, for example, 1250° C., to generate a matrix incorporating the fiber, the carbon fiber will tend to react with both the aluminum (to form aluminum carbide) and the oxidizing environment (to form CO or $CO_2$). These unwanted reactions may be avoided by coating the carbon fiber (for example, with alumina) to prevent reaction with the parent metal and/or oxidant and optionally employing a $CO/CO_2$ atmosphere as oxidant which tends to be oxidizing to the aluminum but not to the carbon fiber.

A fourth class of filler materials are those which serve to promote the reaction or to produce a particular type of matrix structure. For example, they might serve as catalysts for the formation of the aluminum nitride oxidation reaction product (e.g., $Si_3N_4$), or they might provide nucleation sites for the formation of the aluminum nitride oxidation reaction product thereby increasing the ceramic content of the matrix (e.g., AlN filler).

Mixtures of filler materials can produce improved composites. For example, fine grained AlN powder added to another form of AlN filler provides additional nucleation sites for aluminum nitride formation, and thus results in a higher ceramic matrix content for the composite structure. Adding AlN powder to another filler material, for example, $TiB_2$ filler, also serves to increase the ceramic content of the composite, compared to composites grown into pure $TiB_2$ filler.

By way of explanation of the oxidation process, but not wishing to be bound thereby, the molten metal is transported along channels at certain high energy grain intersections of the oxidation reaction product phase. It is well understood that any polycrystalline material exhibits a range of grain boundary energies (surface free energies) depending upon the degree of lattice misalignment at the interface between two adjacent crystals or grains of the same material. In general, grain boundaries of low angular misalignment exhibit low surface energies, while high angle boundaries have high surface energies, although the relationship may not be a simple, monotonically increasing function of the angle due to the occasional occurrence of more favorable atomic alignments at intermediate angles. Similarly, the lines along which three grains intersect also typically are high energy features in a polycrystalline microstructure.

As further explained in the aforesaid Commonly Owned Ceramic Matrix Patents and Patent Applications, but not wishing to be bound thereby, the parent metal and the oxidant apparently form a favorable polycrystalline oxidation reaction product having a surface free energy relationship with the molten parent metal such that within some portion of a temperature region in which the parent metal is molten, at least some of the grain intersections (i.e., grain boundaries or three-grain-intersections) of said polycrystalline oxidation reaction product are replaced by planar or linear channels of molten metal. For example, consider a grain boundary having a surface free energy greater than the alternative configuration of two substantially geometrically equivalent crystal/molten metal interface boundaries. In these circumstances, such a high energy grain boundary either will not form or will spontaneously decompose in favor of a planar channel of molten metal bounded by two crystal/metal interfaces. When the molten metal is maintained in the oxidizing environment and within the effective portion of the temperature region, molten metal is drawn or transported along such channels in the direction of the oxidant. More specifically, this phenomenon occurs when (1) the liquid metal wets the crystalline oxidation reaction product phase (i.e., $\gamma SL < \gamma SG$, where $\gamma SL$ denotes the surface free energy of the crystal/molten metal interface and $\gamma SG$ denotes the surface free energy of the crystal/vapor interface), and (2) the energy of some of the grain boundaries, $\gamma B$, is greater than twice the crystal/liquid metal interfacial energy, i.e., $\gamma BMAX > 2\gamma SL$ where $\gamma BMAX$ is the maximum grain boundary energy of the polycrystalline material. Molten metal channels of linear character can be formed in a similar way if metal replaces some or all of the three-grain-intersections in the material.

Since the channels are at least partially interconnected, (i.e., the grain boundaries of the polycrystalline material are interconnected), molten metal is transported through the polycrystalline oxidation reaction product to its surface into contact with the oxidizing atmosphere, where the metal undergoes oxidation resulting in the continual growth of the oxidation reaction product. Furthermore, since the wicking of molten metal along channels is a much faster transport process than the ionic conduction mechanisms of most normal oxidation phenomena, the growth rate observed for the oxidation reaction product with this oxidation process is much faster than that typically observed in other oxidation phenomena.

While the oxidation reaction product of the present invention is interpenetrated by metal along high energy grain intersections, the polycrystalline reaction product phase is itself interconnected in one or more dimensions, preferably in three dimensions, along relatively low angle grain boundaries which do not meet the criterion $\gamma B > 2\gamma SL$. Thus, the product of this invention exhibits many of the desirable properties of the classical ceramic (i.e., hardness, refractoriness, wear resistance, etc.) while deriving additional benefits from the presence of the distributed metal phase (notably higher toughness and resistance to fracture).

In another aspect of the invention, there is provided a self-supporting ceramic composite comprising a ceramic matrix and filler material incorporated within the matrix. The matrix, which may be obtained by oxidation of a molten parent metal with a vapor-phase oxidant to form a polycrystalline oxidation reaction product, is characterized by an essentially single phase polycrystalline oxidation reaction product and distributed metal or voids or both, and by crystal lattice misalignments at oxidation reaction product crystallite grain boundaries less than the lattice misalignments between those neighboring oxidation reaction product crystallites having planar metal channels or planar voids, or both, disposed between said neighboring crystallites. In certain embodiments, substantially all of the grain boundaries in said oxidation reaction product phase have an angular mismatch between adjacent crystal lattices of less than about 5 degrees.

Certain parent metals under specific conditions of temperature and oxidizing atmosphere meet the criteria necessary for the oxidation phenomenon of the present invention with no special additions or modifications. However, as described in the aforesaid Commonly Owned Ceramic Matrix Patents Patent Applications, dopant materials used in combination with the parent metal can favorably influence or promote the oxidation reaction process. While not wishing to be bound by any particular theory or explanation of the function of the dopants, it appears that some of them are useful in those cases where appropriate surface energy relationships between the parent metal and its oxidation reaction product do not intrinsically exist. Thus, certain dopants or combinations of dopants, which reduce the solid-liquid interfacial energy, will tend to promote or accelerate the development of the polycrystalline structure formed upon oxidation of the metal into one containing channels for molten metal transport, as required for the new process. Another function of the dopant materials may be to initiate the ceramic growth phenomenon, apparently either by serving as a nucleating agent for the formation of stable oxidation product crystallites, or by disrupting an initially passive oxidation product layer in some fashion, or both. This latter class of dopants may not be necessary to create the ceramic growth phenomenon of the present invention, but such dopants may be important in reducing any incubation period for the initiation of such growth to within commercially practical limits for certain parent metal systems. Still another function of dopants may be to control the rate of formation of oxidation reaction product. For example, certain dopants may be required in addition to the dopants to accelerate or decelerate the rate of reaction, thus improving, for example, morphology and/or uniformity of the product. Those dopants may assist in obtaining net or near net shapes.

The function or functions of the dopant material can depend upon a number of factors other than the dopant material itself. These factors include, for example, the particular parent metal, the end product desired, the particular combination of dopants when two or more dopants are used, the use of an externally applied dopant in combination with an alloyed dopant, the concentration of the dopant, the oxidizing environment, and the process conditions.

The dopant or dopants (1) may be provided as alloying constituents of the parent metal, (2) may be applied to at least a portion of the surface of the parent metal, or (3) may be applied to or supplied by the filler or a part of the filler bed, or any combination of two or more techniques (1), (2) and (3) may be employed. For example, an alloyed dopant may be used in combination with an externally applied dopant. In the case of technique (3), where a dopant or dopants are applied to the filler, the application may be accomplished in any suitable manner, such as by dispersing the dopants throughout part or the entire mass of filler in fine-droplet or particulate form, preferably in a portion of the bed of filler adjacent the parent metal. Application of any of the dopants to the filler may also be accomplished by applying a layer of one or more dopant materials to and within the bed, including any of its internal openings, interstices, passageways, intervening spaces, or the like, that render it permeable. A source of the dopant may also be provided by placing a rigid body containing the dopant in contact with and between at least a portion of the parent metal surface and the filler bed. For example, if a silicon dopant is required, a thin sheet of silicon-containing glass or other material can be placed upon a surface of the parent metal onto which a second dopant had been previously applied. When the parent metal overlaid with the silicon-containing material is melted in an oxidizing environment (e.g., in the case of aluminum in air, between about 850° C. to about 1450° C., preferably about 900° C. to about 1350° C.), growth of the polycrystalline ceramic material into the permeable filler occurs. In the case where the dopant is externally applied to at least a portion of the surface of the parent metal, the polycrystalline oxide structure generally grows within the permeable filler substantially beyond the dopant layer (i.e., to beyond the depth of the applied dopant layer). In any case, one or more of the dopants may be externally applied to the parent metal surface and/or to the permeable bed of filler. Additionally, dopants alloyed within the parent metal and/or externally applied to the parent metal may be augmented by dopant(s) applied to the filler bed. Thus, any concentration deficiencies of the dopants alloyed within the parent metal may be augmented by additional concentration of the respective dopant(s) applied to the bed, and vice versa.

Useful dopants for an aluminum parent metal, particularly with air as the oxidant, include, for example, magnesium metal and zinc metal, in combination with each other or in combination with other dopants described below. These metals, or a suitable source of the metals, may be alloyed into the aluminum-based parent metal at concentrations for each of between about 0.1-10% by weight based on the total weight of the resulting doped metal. The concentration range for any one dopant will depend on such factors as the combination of dopants and the process temperature. Concentrations within this range appear to initiate the ceramic growth, enhance metal transport and favorably influence the growth morphology of the resulting oxidation reaction product.

Other dopants which are effective in promoting polycrystalline oxidation reaction product growth, for aluminum-based parent metal systems are, for example, silicon, germanium, tin and lead, especially when used in combination with magnesium or zinc. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1-10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying materials to be added at a lower temperature.

One or more dopants may be used depending upon the circumstances, as explained above. For example, in the case of an aluminum parent metal and with air as the oxidant, particularly useful combinations of dopants include (a) magnesium and silicon or (b) magnesium, zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Additional examples of dopant materials, useful with an aluminum parent metal, include sodium, lithium, calcium, boron, phosphorus, yttrium, barium, strontium, zirconium, gallium, lanthanum, titanium, chromium, cerium and nickel, which may be used individually or in combination with one or more other dopants depending on the oxidant and process conditions. Sodium and lithium may be used in very small amounts in the parts per million range, typically about 100–200 parts per million, and each may be used alone or together, or in combination with other dopant(s). Rare earth elements such as cerium, lanthanum, praseodymium, neodymium and samarium are also useful dopants, and herein again especially when used in combination with other dopants. The precise formation of the dopant(s) may vary depending upon which process conditions are used, which parent metal is used, which oxidant is used, other dopants that may be present, etc. Thus, it is possible that in some cases, for example, one dopant may tend to initiate growth, but in another case the dopant may tend to control the rate of formation of oxidation reaction product. Thus, it may be difficult to categorize completely the formation of any one particular dopant.

In the aluminum nitride system, particularly successful dopants for achieving growth of aluminum nitride oxidation reaction product include strontium, calcium, magnesium, cerium, lanthanum, gallium, barium and lithium. Desirable weight percents for these dopants range from about 0.1 percent by weight to about 15 percent by weight. Stated more specifically, particularly successful dopants include strontium and calcium at concentrations of from about 1 to about 7 percent by weight; lithium at concentrations of about 2–5 percent by weight; barium at concentrations of about 1–2 percent by weight; magnesium at concentrations of from about 3-6 percent by weight; cerium and lanthanum at concentrations of from about 1-5 percent by weight; and gallium at concentrations of from about 2-4 percent by weight.

As stated previously, the amount of type of dopants needed to formulate an aluminum nitride oxidation reaction product varies widely depending upon, for example, the processing conditions, the filler material, the temperature, etc. However, generally stated, an aluminum nitride oxidation reaction product can be grown at temperatures ranging from about 700° to about 1200° C. in an atmosphere containing substantially pure nitrogen, or nitrogenous atmosphere in which other non-oxidizing gases, such as hydrogen, or argon, for example, are contained.

Moreover, as stated previously, the use of additional dopant materials may be desirable to control the rate of formation of oxidation reaction product. Specifically, dopants such as silicon, germanium, magnesium and boron have proven to be useful when combined with the other dopants recited above for the growth of aluminum nitride oxidation reaction product. For example, when at least one of the dopants of strontium, calcium or lithium is utilized, it has been found that silicon concentrations ranging generally from about 0.25-5 percent by weight in combination with strontium, calcium or lithium provide for desirable aluminum nitride oxidation reaction product growth. However, a higher silicon concentration may be desirable if particular filler materials are utilized. For example, for growth of aluminum nitride into a silicon carbide filler with the use of at least one of strontium, calcium or lithium, it has been discovered that the silicon content of the second dopant is preferably within the range of 10-15 percent by weight. It has also been found that when strontium is used as a dopant, germanium functions to improve the morphology and/or uniformity of the aluminum nitride oxidation reaction product. However, as discussed above, many factors influence precise amounts and types of dopants which can successfully be combined to grow aluminum nitride oxidation reaction products.

Still further, it has been discovered that additional dopants can be utilized to modify the microstructure of the formed aluminum nitride oxidation reaction product. Specifically, dopants including nickel, iron, cobalt, titanium, copper, zinc, yttrium and zirconium at concentrations of from about 1-15 percent by weight have desirably modified the microstructure of an aluminum nitride oxidation reaction product. Specifically nickel at concentrations of from about 1-12 percent by weight; iron at concentrations of from about 1-9 percent by weight; and cobalt at similar concentrations have all produced desirable results.

Filler materials which have been found to be useful for the production of aluminum nitride ceramic matrix composite materials include AlN, TiN, BN, $Si_3N_4$, $Al_2O_3$, MgO, $ZrO_2$, alumino-silicate, $CaSiO_3$, SiC, $B_4C$, $TiB_2$ and mixtures of these compounds. Some of these filler materials, such as AlN and $TiB_2$ may be thermodynamically stable under the oxidation reaction formation conditions. However, others such as $Si_3N_4$, $B_4C$, BN, etc. may react, at least partially, with the oxidation reaction product and/or parent metal, and such reaction may have little or no effect upon the growing oxidation reaction product or may have a desirable effect.

For example, some filler materials may be active or reactive. Specific examples of an active filler material include $Si_3N_4$ and AlN. Specifically, these filler materials may serve as catalyst for the formation of aluminum nitride oxidation reaction product and/or may provide nucleation sites for the formation of aluminum nitride oxidation reaction product and thus, may increase the amount of ceramic content formed in the composite body. Further, such fillers may also promote particular crystalline orientations and morphology that may improve the properties of the composite body for particular industrial applications.

Still further, mixtures of filler materials may also result in desirable improvements in a ceramic composite body. Specifically, for example, fine grained aluminum nitride powder when added to another form of aluminum nitride filler could result in a substantial additional number of nucleation sites for the formation of aluminum nitride. Similarly, the addition of AlN powder to a filler material of different composition may also serve to increase the content of the composite, as compared to a composite which does not contain any AlN powdered filler material.

Methods of initiating the formation of oxidation reaction product may also be important. For example, in some cases the grooving of a parent metal alloy prior to melting thereof, tends to assist in the infiltration or beginning of growth of oxidation reaction product. Alternatively, the placement of another material upon the surface of the parent metal alloy may also assist in the initiation or beginning of growth of oxidation reaction product. For example, in the case of growing aluminum nitride oxidation reaction product, materials such as nickel powder, nickel aluminides, magnesium powder, aluminum powder, silicon nitride powder, zirconium powder, iron powder, nickel-chromium-aluminum powder, mixtures of oxide powders such as alumina and nickel aluminate spinel, silicon, chromium, chromium-nickel, silicon carbide and alumina have shown all, under certain conditions, to assist in the beginning or promotion of growth of aluminum nitride oxidation reaction product. These same materials may also assist in releasing the aluminum nitride oxidation reaction product matrix composite body from any parent metal carcass which may remain.

As noted above, it is not necessary to alloy any dopant material into the parent metal. For example, selectively applying one or more dopant materials in a thin layer to either all, or a portion of, the surface of the parent metal enables local ceramic growth from the parent metal surface or portions thereof and lends itself to growth of the polycrystalline ceramic material into the permeable filler in selected areas. Thus, growth of the polycrystalline ceramic material into the permeable bed can be controlled by the localized placement of the dopant material upon the parent metal surface. The applied coating or layer of dopant is thin relative to the thickness of the parent metal body, and growth or formation of the oxidation reaction product into the permeable bed extends to substantially beyond the dopant layer, i.e., to beyond the depth of the applied dopant layer. Such layer of dopant material may be applied by painting, dipping, silk screening, evaporating, or otherwise applying the dopant material in liquid or paste form, or by sputtering, or by simply depositing a layer of a solid particulate dopant or a solid thin sheet or film of dopant onto the surface of the parent metal. The dopant material may, but need not, include either organic or inorganic binders, vehicles, solvents, and/or thickeners. More preferably, the dopant materials are applied as powders to the surface of the parent metal or dispersed through at least a portion of the filler. One particularly preferred method of applying the dopants to the parent metal surface is to utilize a liquid suspension of the dopants in a water/organic binder mixture sprayed onto a parent metal surface in order to obtain an adherent coating which facilitates handling of the doped parent metal prior to processing.

The dopant materials when used externally are usually applied to a portion of a surface of the parent metal as a uniform coating thereon. The quantity of dopant is effective over a wide range relative to the amount of parent metal to which it is applied and, in the case of aluminum, experiments have failed to identify either upper or lower operable limits. For example, when utilizing silicon in the form of silicon dioxide externally applied as the dopant for an aluminum-based parent metal using air or oxygen as the oxidant, quantities as low as 0.0001 gram of silicon per gram of parent metal together with a second dopant providing a source of magnesium and/or zinc produce the polycrystalline ceramic growth phenomenon. It also has been found that a ceramic structure is achievable from an aluminum-based parent metal using air or oxygen as the oxidant by using MgO as the dopant in an amount greater than 0.0005 gram of dopant per gram of parent metal to be oxidized and greater than 0.005 gram of dopant per square centimeter of parent metal surface upon which the MgO is applied. It appears that to some degree an increase in the quantity of dopant materials will decrease the reaction time necessary to produce the ceramic composite, but this will depend upon such factors as type of dopant, the parent metal and the reaction conditions.

Another important feature of this invention is the ability to influence and control the microstructure and properties of the resultant ceramic matrix by modifying the process conditions. Thus, for example, maintaining process conditions which apparently decrease the solid-liquid interfacial energy relative to the range of grain boundary energies in the oxidation reaction product will produce a structure which contains an increased amount of metal and a reduced degree of interconnectivity of the oxidation reaction product, whereas, a change of relative surface energies in the opposite direction produces a more interconnected oxidation reaction product with less metal phase, i.e., fewer metal transport channels are formed. Such changes may be effected, for example, by changing the nature or concentration of the dopant or by changing the oxidizing environment (temperature and atmosphere). As a consequence of this process feature, the properties of the resultant material can be tailored to a relatively high degree from properties approaching those of a pure ceramic to properties (such as toughness and electrical conductivity) which are highly influenced by the presence of 25 to 30 percent by volume or more of the metal phase.

Where the parent metal is aluminum internally doped with magnesium and the oxidizing medium is air or oxygen, it has been observed that magnesium is at least partially oxidized out of the alloy at temperatures of from about 820° to 950° C. In such instances of magnesium-doped systems, the magnesium forms a magnesium oxide and/or magnesium aluminate spinel phase at the surface of the molten aluminum alloy and during the growth process such magnesium compounds remain primarily at the initial oxide surface of the parent metal alloy (i.e., the "initiation surface") in the growing ceramic structure. Thus, in such magnesium-doped systems, an aluminum oxide-based structure is produced apart from the relatively thin layer of magnesium aluminate spinel at the initiation surface. Where desired, this initiation surface can be readily removed as by grinding, machining, polishing or grit blasting.

Non-functional alloy constituents in the parent metal, especially those which exhibit a less negative free energy of formation for their oxides, are often innocuous and tend to become concentrated in the remaining metallic inclusion phases. For example, in the case of aluminum parent metal, minor amounts of manganese, iron, copper, tungsten and other metals are common alloy impurities in commercial grades of aluminum which are compatible and do not interfere with the growth mechanism of a ceramic structure by the process of the present invention.

Figure 5E:
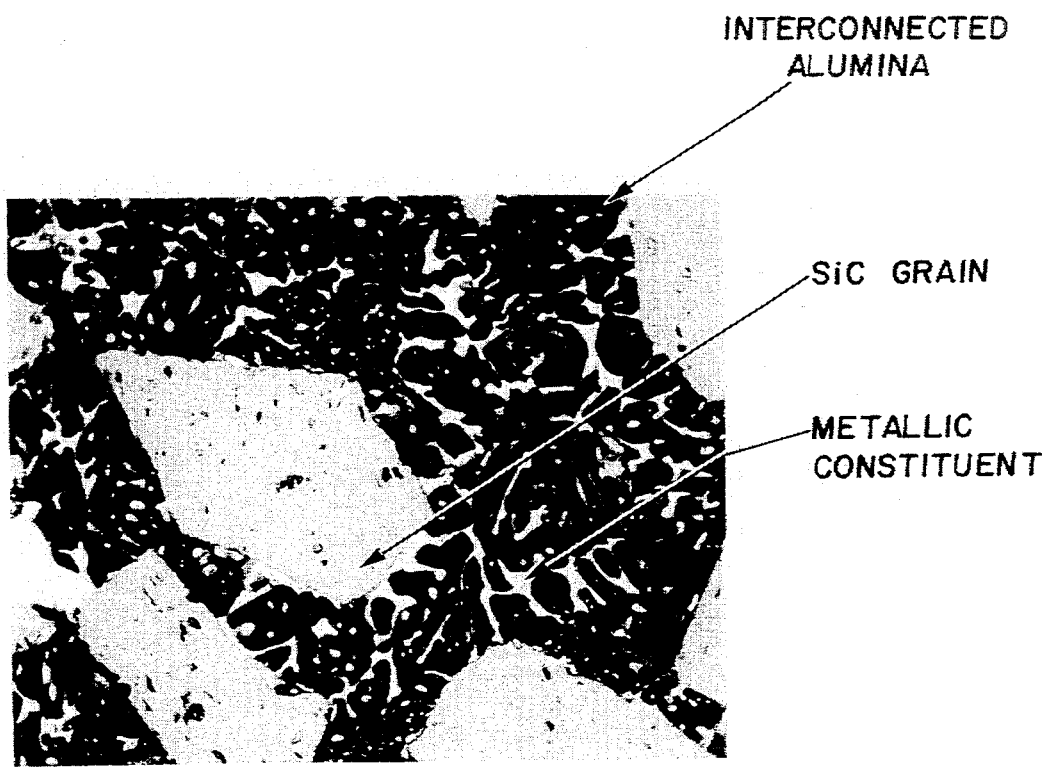
FIG. 5E is a photomicrograph taken at 400× magnification of a ceramic composite structure produced in accordance with Example 5 of this specification.

From the photomicrograph of a cross-section of an alumina ceramic matrix product of FIG. 5E, it will be observed that the interface boundaries between the oxidation reaction product and the metallic phases are substantially arcuate and they weave or form a tortuous microstructure through the network. This microstructure also has been observed when voids were formed in place of metal. In ceramic matrix composite materials of the prior art, when the skeleton of the matrix is a single phase, the interfaces between matrix crystallites and voids are substantially faceted, that is, more angular and ragged. A ceramic product having a predominance of arcuate or rounded interface boundaries, as in the product of the present invention, may be particularly advantageous for certain applications because one would expect a lower degree of stress concentration and a lower elastic modulus than from a typical interconnected structure that did not have this type of arcuate structure. In certain embodiments, the ceramic composite products of the present invention have an essentially single phase, interconnected, ceramic matrix skeletal structure wherein the grain boundaries at the interconnection of the crystallites composite in the skeletal structure have no other phase present. The formation of such ceramic composite products with clean grain boundaries by sintering is either difficult or impossible because impurities tend to be deposited at grain boundaries in a sintering process. Such impurities may be present either unintentionally or as deliberate additions to promote sintering or to restrict grain growth during high temperature processing. Further, clean grain boundaries in the matrix skeletal structure of a product of this character are significant because they afford superior properties such as high temperature strength retention and creep resistance.

In another embodiment, the ceramic composite of this invention is a dense, coherent body having between about 5% and about 98% by volume relative to the total volume of composite of one or more of the filler materials within a ceramic matrix. The ceramic matrix, based on its total weight, will be comprised of about 60% to about 99% by weight of interconnected aluminum oxide or aluminum nitride and about 1% to about 40% by weight of an aluminum-containing metallic constituent and which will additionally have less than about 30% by weight, preferably less than 10%, of magnesium aluminate spinel as an initiation surface.

In another aspect of the invention there is provided a composite consisting of (a) one single phase, three-dimensionally interconnected ceramic matrix of a nitride, (b) one or more metallic constituents and, optionally, voids dispersed and/or extending through the matrix, and (c) one or more fillers embedded by the matrix. Examples are given hereafter in the case of aluminum nitride, zirconium nitride, titanium nitride and silicon nitride matrix composites. Such composites are unique and tend to be advantageous due to their combined mechanical, thermal and electrical properties.

The following examples illustrate the practice of certain aspects of the invention. In many of the examples involving the formation of aluminum oxide and aluminum nitride ceramic matrices, the oxidation reaction was observed to proceed at a moderate rate, such that there was no noticeable temperature increase arising from the exothermic nature of the reaction. For some of the other matrix systems described, the oxidation reaction tended to be faster, such that transient heating of the experimental assembly above the furnace setpoint temperature was commonly observed.

EXAMPLE 1

To examine the effect of growth of an oxidation reaction product of the present invention through a volume of filler material comprising alumina particulate matter, selected aluminum alloys containing a range of the internal dopants magnesium and/or silicon were processed at setpoint temperatures ranging from 1100° to 1400° C. with air as the oxidant starting with the aluminum alloys fully buried within a bed of particulate alumina grain filler material.

In each trial, a cylindrical alloy specimen one inch in diameter and seven-eighths inch long was cut from an ingot which had been cast from a melt prepared at 800°–900° C. The ingot was placed vertically onto a layer of 90 mesh, industrial purity, 99.5% pure aluminum oxide abrasive grain (Norton Co., 38 Alundum) contained within a suitable refractory crucible, and was subsequently covered with the same material on all sides to a thickness of roughly one quarter to one-half inch. FIG. 1A schematically shows the parent metal ingot fully embedded within the particulate filler material which, with the ingot, is contained within the refractory crucible.

For each trial, six of the assemblies using a variety of dopant concentrations were processed together in one furnace. The furnaces allowed the entry of ambient air through natural convection and diffusion through random openings in the furnace walls, as is intrinsic to conventional laboratory furnace design, as well as through a ¼ inch vent hole in the furnace door. The nominal furnace cycle allowed five hours for the furnace to reach the setpoint, eighty hours processing at the setpoint temperature, and five hours for the furnace to cool below 600° C., after which the samples were removed from the processing environment. A ceramic matrix was found to have permeated some of the alumina filler particles to produce a cohesive composite.

Figure 1B:
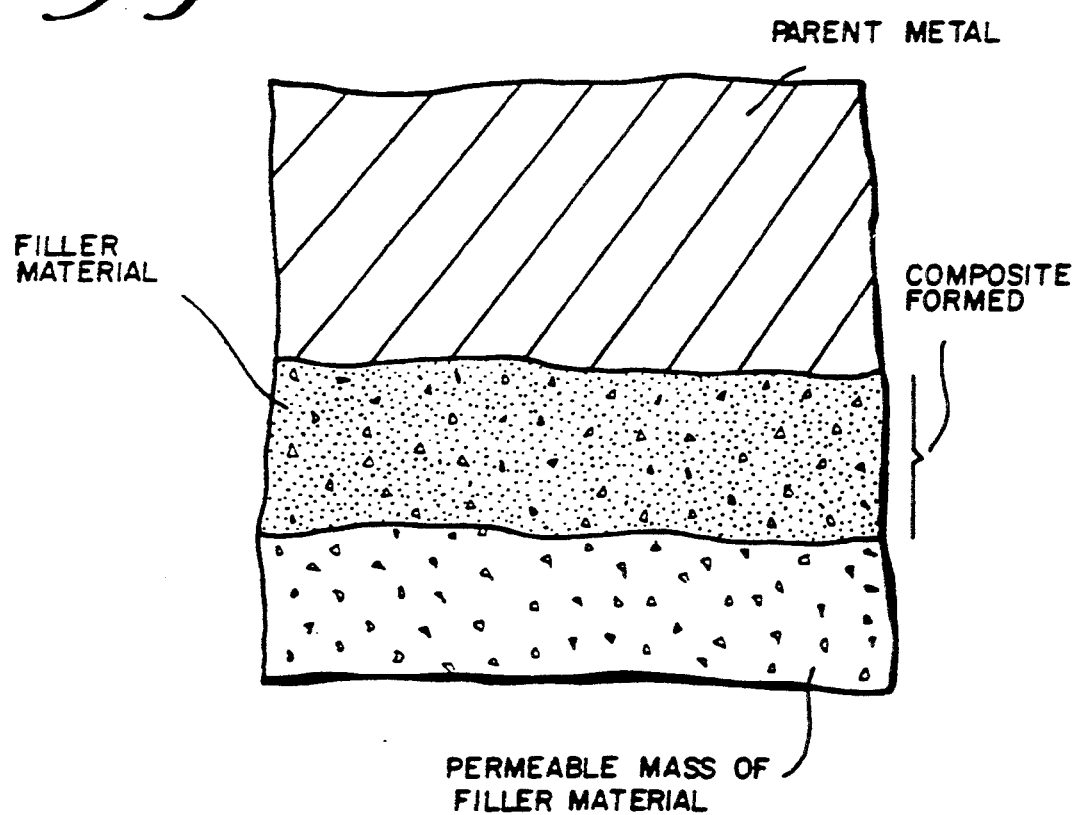
FIG. 1B is a schematic view on an enlarged scale of a portion of the assembly of FIG. 1A after permeation of a portion of the filler material by oxidation reaction product of the parent metal.

FIG. 1B shows in cross-section a schematic view of what is believed to be the status of the oxidation reaction product growth region of FIG. 1A after some elapsed time under processing conditions (for example, half of the time required for completion), showing formation of the oxidation reaction product to provide the resultant polycrystalline matrix growth permeating and embedding the neighboring particulate filler as the oxidation reaction consumes molten parent metal from the available supply.

A group of four weight measurements was taken for each test, as follows: (1) the initial weight of the aluminum parent metal ingot ("Wi"); (2) the weight of the crucible and its entire load (particulate bed plus parent metal ingots) prior to processing ("Wc"); (3) the weight of the crucible and its entire load after processing ("Wc/a"); and (4) the weight of the remaining parent metal ingot and firm ceramic composite structure, including any unoxidized constituents thereof, after processing ("Wi/a"). Using these data a unit weight gain ("UWG") is calculated as the ratio of the change in weight of the crucible plus its entire load due to the furnace cycle processing, to the original weight of the parent metal ingot. Stated otherwise, the unit weight gain ("UWG") is equal to (the final weight of the assembly minus the initial weight of the assembly) divided by (the initial weight of the parent metal ingot). The foregoing relationship may also be expressed as the formula $$UWG = \frac{Wc/a - Wc}{Wi}$$

The unit weight gain can theoretically be as high as 0.89, which is equivalent to complete conversion of the aluminum to $Al_2O_3$. Shortfalls below 0.89 are attributable essentially to non-oxidized aluminum alloy parent metal or non-oxidized constituents thereof.

A second quantity derived from these data for the various samples was ingot weight gain ("IWG"), which refers to the ratio of (a) the weight of the remaining parent metal ingot and firm ceramic composite structure, including any non-oxidized constituents thereof, after processing and removal from the crucible ("Wi/a"), minus the initial weight of the parent metal ingot ("Wi"), to (b) the initial weight of the aluminum parent metal ingot ("Wi"). Stated otherwise, the ingot weight gain (IWG) equals (the final weight of the ceramic composite structure and any non-oxidized parent metal constituents, minus the initial weight of the parent metal ingot) divided by (the initial weight of parent metal ingot). The foregoing relationship may also be expressed as the formula $$IWG = \frac{Wi/a - Wi}{Wi}$$

When the ingot weight gain ("IWG") is significantly larger than the unit weight gain ("UWG"), e.g., in the range from 1 to 2.5 or greater, significant weight increase due to embedment of filler material into the predominantly ceramic polycrystalline material is demonstrated.

In the reported data, corrections were not made for items such as removal of volatiles from the refractory materials, reaction of the filler material with the oxidizing atmosphere, or other such factors. Some materials obtained in the tests were evaluated by procedures including visual inspection and cross-sectioning and mechanical measurements on selected samples to verify the nature of the composite body.

The unit weight gain and ingot weight gain at selected furnace setpoint temperatures for a series of aluminum alloys oxidized for an 80-hour heating period to grow the polycrystalline material into a bed of alumina filler material as described above with respect to FIGS. 1A and 1B are shown graphically in FIGS. 2A–2D. In this and all similar Figures, the x/y notation in the Figure key gives the nominal dopant concentration, where x is the silicon concentration and y is the magnesium concentration, both in weight percent of the total weight of parent metal. The results indicate that rapid formation of ceramic composite structures occurs primarily within the temperature range of 1100°–1400° C. for aluminum parent metal using these particular dopants and air as the oxidant. In addition, comparisons among the curves of FIGS. 2A–2D illustrate the beneficial effect of a binary doping system for aluminum-based parent metals using an oxygen-based gaseous oxidant, and demonstrate that the effective temperature range can be extended by appropriate selection of dopant material concentrations.

As further tests below will show, the ceramic composite structures resulting from the practice of the present invention show novel combinations of mechanical, electrical, thermal and other properties such as strength, hardness, toughness, and conductivity, combining the properties of the filler material and the polycrystalline matrix material. The measured properties of the ceramic composite structures were determined by the following tests. The modulus of rupture ("MOR") was determined by testing a sample rectangular strip of material measuring 0.375 inch in width ("w") and 0.125 inch in depth ("d") and over one inch in length. The test strip is positioned in a test machine with its 0.375 inch wide surfaces disposed horizontally and its 0.125 inch deep surfaces disposed vertically. The test machine imposes, by means of a ¼ inch diameter cylindrical anvil rod, an upwardly directed force in the bottom, 0.375 inch wide surface of the test strip and provides a pair of resistance points to the upwardly moving force on the top 0.375 inch wide surface of the test strip. The resistance points are one inch apart along the length of the test strip and centered on the location of the anvil rod providing the upwardly directed force. If F is the magnitude of the upwardly acting force in pounds of force, the modulus of rupture ("MOR") in pounds per square inch is calculated by the formula $$MOR = \frac{3 Fl}{2 W d^{12}}$$

where "w" and "d" are as above and "l" is the length in inches along the test strip between the points of resistance to the upwardly acting force. The sample test strip is ground prior to testing with a Blanchard-type grinder using a 50 grit diamond wheel and the anvil rod is applied to the test strip at a crosshead speed of 0.002 inches per minute.

The erosion rate of the ceramic composite structures produced in accordance with the invention was determined by a test using an Airbrasive jet machining unit, Model-H, made by S. S. White Industrial Products. A jet of 50-micron size alumina particles (S. S. White #3) propelled by air was impinged on a flat surface of a sample plate of the ceramic composite structure at two different test angles, one of 90° (i.e., perpendicularly to the test surface) and one of 30°, for periods of, respectively, 2 minutes at the 90° impingement angle and 4 minutes at the 30° impingement angle. The 90° and 30° tests were carried out at different locations on the sample and the depths of the two craters resulting from the tests were measured with a dial indicator depth gauge. In all tests, the following parameters were used: the distance between the sample surface (original) and the jet nozzle was 0.625 inch; the air pressure of the jet was 80 psig and the air flow rate was 0.4 standard cubic feet per minute; the nozzle bore diameter was 0.026 inch. The powder flow rate was that which, in a calibration test using the above-stated parameters, gives a crater depth of 0.056+0.004 inch on a Coors AD 998 alumina test sample at the 90° impingement angle (for 2 minutes) and a crater depth of 0.029 inch at the 30° impingement angle (for 4 minutes). Coors AD 998 alumina is a 99.8% pure aluminum oxide material.

Measurements of the corrosion rates of the ceramic composite structures of the invention were carried out by separate tests comprising immersing sample plates of the material in 10% reagent grade hydrochloric acid solution or in 10% reagent grade sulfuric acid solution at room temperature. In each case, the test samples were periodically removed from the acid solution, rinsed, dried, weighed and returned to the acid bath. The weight loss in grams per square centimeter of total exposed surface of the samples for varying times of immersion was compared to corresponding weight losses of a Coors AD 998 alumina sample.

For ceramic composite structures produced at 1250° C. from an aluminum alloy containing 10% silicon and 3% magnesium where the filler material is alumina particles as described in this Example 1, modulus of rupture valves in excess of 25,000 pounds per square inch have been measured by the above-described modulus of rupture test, a macrohardness of 83 has been measured on the Rockwell A scale, erosion rates two to three times lower than that of standard 99.8% pure, dense alumina plates (Coors AD 998) have been measured by the above-described grit-blasting erosion test, and corrosion rates in 10% HCl and 10% $H_2SO_4$ which were roughly identical to that of standard (Coors AD 998) alumina plates were measured by the corrosion test described above.

EXAMPLE 2

To examine the effect of growth of the ceramic material of the present invention into a volume containing alumina particulate matter of small particle size, a sample plate of aluminum/magnesium/silicon alloy one-half inch thick by nine inches long by two inches wide and containing 10% by weight of silicon and 3% by weight of magnesium as dopants was cast from an 850° C. melt. This aluminum alloy parent metal bar was placed horizontally upon a layer of commercially pure alumina of roughly six micron particle size (Norton Co., E67 alumina, 1000 mesh) and was subsequently covered with the same material to a depth of approximately one-half inch. The alumina-covered bar was placed into an air atmosphere furnace identical to that used in Example 1 and was processed for 72 hours at a setpoint temperature of 1250° C. after allowing an initial five hour period for the furnace to reach the setpoint temperature. After the 72 hour heating period, five additional hours were allowed for the sample to cool below 600° C., after which the sample was removed from the furnace. The unit weight gain was 0.72 and the ingot weight gain was 1.24. A sample bar ⅛ inch by ⅜ inch by 1¼ inch was cut from the resulting ceramic composite structure and measured to have a breaking strength of 30,000 pounds per square inch as measured by a modulus of rupture test and a hardness of 85.7 using the Rockwell-A scale. These data indicate a strong, hard composite material of utility as a structural ceramic, with properties in this respect superior to those of composites formed from the larger particulate filler material of Example 1.

EXAMPLE 3

To examine the effect of growth of a predominantly ceramic polycrystalline material of the present invention into a volume of filler material comprising alumina particulate material of lower purity than that of Example 1, a series of aluminum alloy parent metal ingots containing various amounts of silicon and/or magnesium dopants were embedded in a 90 mesh industrial abrasive grain material of roughly 95% alumina, 3% titania, 1% silica, and 1% of other impurities (Norton Co., El Alundum) and processed at various setpoint temperatures in the range of from 1100° to 1325° C. in a manner otherwise identical to that of Example 1. Unit weight gains and ingot weight gains for these tests are shown in FIGS. 3A-3D. At a processing temperature of 1250° C., for those parent metals containing both dopants, unit weight gains were on the order of 0.5 to 0.75, with ingot weight gains as high as 2.4 to 2.6, indicating a tolerance of the process for the various contaminants present in the filler material. The weight gain for the product obtained at or above a 1300° C. setpoint temperature was significantly lower than that obtained for a setpoint in the range 1200°-1250° C. Where ingot weight gains were large (e.g., greater than unity), the result was a composite comprised of an alpha-alumina based matrix containing particles of the abrasive grade alumina filler.

EXAMPLE 4

These tests were carried out to examine the effect of growth of predominantly ceramic polycrystalline material of the present invention into a volume of filler material comprising a particulate binary metal oxide thought to be thermodynamically stable or nearly stable under process conditions. Samples of parent metal aluminum alloys containing silicon and/or magnesium dopants alloyed therein were embedded in 325 mesh magnesium aluminate spinel and processed in a manner identical to that of Example 1, but utilizing a 94 hour heating period at various setpoints ranging from 1025° C. to 1500° C. Resulting weight gain data, indicating a range of growth temperatures at least to 1500° C., are shown in FIGS. 4A-4D. In this case the alloy containing no intentionally alloyed magnesium dopant produced significant formation of the predominantly ceramic polycrystalline matrix material of the present invention, hence indicating the efficacy of external doping with an oxide of magnesium (in this case $MgAl_2O_4$) in lieu of internal alloying of this dopant. In other words, the filler also served as a dopant. The resulting cohesive composite showed a matrix of the alpha-alumina growth together with non-oxidized constituents of the parent metal, incorporating grains of the spinel filler.

EXAMPLE 5

Additional tests were conducted to examine the effect of growth of the predominantly ceramic polycrystalline material of the present invention into a volume of filler material comprising silicon carbide which is a hard, refractory, electrically and thermally conductive material not thermodynamically stable under the aluminum parent metal oxidation conditions of this invention. Selected aluminum alloys with a range of the internal dopants magnesium and/or silicon alloyed therein were embedded in particles of 90 mesh, industrial purity, 98% pure SiC abrasive grain (Norton Co., 37 Crystolon) and processed in a manner identical with that of Example 1, with the exception that a 48 hour heating period at the furnace setpoint temperature was used. The resulting unit and ingot weight gain data are shown graphically in FIGS. 5A-5D. At the highest temperatures employed, a fraction of the weight gain was due to oxidation of the SiC phase as indicated by "region 2" in the Figures. In addition to demonstrating the preferred range of growth temperatures, the experiments also demonstrate the utility of dispersing a dopant throughout the filler material. In this case silicon dopant was obtained by chemical reduction of the silicon dioxide layer by aluminum, which layer coats the silicon carbide grains under the process conditions.

Figure 5F:
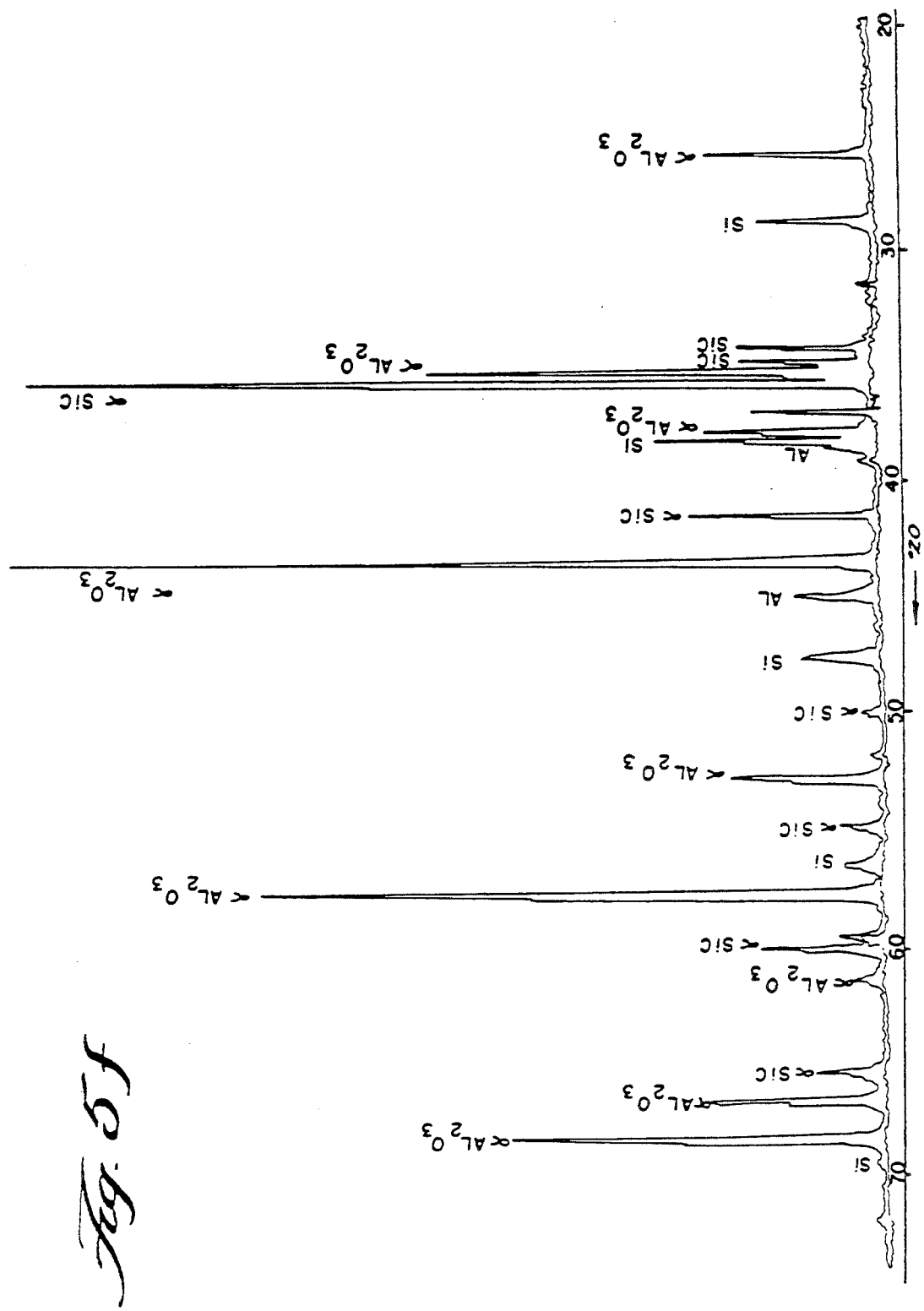
FIG. 5F is an x-ray diffraction pattern of a powdered sample of a ceramic composite structure produced in accordance with Example 5 of this specification.
Figure 66:
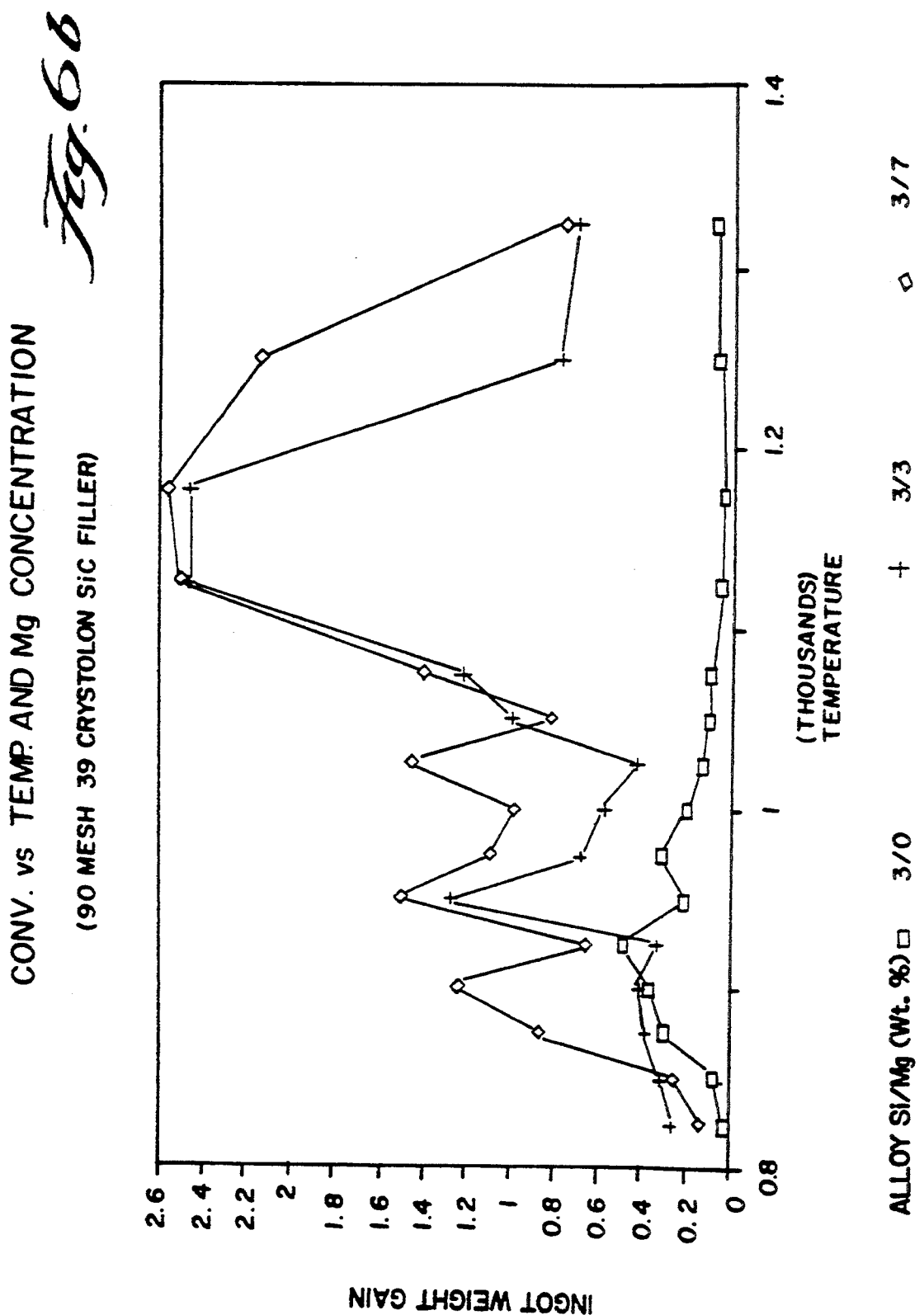

To determine the properties of a large body prepared by growing through the 98% pure SiC filler material of this example, a sample of an aluminum alloy two inches by nine inches by one-half inch in size containing 10% of silicon and 3% of magnesium dopants were prepared in the manner described in Example 2 and was embedded on five sides in 90 mesh, 95% pure aluminum oxide refractory grain (El Alundum) within a suitable refractory vessel, with an aluminum foil partition used to prevent coverage of the exposed two inch by nine inch surface. Onto this exposed surface was applied a one inch layer of 90 mesh, 98% pure SiC abrasive grain (Norton Co., 37 Crystolon). The sample was processed 60 hours at a furnace setpoint of 1300° C., after allowing a 5 hour period for the furnace to reach setpoint temperature. Following the heating period, an additional 5 hours was allowed for the sample to cool below 600° C. prior to removal from the furnace. The resulting unit weight gain was 0.61 and the ingot weight gain was 1.14. Growth was observed to occur preferentially into the silicon carbide filler material rather than into the aluminum oxide supporting bed. A photomicrograph of the resulting composite structure is shown in FIG. 5E, where the silicon carbide particles, the alumina matrix network, and the metallic constituents are indicated. X-ray diffraction data taken on a powdered portion of this sample displayed alpha-alumina, silicon carbide, aluminum and silicon phases, as indicated in FIG. 5F. This ceramic composite structure was electrically conductive, that is, it had minimal resistance as measured by a Simpson ohm meter with point probes, and demonstrated a breaking strength of 16,000 pounds per square inch using the above-described modulus of rupture test.

Additional experiments similar to those described above were performed using as the filler material 98% pure SiC grain with a smaller, 220 mesh, particle size. The material demonstrated higher strength (23,000 psi) than the material utilizing 90 mesh silicon carbide filler. Ceramic composites formed from either 90 or 220 mesh particle sizes displayed erosion resistances significantly higher than that of 99.8% pure alumina plates (Coors AD 998) as measured by the grit blasting erosion test described above. Specifically, the ceramic composite structure of this invention made with, respectively, the 90 and 220 mesh silicon carbide particles showed the following results in comparison to a standard alumina:

| Material Tested | 90° Test Crater Depth In Inches | 30° Test |
| --- | --- | --- |
| 90 mesh SiC | 0.044 | 0.024 |
| 220 mesh SiC | 0.037 | 0.016 |
| Standard | 0.056 | 0.029 |

| Material Tested | 90° Test | 30° Test |
| --- | --- | --- |
| | Crater Depth In Inches | |
| (Coors AD 998) | | |

EXAMPLE 6

To determine the effect of growth of the material of the present invention into a volume containing silicon carbide abrasive grain of a somewhat higher purity grade, experiments were performed in a manner identical to those described in Example 1, utilizing as the filler material 99+% pure SiC (Norton Co., 39 Crystolon) of 90 mesh size. Results of this series of experiments are graphically presented in FIGS. 6A–6D. This material exhibits a growth of polycrystalline matrix material at temperatures ranging as low as approximately 825° C., which is of significant value in limiting the tendency of the silicon carbide to oxidize to silica and carbon dioxide prior to formation of the silicon carbide-filled ceramic composite material of the present invention.

Tests were conducted using a filler material comprising 99+% pure SiC abrasive grain (Norton Co., 39 Crystolon) of smaller particulate sizes (220 and 550 mesh) into which the polycrystalline ceramic matrix material was grown as described above in this Example. For these tests a significant increase in modulus of rupture was measured, ranging from 12,000 pounds per square inch for 90 mesh filler material, to 37,000 pounds per square inch for 220 mesh filler material, to 59,000 pounds per square inch for the 500 mesh filler material.

Growth has also been demonstrated into filler material consisting of various mixtures of 90, 220, and 500 mesh particles of this 99+% pure SiC material, which results in a higher packing density of the filler phase than that available from a single particle size.

Growth of the ceramic composite material of the present invention has also been demonstrated from a commercial 5052 aluminum alloy containing 2.5% of magnesium dopant along with roughly 1% (combined) of other species including Fe, Cr, Si and Cu, into these silicon carbide filler materials. A ceramic composite structure was formed by oxidizing this commercial alloy in a furnace cycle of 72 hours into a filler material of 500 mesh 99+% pure SiC. The resultant material demonstrated a modulus of rupture of 54,000 to 62,000 pounds per square inch, a hardness of 84 on the Rockwell-A scale, and a fracture toughness of 7.5 Mega-Pascals-meter$^{\frac{1}{2}}$ as measured by the single-edge notched beam fracture toughness test described below. Impurities in the aluminum parent metal alloy thus did not preclude or substantially interfere with the creation of an acceptable composite ceramic structure. The toughness value obtained is unusually high as compared with traditional silicon carbide ceramic composite materials such as silicon/silicon carbide composites which usually exhibit a fracture toughness of about 3–5 Mega-Pascals-meter$^{\frac{1}{2}}$.

The fracture toughness test employed a rectangular test strip of the ceramic composite material of the invention measuring 0.118 inch to width ("w") and 0.379 inch in depth ("d") and having an isosceles triangular-shaped notch of height "a" of 0.036 inch cut in its lower surface and extending across the entire width of the test strip. The test strip was positioned with the notched, 0.118 inch-wide surface at the bottom and horizontally disposed, and with the 0.379 inch-deep surfaces being vertically disposed. A pair of ¼ inch diameter anvil rods imposed upwardly directed forces on the bottom surface of the test strip at opposite sides of the notch and equally spaced therefrom. The upwardly directed forces are imposed at locations spaced apart a distance $S_1$ along the length of the test strip. A pair of resistance points resisting the upwardly directed forces are imposed on the top surface of the test strip at opposite sides of the location of the notch and equally spaced therefrom. The resistance points are spaced apart along the length of the test strip a distance $S_2$, which is less than the distance $S_1$ between the points of upwardly applied force. Fracture toughness ("FT") is calculated by the formula $$FT = \frac{3 F(S_1 - S_2)a^{1/2}y}{2 Wd^2}$$

where F is the upwardly acting force in pounds applied at each of the two points on the bottom surface of the test strip, a, w, d, $S_1$ and $S_2$ are as defined above, and y is a constant whose value is $$y = 1.99 - 2.47a_0 + 12.97a_0^2 - 23.7a_0^3 + 24.8a_0^4$$

wherein $$a_0 = a/d$$

For the tests conducted, $S_1$ was set at 1.5 inches, $S_2$ at 0.5 inches and the upwardly acting forces F were applied at a crosshead speed of 0.002 inches per minute. An Instron Model 1123 machine was used for both the modulus of rupture and fracture toughness tests.

An additional sample of aluminum alloy containing 10% by weight of silicon and 3% by weight of magnesium dopants alloyed into 99.7% pure aluminum was similarly processed for 95 hours at 1150° C. into filler material of 90 mesh, 99+% pure SiC. The resulting aluminum-based matrix composite with silicon carbide filler was cut into a bar 11 cm long by 1.34 cm wide by 0.45 cm thick and was self-heated by passing a current of approximately 25 Amperes at 25 Volts through the bar. The sample heated up to 1350° C. in about one minute as measured by an optical pyrometer, and was held for about 3 hours at 1350° C.±20° C. at the midpoint of the test bar with a temperature variation of ±20° C. from the midpoint of the bar along its entire 11 centimeter length. The resistance heating effect demonstrates electrical conductivity of the sample bar. The uniformity of temperature across the test bar showed good uniformity of composition, and thermal stability was demonstrated by the ability to maintain a constant temperature (1350° C.±20° C.) during a three hour period. Fast heat up (ambient to 1350° C. in about one minute) and fast cool down times without failure of the sample indicated good thermal shock resistance.

EXAMPLE 7

A sample of commercially pure 1100 aluminum alloy plate measuring two inches by nine inches by one-half inch was coated with a 4 gram casein slip containing magnesium oxide to provide the magnesium dopant for the aluminum parent metal. The plate was embedded in 90 mesh silicon carbide of 98% purity (Norton Co., 37 Crystolon) from which silicon dopant could be obtained by chemical reduction of the silicon dioxide layer covering the silicon carbide particles. The sample was processed with a furnace cycle of 72 hours at a setpoint of 1200° C., plus an initial 5 hours for the furnace to reach setpoint temperature and 5 hours after the heating period for the sample to cool to 600° C. for removal from the furnace. The sample showed 0.88 unit weight gain (uncorrected for oxidation of the silicon carbide material) and 1.48 ingot weight gain, thus demonstrating the formation of an alumina-based matrix ceramic composite structure of the present invention from a commercially pure 1100 aluminum alloy through the use of external doping of the parent metal.

EXAMPLE 8

Figure 7A:
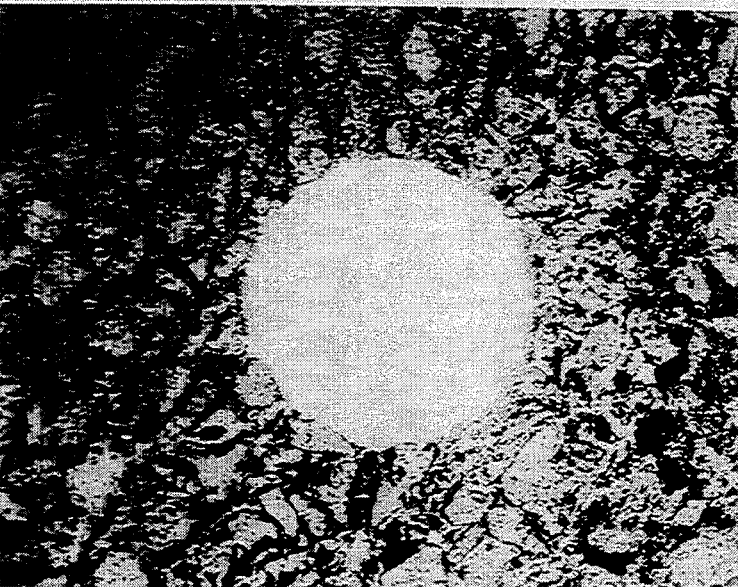
FIGS. 7A-7B are photomicrographs at 40× and 200× magnifications of a ceramic composite structure in accordance with the present invention containing wire and alumina particles embedded as filler materials in an alumina ceramic.
Figure 7B:
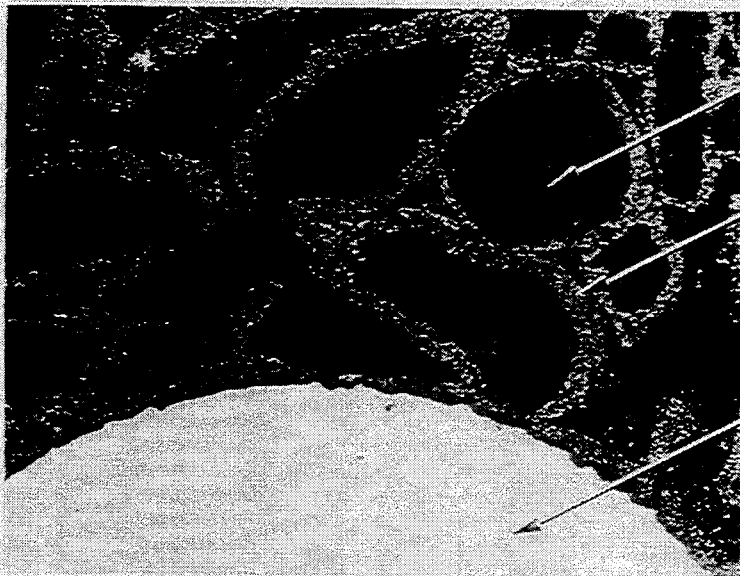

To determine the effect of growth of an alumina-based ceramic matrix material of the present invention into a volume containing a metallic filler material, a coil roughly one inch tall, one and one quarter inch in diameter, and containing roughly five turns of a commercial wire alloy containing 75% iron, 20% chromium, and 5% aluminum (Kanthal Co., A-1 alloy wire) was prepared. This wire coil was oxidized for 24 hours at 1200° C. in an oxygen atmosphere to form thereon a protective surface layer of aluminum oxide. In the manner described in Example 1, an aluminum alloy ingot one inch in diameter and seven-eights inch long and containing 7% of silicon and 3% of magnesium dopants was prepared and embedded in 90 mesh; 99+% pure alumina grain (Norton Company, 38 Alundum), with the oxidized wire coil placed concentric with the parent metal ingot and separated roughly one-eighth of an inch therefrom. This assembly was processed for 96 hours at a setpoint temperature of 1200° C., after an initial six hours for the furnace to reach setpoint temperature. After allowing ten hours for the sample to cool, it was removed from the furnace. Unit weight gain was 0.74 and ingot weight gain was 2.56. Examination of a cross-section of the sample revealed a cohesive composite having a ductile wire phase together with the 99+% alpha-alumina particulate material captured within an alpha-alumina based ceramic matrix of the present invention. FIGS. 7A and 7B show photomicrographs at 50× and at 200× magnification, respectively, of the microstructures showing entrapped wire and alumina particles embedded within the polycrystalline matrix of the present invention. This demonstrates the compatibility of the process and of the material of this invention with reactive filler materials in solid form when provided with an inert protective layer to separate an otherwise unstable material or phase from the process environment.

EXAMPLE 9

Figure 8:
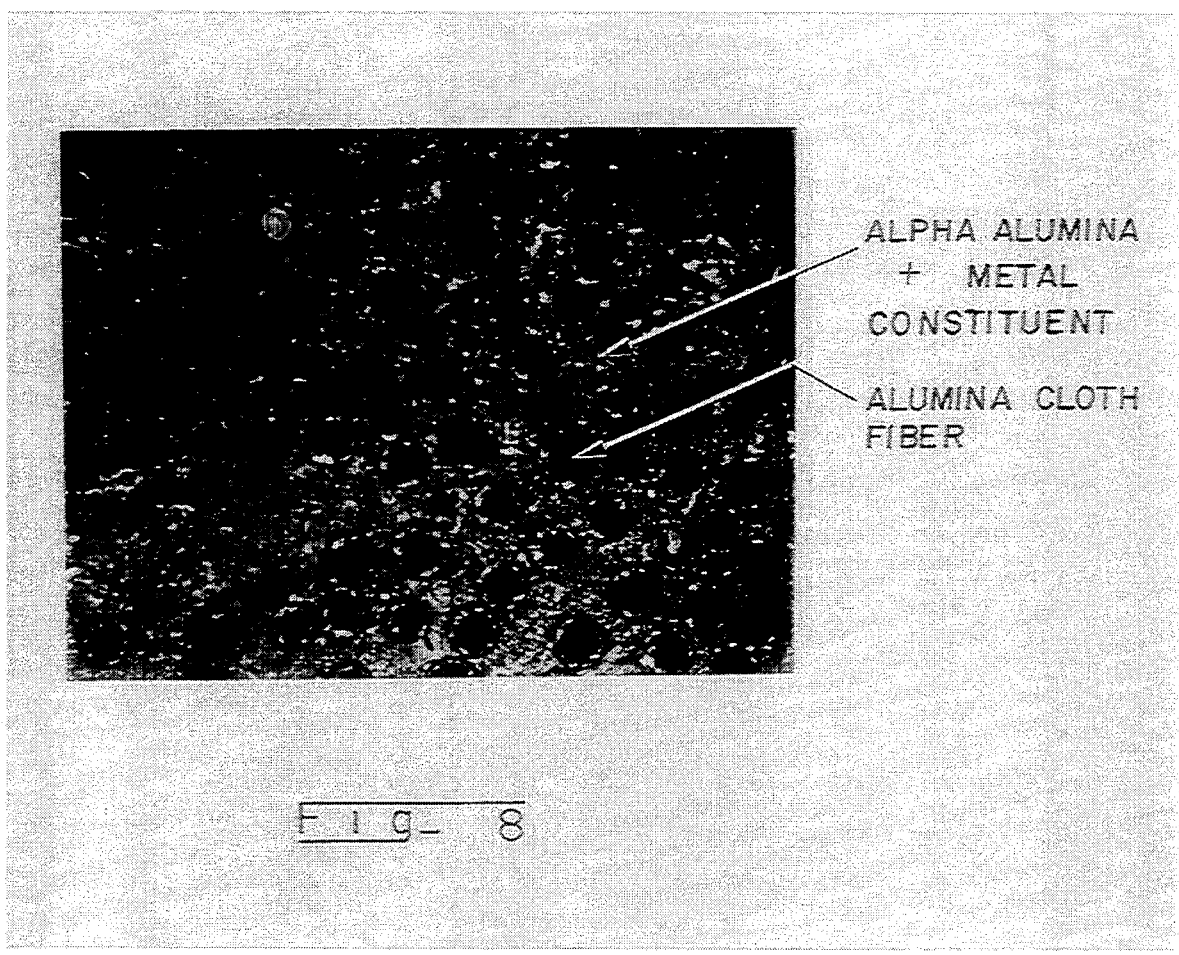
FIG. 8 is a photomicrograph at 400× magnification of a cross-section of a ceramic composite structure in accordance with the present invention containing layers of an alumina cloth filler material.

To determine the effect of growth of a material of the present invention into a two-dimensional woven cloth of a suitable filler material to yield a composite of the present invention, experiments were conducted with woven alumina ceramic fiber cloth (DuPont Co., FP alumina). The parent metal employed for this Example consisted of a commercial aluminum alloy, (Number 5052) containing 2.5% of magnesium along with roughly 1% (combined total) of other species such as Fe, Cr, Si, and Cu. Two samples each measuring two inches by nine inches by one-half inch, were prepared and were placed on top of one another to form a two inch by nine inch by one inch parent metal bar. The top surface of the bar was covered with a layer containing 2–5 grams of silicon dioxide dopant mixed with a binder of polyvinyl alcohol and water. The bar was placed horizontally upon a layer of 95% pure alumina refractory grain (El Alundum) of 90 mesh size, and was covered on four sides leaving the top, coated surface exposed. Upon this surface were placed six layers of the alumina cloth, each measuring roughly three inches by ten inches, and these were held loosely in place by refractory brick fragments located around the edges of the cloth. The assembly was placed into a furnace identical to that described in Example 1 and was heated in air to 1125° C. for a period of 180 hours. FIG. 8 is a photograph of a cross-section of the resulting ceramic fiber-containing composite, showing the cloth filler material entrapped within a ceramic matrix consisting in part of an interconnected alpha-alumina matrix and non-oxidized metal. Similar cloth-containing composites have been produced with other materials, including zirconia cloth and a silicon carbide-based cloth. If the ceramic fiber-to-matrix interface bond is not too strong and the parent metal and oxidant do not attack the fibers, such composites can potentially have the utility of very high strength in two dimensions imparted by the cloth and/or an increase in toughness of the composite material imparted by crack deflection and fiber pull-out fracture mechanisms.

EXAMPLE 10

In order to demonstrate growth of a ceramic composite of the present invention in an atmosphere less oxidizing than air, experiments were conducted in an inert gas which had been passed through a bath of heated water. In one example, an aluminum parent metal containing 10% by weight silicon and 3% by weight magnesium was prepared as a bar three inches long by one-quarter inch thick by three-eighths inch wide and was surrounded by 500 mesh SiC of 99% purity (Norton 39 Crystolon) in a refractory boat. This was placed in a furnace preheated to 1200° C., allowing fifteen minutes for insertion into the heated zone. Over this sample was passed argon of 99.998% purity which had been passed through a bath of distilled water heated to 50° C. In this case, moisture served as the oxidant. The sample was removed from the furnace after approximately 20 hours and a unit weight gain of 19% was measured, producing an alpha-alumina based ceramic matrix composite containing silicon carbide particles. This indicates that the formation of the ceramic material of the present invention can be performed in oxidizing environments having lower oxygen activity than air.

EXAMPLE 11

To demonstrate the growth of a ceramic composite material with an aluminum nitride-based matrix, an ingot was prepared of 380.1 aluminum (alloy from Belmont Metals, Inc.) measuring 2 inches by 1 inch by ½ inch. This ingot was coated with a layer (approximately ⅛ inch thick) of AlN particles having an organic binder on all surfaces except for one of the surfaces measuring 1 by 2 inch face. This alloy had a nominally identified composition by weight of 8–8.5 percent Si, 2–3 percent Zn and 0.1 percent Mg as active dopants, and 3.5 percent copper as well as iron, manganese and nickel, but the magnesium content was sometimes higher as in the range of 0.17–0.18 percent. The coated ingot was then placed in a bed of 24 mesh size alpha-alumina, in a refractory crucible, such that the uncoated face of the ingot was substantially flush with the bedding. The above system was heated in a resistance furnace at a setpoint temperature of 1250° C. in an atmosphere of forming gas (96% nitrogen and 4% hydrogen) for 24 hours.

An aluminum nitride-based matrix grew through the thin layer of AlN particles into the volume containing the alumina bedding and produced a cohesive aluminum nitride/alumina composite material. The presence of both the aluminum nitride matrix and the alumina filler in the resulting composite was confirmed by X-ray powder diffraction.

The unit weight gain for the above sample was 0.41. The theoretical unit weight gain for complete conversion of aluminum to aluminum nitride is 0.52. Thus, good conversion of aluminum to aluminum nitride and good composite growth were obtained in this experiment.

EXAMPLE 12

Two separate filler materials were prepared, each containing an admixture of aluminum nitride and alumina powders in ratios of 20:80 and 50:50 weight percents. The mesh size of the two filler materials was −325 and 220 for aluminum nitride and alumina, respectively. An ingot of commercially available 380.1 aluminum alloy and measuring ¾ inch by ½ inch by ½ inch was embedded in each of the filler materials. Each lay-up was heated separately in an induction furnace at a 1300° C. setpoint temperature for 36 hours in an atmosphere of forming gas (96% nitrogen and 4% hydrogen) flowed through the furnace at a rate of 100 cc/minute.

Each of the above described systems exhibited growth of aluminum nitride into the bedding material, forming a cohesive composite of aluminum nitride and aluminum oxide particles in a matrix of aluminum nitride plus some unreacted constituents of the parent metal. The presence of aluminum nitride and alumina in the resulting composite material was confirmed by X-ray powder diffraction. The unit weight gains for the above samples are listed in Table 12 below.

TABLE 12

| Weight Gains for AlN/Matrix Composites | |
|---|---|
| Filler Material | Unit Weight Gain |
| 20/80 (AlN/Al$_2$O$_3$) | .385 |
| 50/50 (AlN/Al$_2$O$_3$) | .437 |

This example further illustrates the growth of a composite with an AlN-based matrix, and also shows that a composite having a heterogeneous filler can be formed by the process of this invention.

EXAMPLE 13

To show the growth of zirconium nitride into a volume containing a filler material thereby yielding a composite of the filler with a zirconium nitride matrix, a cylindrical rod of zirconium, ¾ inch in height and ½ inch in diameter, was embedded within a bed of zirconium diboride powder (−100+325 mesh size). The system was heated in an induction furnace by direct coupling to the zirconium for 15 minutes at a setpoint temperature slightly in excess of 2000° C. in forming gas (same composition as in Example 11) flowing at a rate of 400 cc/minute.

The result was growth of a zirconium nitride matrix into the volume containing the zirconium diboride filler material thereby producing a cohesive zirconium nitride/zirconium diboride composite material. X-ray powder diffraction confirmed the presence of zirconium nitride and zirconium diboride in the resulting composite material.

The foregoing procedure was repeated except that the zirconium nitride was grown into a volume containing zirconium nitride powder (1–5 µm particle size), and the forming gas oxidizing atmosphere flow rate was 200 cc/minute. Growth of a zirconium nitride matrix into the zirconium nitride filler material resulted, thereby producing a cohesive zirconium nitride/zirconium nitride composite material. X-ray powder diffraction confirmed the zirconium nitride composition of the end product.

EXAMPLE 14

To show the growth of titanium nitride into a volume containing a filler material yielding a composite of the filler with a titanium nitride matrix, a cylindrical ingot of titanium ¾ inch in height and ½ inch in diameter was placed in a bed of alumina (38 Alundum, 90 mesh). The above system was heated in an induction heating furnace by direct coupling to the titanium for 2.5 hours at a setpoint temperature of approximately 2000° C. in forming gas (same composition as in Example 11) flowing at a rate of 400 cc/minute.

The above system exhibited growth of titanium nitride into the alumina-containing volume producing a cohesive titanium nitride/alumina composite material. Analysis of the above-formed composite material by X-ray powder diffraction confirmed the presence of titanium nitride, alumina and trace amounts of titanium metal.

The foregoing procedure was repeated except that titanium nitride powder was employed as the filler material. The reaction was carried out for 20 minutes at a setpoint temperature slightly in excess of 2000° C.

The above-described procedure produced a cohesive titanium nitride/titanium nitride composite material. X-ray powder diffraction analysis confirmed the titanium nitride composition of the composite.

The foregoing procedure was repeated again except that titanium diboride powder was instead employed as the filler material and pure nitrogen was employed as the oxidizing atmosphere. The reaction was carried out for 10 minutes and the nitrogen flow rate was 600 cc/minute.

X-ray powder diffraction analysis confirmed that the cohesive composite which resulted was comprised of titanium nitride and titanium diboride.

EXAMPLE 15

To demonstrate the growth of an alpha-alumina ceramic matrix into a fine silicon carbide filler using a parent aluminum alloy different from the Al/Mg/Si alloys of Example 6, a nine inch by two inch by one-half inch sheet of commercially available 380.1 aluminum alloy was embedded within a bed of silicon carbide (Norton 39 Crystolon of 500 mesh particle size). The system was heated in a resistance furnace to a 1000° C. setpoint temperature for 75 hours in air.

In this system, growth of alpha-alumina into the silicon carbide resulted in the formation of cohesive composite material comprising silicon carbide particles in a matrix containing aluminum oxide plus minor amounts of unreacted constituents of the parent alloy.

X-ray powder diffraction analysis of the resulting composite confirmed the presence of alpha-alumina and silicon carbide. The unit weight gain for the above-described system was 0.478 indicating substantial oxidation of the aluminum precursor into the silicon carbide filler.

EXAMPLE 16

To demonstrate the use of composite filler materials containing zirconium oxide, alpha-alumina was grown by the method of this invention into a volume of commercially available Norton ZF Alundum (an abrasive grain material containing alumina and zirconia). In this demonstration, a 1 inch long by ⅜ inch diameter cylindrical ingot of commercial available 380.1 aluminum was embedded within a bed of above-described alumina-zirconia material. The system was heated in a resistance furnace to a 1000° C. reaction setpoint temperature for 95 hours in air.

Growth of the alpha-alumina oxidation reaction product into the alumina-zirconia volume resulted in the formation of a cohesive alpha-alumina/zirconia composite material where the ZF material was captured in an alpha-alumina matrix grown by the process of the present invention.

X-ray powder diffraction analysis of the resulting composite material confirmed the presence of alpha-alumina and zirconia. The weight gain ratio for the above-described system was 0.32 indicating substantial oxidation of the aluminum precursor into the zirconia/alumina filler.

The foregoing procedure was repeated except that the filler material above was replaced by zirconia powder (Muscle Shoals, stabilized by calcium oxide, −30 mesh). Substantial oxidation of the aluminum ingot into the zirconia-containing volume occurred, yielding a cohesive alphaalumina/zirconia composite material, as confirmed by X-ray powder diffraction.

EXAMPLE 17

To show the growth of a tin oxide matrix into a volume containing alumina particles (−75+100 mesh) thereby resulting in a tin dioxide/alumina composite material, a cylindrical ingot 2 cm tall and 3 cm in diameter was embedded within a bed of the alumina. The system was heated to a setpoint temperature of 1100° C. in air for 48 hours.

The tin oxidized and grew a ceramic matrix into the alumina filler resulting in a cohesive tin dioxide/alumina composite material. X-ray powder diffraction analysis confirmed the presence of tin dioxide and alpha-alumina in the resulting material.

The unit weight gain for the above system was 0.28, as compared to the theoretical weight gain for tin dioxide of 0.27; hence oxidation of the tin precursor into the alpha-alumina bed was substantially complete.

EXAMPLE 18

To demonstrate the growth of an alpha-alumina matrix into filler material of alumina "bubbles", i.e., hollow alumina bodies, (Norton, E163 Alundum 4 to 28 mesh size) at various process temperatures, cylindrical ingots one inch long by ⅜ inch diameter of several aluminum alloys, in some cases externally doped, were embedded separately in beds of the above-described filler material. The alloys were processed in air at setpoint temperatures ranging from 950°–1250° C. and for two separate process times, 48 and 80 hours. The unit weight gains for the above-described systems, at each process time, are listed in Tables 18(a) and 18(b) below.

TABLE 18(a)

| Unit Weight Gains 48 Hours | | | | | |
|---|---|---|---|---|---|
| | | Process Temperature (°C.) | | | |
| Al Alloy | External Dopant | 950 | 1050 | 1150 | 1250 |
| 2.5% Mg | 140 grit SiO₂ | .01 | — | .58 | .28 |
| 6% Zn + 10% Si | none | .63 | .67 | .70 | .65 |
| 3% Zn + 7% Mg | none | .04 | .12 | .72 | .74 |
| 6% Zn | MgO powder | .73 | .70 | .71 | .71 |

TABLE 18(b)

| Unit Weight Gains 80 Hours | | | | | |
|---|---|---|---|---|---|
| | | Process Temperature (°C.) | | | |
| Al Alloy | External Dopant | 950 | 1050 | 1150 | 1250 |
| 2.5% Mg | 140 grit SiO₂ | −.02 | .52 | .66 | .58 |
| 6% Zn + 10% Si | none | .63 | .67 | .68 | .63 |
| 3% Zn + 7% Mg | none | .04 | .26 | .74 | .72 |
| 6% Zn | MgO powder | .60 | .72 | .68 | .71 |
| 10% Si + 3% Mg | none | .07 | .71 | .71 | .75 |
| 380.1 | none | .65 | .69 | .69 | .13 |

The data in Tables 18(a) and 18(b) and examination of the samples confirm the formation of composites by the process of this invention, each composite having an alpha-alumina matrix and alumina bubble filler material.

EXAMPLE 19

To demonstrate the formation of a composite material having a silicon nitride matrix, 10.7 g of 98.4% pure silicon chips were submerged in a bed containing 90 weight percent titanium nitride powder (−325 mesh) and 10 weight percent titanium metal (titanium metal added to enhance wetting by molten silicon), and the system was heated to a reaction temperature of 1500° C. for 30 minutes in an atmosphere of forming gas flowing at 600 cc/minute.

X-ray powder diffraction analysis and examination of the sample produced by the above-described procedure confirmed the presence of the titanium nitride filler, the formation of silicon nitride and also the conversion of the titanium metal in the bedding to titanium nitride. Ceramographic and energy dispersion X-ray analysis of the sample indicated the formation of a cohesive composite material having a silicon nitride matrix.

EXAMPLE 20

To demonstrate the growth of a composite material having an alpha-alumina matrix incorporating silicon carbide ceramic fibers, two bars of commercial available 380.1 aluminum, 9 inches by 2 inches by ½ inch each were stacked one on top of the other and placed in a refractory bedding of alumina particles (El Alundum, 90 mesh size) such that the 9 by 2 inch face of the top bar was exposed and substantially flush with the alumina bedding. A thin layer of silicon carbide particles (Norton 39 Crystolon, 220 mesh size) was applied to the exposed aluminum surface and on top of that layer was placed 5 layers of Nicalon silicon carbide cloth (made by Nippon Carbon Co.) each separated by a thin layer of the above-described silicon carbide particles. The described system was heated to a setpoint temperature of 1000° C. for 75 hours in air.

Figure 9:
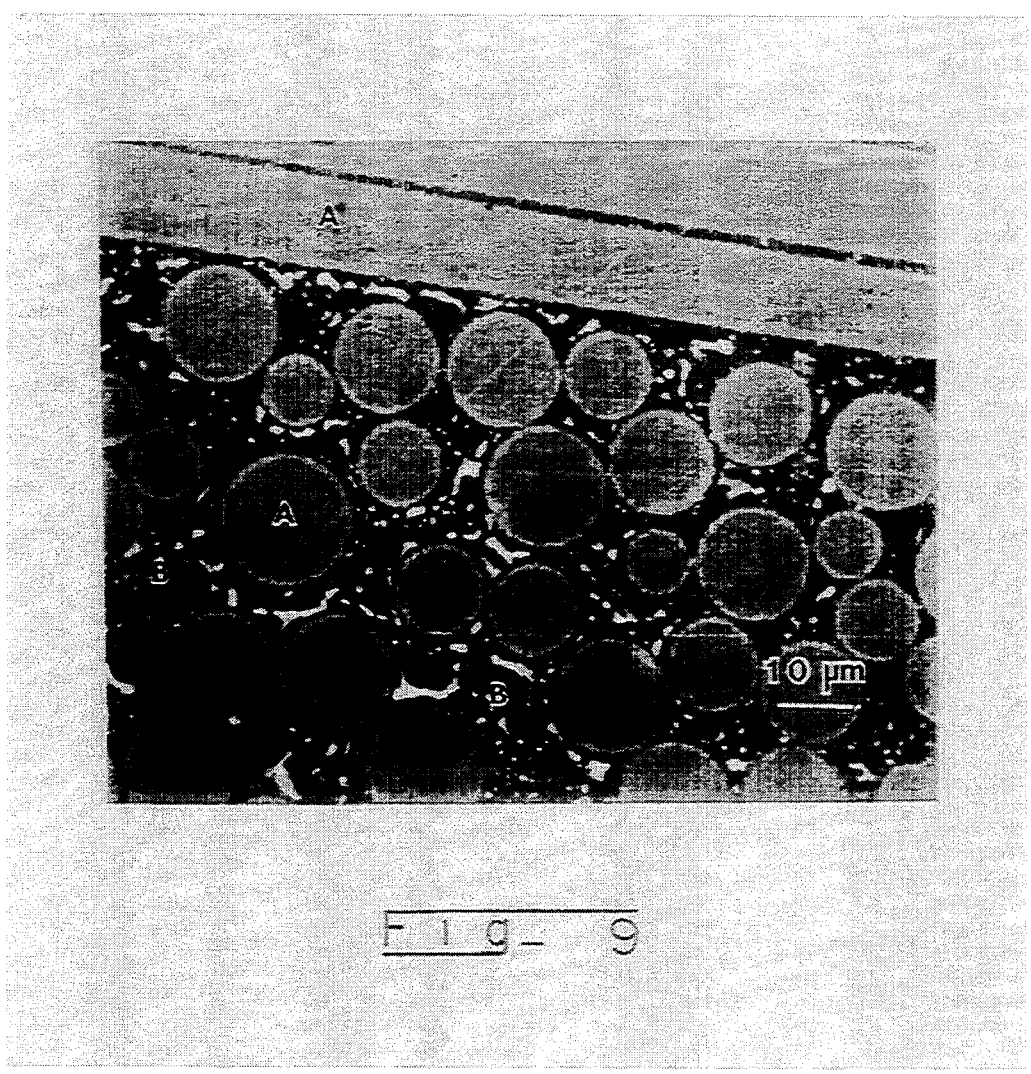
FIG. 9 is a photomicrograph at 1000× of ceramic composite having an alpha-aluminum matrix embedding silicon carbide particles and silicon carbide ceramic fibers prepared in accordance with Example 20.
Figure 10:
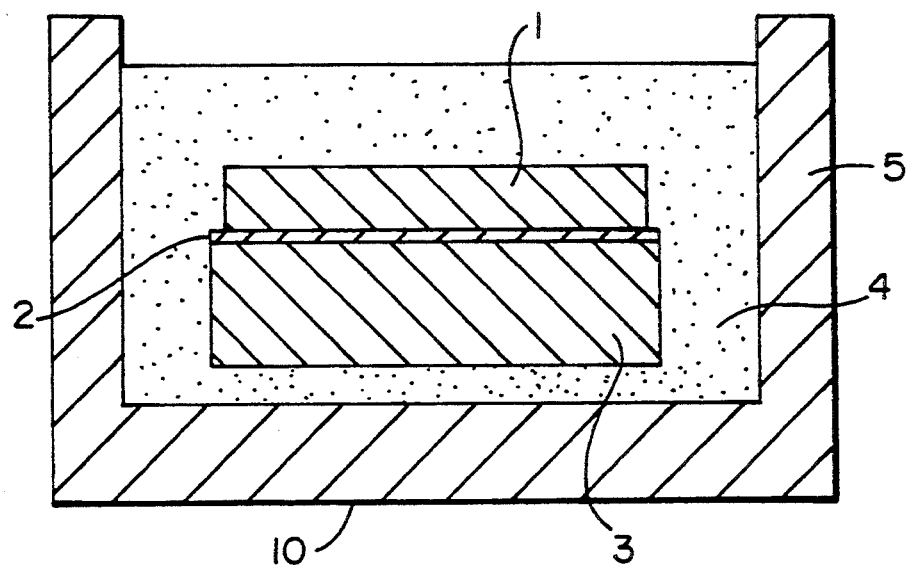
FIG. 10 is a sketch of an experimental lay-up for aluminum nitride composite growth.
Figure 11A:
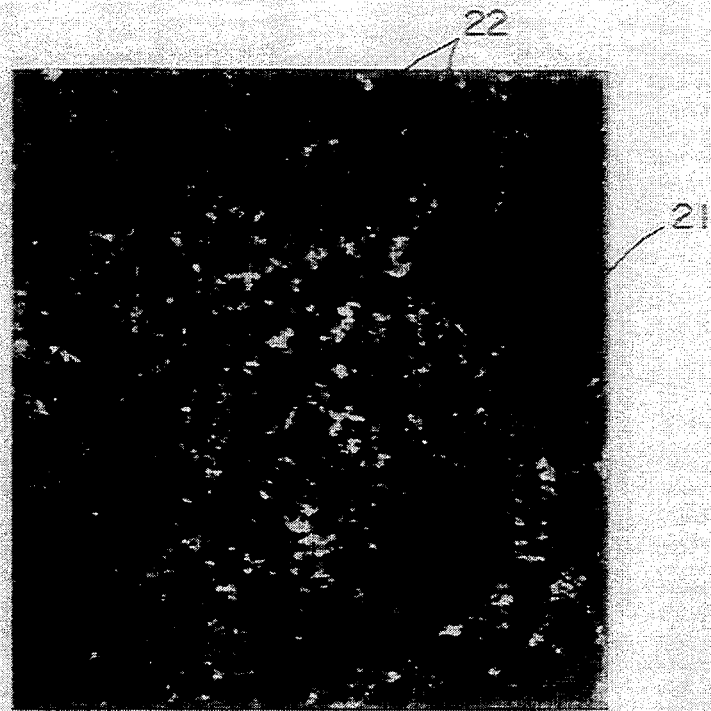
FIGS. 11a, 11b, 11c and 11d are micrographs of the structure of aluminum nitride composites.
Figure 11B:
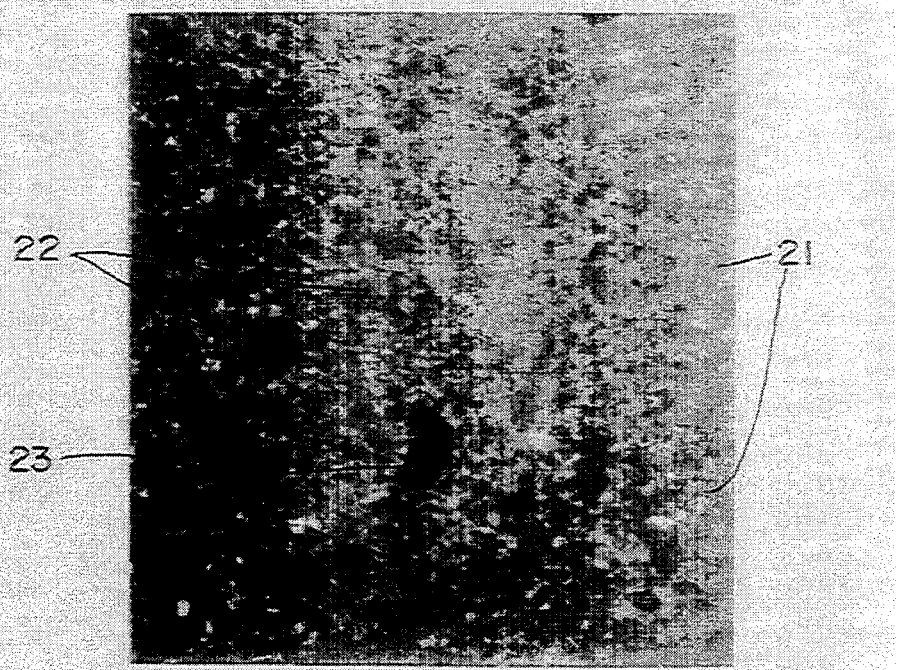
Figure 11C:
Figure 11D:
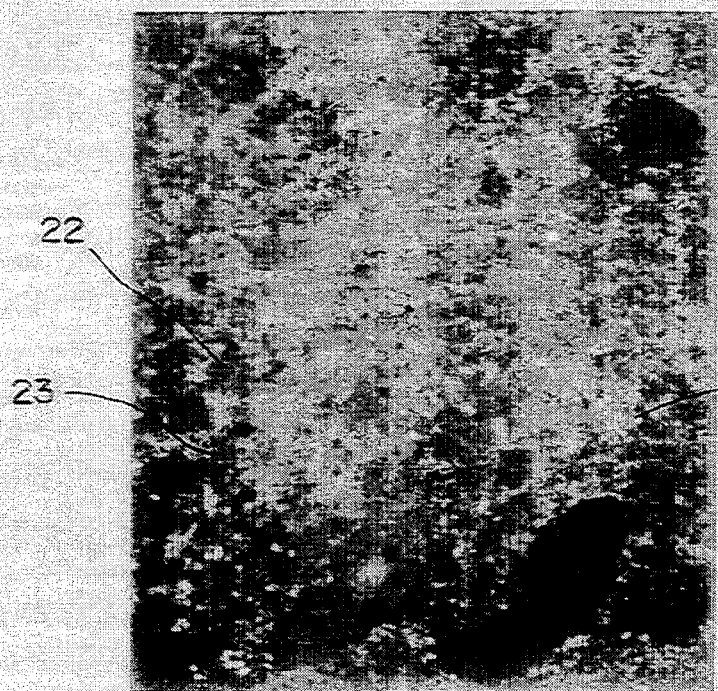
Figure 12A:
FIGS. 12a and 12b are micrographs of the structure of aluminum nitride composites.
Figure 12B:
Figure 13A:
FIGS. 13a and 13b are micrographs of the structure of aluminum nitride composites grown from slip cast and dry pressed preforms, respectively.
Figure 13B:
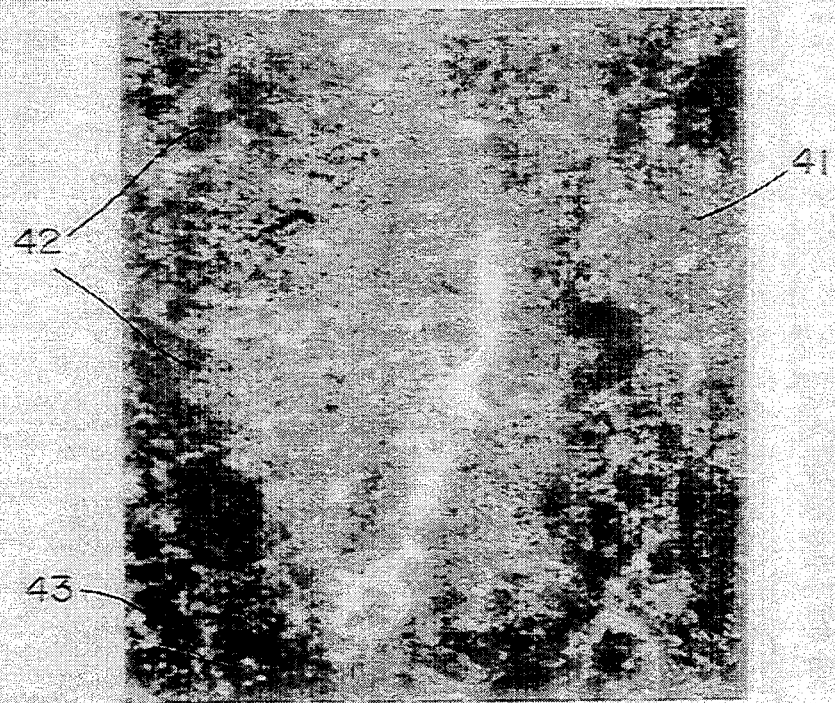

The above procedure produced a cohesive composite material having an alpha-alumina matrix embedding alternately the layers of silicon carbide particles and the layers of silicon carbide cloth without disturbing the cloth weave and the lay-up configuration. FIG. 9 is a photomicrograph of the composite material produced in the above example.

EXAMPLE 21

To demonstrate the growth of a composite material having an alpha-alumina matrix embedding a filler material comprised of barium titanate particles, a cylindrical ingot of commercial available 712 aluminum, alloyed with an additional 10% silicon, 1 inch tall by ⅜ inch diameter was submerged into a bedding of $BaTiO_3$ particles in a refractory crucible. The ingot, bedding and crucible were placed in a resistance furnace and heated to a 1100° C. setpoint temperature for 95 hours in air.

The unit weight gain for the above-described system was 0.71, evidencing substantial conversion of the aluminum ingot to the alpha-alumina ceramic matrix. X-ray powder diffraction analysis of the resulting composite material illustrated the presence of the alpha-alumina matrix, $BaTiO_3$, silicon, and various oxidized and unoxidized constituents deriving from the 712 alloy.

The above example demonstrated the incorporation of a barium titanate filler material into an alpha-alumina matrix, thereby producing a cohesive composite.

Although only a few exemplary embodiments of this invention have been described in detail above, those skilled in the art will readily appreciate that the present invention embraces many variations other than those exemplified.

EXAMPLE 22

This Example shows the use of strontium as a dopant for aluminum nitride growth into $TiB_2$ and alumina filler materials. However, this Example is not limited to showing the use of strontium as a dopant. It also illustrates other significant aspects of the present invention.

A series of experiments, as set forth in Table 22, were run in a continuous recording microbalance (Netch STA-429, Netch, Inc., Exton, Pa.) connected to a computer data acquisition system. The continuous recording microbalance was equipped with a controlled atmosphere resistance heated furnace. A parent metal ingot having an outer diameter of about 0.23 inch (5.9 mm) and a thickness of about 0.20 inch (5 mm) was placed into the bottom of an alumina crucible having an inner diameter of about 0.225 inch (5.7 mm), a depth of about 0.5 inch (12.7 mm) and a wall thickness of about 0.04 inch (1.0 mm). A layer of −325 mesh nickel powder (obtained from Cerac, Inc., Milwaukee, Wis.) was placed on the surface of the parent metal ingot at a density of about 0.02 grams per centimeters squared or about 1.4 to 1.5 percent by weight of the alloy ingot. Subsequently, the filler material was placed into the alumina crucible and on the nickel coated parent metal ingot and leveled to the top of the crucible. The alumina crucible and its contents were placed into the microbalanced fixture and the controlled atmosphere furnace was sealed and evacuated. Once sufficiently evacuated, prepurified nitrogen gas was introduced into the controlled atmosphere furnace and the furnace was heated to the processing temperatures as set forth in Table 22 at a rate of about 100° C. per hour. The experiments were run in a slight nitrogen overpressure ranging from about 770–780 torr. Simultaneously, the continuous acquisition of weight data with the computer data acquisition system from the microbalance was initiated to record the weight gain as a function of temperature during the heating of the setup to the final reaction temperature and as a function of time after the furnace had reached its soak temperature. After each run, the total weight gain data was recorded and the weight gain as a function of time was differentiated to obtain the rate of weight gain as a function of time electronically. The initial rate of weight gain (a growth rate) was obtained for each runs and is summarized in Table 22.

The activation energy of the reaction for a parent metal comprising about 3% Sr and the balance aluminum was calculated to be approximately 92 kilojoules per mole of AlN product from a plot of the initial rate of weight gain as a function of temperature. Although the rate of weight gain for a parent metal comprising about 1% Sr, 1% Si, and the balance aluminum decreased, the addition of silicon to an aluminum-strontium parent metal did not decrease the activation energy of the reaction. Table I also contains the results for composite growth into 220 grit alumina filler (38 Alundum, Norton Co., Worcester, Mass.), with a a parent metal comprising about 3% Sr and the balance aluminum from processing temperatures of about 900° to about 1000° C. and a parent metal comprising about 3% Sr, 1% Si and the balance aluminum from processing temperatures from about 900° to about 1200° C. In addition, Table 22 contains the results for composite growth into a 500 grit $TiB_2$ filler material with a parent metal comprising about 3% Sr and the balance aluminum from temperatures of about 900° to about 1100° C. The products of these reactions were aluminum nitride ceramic matrix composites with fine aluminum nitride grain sizes of about 1 micron, uniform distribution of metallic and ceramic phases, and low porosity.

TABLE 22

| SAMPLE ID | PARENT METAL | FILLER MATERIAL | TEMPERATURE (°C.) | INITIAL GROWTH RATE | WEIGHT GAIN % |
|---|---|---|---|---|---|
| A | Al-3% Sr | 220# $Al_2O_3$[1] | 900 | | 35.7 |
| B | Al-3% Sr | 220# $Al_2O_3$[1] | 1000 | | 42.6 |
| C | Al-3% Sr-1% Si | 220# $Al_2O_3$[1] | 900 | | 19.5 |
| D | Al-3% Sr-1% Si | 220# $Al_2O_3$[1] | 950 | | 37.4 |
| E | Al-3% Sr-1% Si | 220# $Al_2O_3$[1] | 1000 | | 11.0 |
| F | Al-3% Sr-1% Si | 220# $Al_2O_3$[1] | 1100 | | 37.0 |
| G | Al-3% Sr-1% Si | 220# $Al_2O_3$[1] | 1200 | | 39.0 |
| H | Al-3% Sr | 500 mesh $TiB_2$[2] | 900 | | 42.6 |
| I | Al-3% Sr | 500 mesh $TiB_2$[2] | 975 | | 43.2 |
| J | Al-3% Sr | 500 mesh $TiB_2$[2] | 1000 | | 23.4 |
| K | Al-3% Sr | 500 mesh $TiB_2$[2] | 1100 | | 44.2 |

[1] 38 Alundum, Norton Co., Worcester, MA
[2]

EXAMPLE 23 compared to material s grown without a secondary dopant.

TABLE 23

| Dopants | Alloy Weight (gms) | Temperature (°C.) | Ni Coating (gms) | Weight Gain | Morphology |
|---|---|---|---|---|---|
| 3% Sr-0% Si | 43.75 | 1000 | 0.33 | 47.1% | nodular |
| 3% Sr-1% Si | 44.43 | 1000 | 0.18 | 39.5% | smooth |
| 3% Sr-3% Si | 45.07 | 1000 | 0.14 | 10.8% | smooth |
| 3% Sr-5% Si | 43.91 | 1000 | 0.27 | 5.6% | uniform init. |
| 3% Sr-1% Si | 44.89 | 1050 | 0.26 | 41.4% | smooth |
| 3% Sr-3% Si | 43.84 | 1050 | 0.23 | 28.3% | smooth |
| 3% Sr-5% Si | 44.40 | 1050 | 0.24 | 10.6% | |
| 3% Sr-1% Si | 44.27 | 1100 | 0.23 | 41.6% | smooth |
| 3% Sr-3% Si | 44.85 | 1100 | 0.20 | 23.5% | smooth |
| 3% Sr-3% Si | 46.02 | 1100 | 0.23 | 7.8% | uniform init. |
| 3% Ca-0% Si | 44.63 | 1000 | 0.22 | 42.3% | poor |
| 3% Ca-1% Si | 42.82 | 1000 | 0.26 | 31.1% | smooth |
| 3% Ca-3% Si | 42.46 | 1000 | 0.16 | 2.3% | |
| 3% Ca-1% Si | 44.3 | 1050 | 0.25 | 34.5% | smooth |
| 3% Ca-3% Si | 43.95 | 1050 | 0.24 | 19.4% | smooth |
| 3% Ca-1% Si | 48.13 | 1100 | 0.28 | 34.7% | smooth |
| 3% Ca-3% Si | 43.25 | 1100 | 0.20 | 20.7% | |
| 3% Sr-3% Ge | 46.56 | 1000 | 0.22 | 6.5% | |
| 3% Sr-3% Ge | 45.28 | 1100 | 0.24 | 15.9% | smooth |

This example shows that the addition of Si or Ge to an alloy containing a primary dopant (Sr or Ca) results in a material with improved morphology, compared to materials grown without Si. The reaction rate of the Si-containing alloys was significantly reduced compared to the reaction rate of Al-Sr alloys. However, this example is not limited to the use of Si and Ge as secondary dopants. It also illustrates other significant aspects of aluminum nitride growth.

Aluminum alloy ingots with compositions of 3% Sr, and 0, 1, 3, and 5% Si, respectively, and measuring 2"×1"×½" were bedded in 320-mesh B$_4$C, and covered with 325-mesh Ni powder, in Al$_2$O$_3$ crucibles. No filler was used for these particular experiments. The crucibles were placed in evacuable furnaces. The furnaces were evacuated and then back-filled with 100% N$_2$. The temperature of the furnaces was increased at 300° C./hour to 1000° C., held at 1000° C., 1050° C., or 1100° C. for two hours (see Table 23), and then decreased at 300° C./hour. Table 23 contains specific data and results for each run. The flow rate of N$_2$ was maintained at 500 cc/minute. As noted in Table 23, the 0%-Si alloy had the greatest weight gain, but exhibited nodular growth. Smooth growth with a 39.5% weight gain was obtained for the 1%-Si alloy. The 3%-Si alloy also exhibited smooth growth, but its weight gain was only 10.8%. The 5%-Si alloy only gained 5.6% in weight.

Specific data and results for Si additions to Al-3%Ca alloys are also shown in Table 23. The other growth conditions for the Al-Ca-Si experiments were identical to those used for the Al-Sr-Si experiments. The Al-3%Ca-0%Si alloy grew very rapidly, but exhibited very poor morphology. The Al-3%Ca-1%Si alloy did not grow as fast, but exhibited excellent growth morphology. The Al-3%Ca-3%Si alloy also exhibited an excellent growth morphology, but grew more slowly than the 1%Si alloy.

Ge was also shown to work as a secondary dopant. Table 23 shows the specific data and results for aluminum alloy ingots containing 3% Sr and 3% Ge. The other growth conditions were identical to those used for the Al-Sr-Si experiments. Again, as shown in Table 23, an improved morphology obtained for Ge-containing alloys, although with a reduction in growth rate,

EXAMPLE 24

This example shows the use of Ba and Ca as primary dopants for aluminum nitride composite ceramic growth into AlN and Al$_2$O$_3$ filler. However, this example is not limited to demonstrating the use of Ba and Ca as primary dopants. It also illustrates other significant aspects of aluminum nitride composite growth.

Aluminum alloys prepared from super purity Al to which high purity Ca or Ba were added were placed in the bottom of Al$_2$O$_3$ crucibles. AlN (H. C. Starck, grade A) or Al$_2$O$_3$ (Norton 38 Alundum tabular) filler was added on top of the alloy. The crucibles were placed in a furnace. The furnace temperature was ramped up to 1100° C. over two hours, held at 1100° C. for about 16 hours, and then ramped back down to room temperature, all under flowing N$_2$. After growth of the aluminum nitride composite, the weight gains were determined, the samples were sectioned, and the density and the porosity of the samples were measured.

Figure 29:
FIG. 29 is a micrograph of the composite of Example 24 comprising aluminum nitride growth from an Al-0.98% Ba parent metal into an $Al_2O_3$ filler.

The results of these experiments are summarized in Table 24. This table shows that the best results were obtained for the combination of 1.7% Ba into Al$_2$O$_3$ (note that this particular run was only held at 1100° C. for 14 hours). This combination had a weight gain of 28% due to nitridation of the aluminum alloy. The composite had a density of 3.31 gms/cc, and an apparent porosity of 0.1%. The composite grown from 0.98% Ba had a weight gain of 19.6%, and a porosity of 0.6%. These composites all had a relatively high metal matrix content. A typical microstructure for the composites grown using barium-containing alloys is shown in FIG. 29. FIG. 29 is a photomicrograph of a section of the composite grown from the Al-0.98% Ba alloy grown into Norton 38 Alundum tabular Al$_2$O$_3$.

Table 24 shows that growth of Ba-doped aluminum alloys into the AlN filler was not quite as successful. At 2.86% Ba, a weight gain of 26.7% was achieved, but the density was only 2.96 gms/cc, and the apparent porosity was 1.7%. At 0.98% Ba, the weight gain was 48.2%, but the apparent porosity was 27.8%, and the density was 2.18 gms/cc.

The best results for the Ca-doped alloys were obtained for growth into AlN filler. At 2.06% Ca, a weight gain of 52.5% was obtained, but the density was only 2.37 gms/cc, and the apparent porosity was 20.8%.

evacuable furnace. The furnace was evacuated and back-filled at room temperature. The furnace temperature was then raised to 1000° C. at 150° C./hour, main-

TABLE 24

GROWTH EXPERIMENTS USING BINARY ALLOYS DOPED WITH LESS STABLE NITRIDE FORMERS

| MATERIAL NO. | FILLER | DOPANT (%) | TIME (h) | WT. GAIN (%) | DENSITY (g/cm$^3$) | APPARENT POROSITY (%) |
|---|---|---|---|---|---|---|
| 1L192-1 | Al$_2$O$_3$ | 2.86 Ba | 16 | 7.8 | 3.32 | 1.0 |
| 1L164-1 | | 1.70 Ba | 14 | 28.2 | 3.31 | 0.1 |
| 1L164-2 | | 1.70 Ba | 16 | | | |
| 11186-1 | | 0.98 Ba | 16 | 19.6 | 3.31 | 0.6 |
| 1L166-1 | | 0.50 Ba | 16 | 10.7 | 3.27 | 1.0 |
| 1L166-2 | | 0.50 Ba | 16 | 8.4 | 3.34 | 1.8 |
| 1L168-1 | | 0.24 Ba | 16 | 7.9 | 3.47 | 3.13 |
| 1L193-1 | AlN | 2.86 Ba | 16 | 26.7 | 2.96 | 1.7 |
| 1L198-1 | | 1.70 Ba | 16 | | | |
| 1L187-1 | | 0.98 Ba | 16 | 48.2 | 2.18 | 27.8 |
| 1L183-1 | | 0.50 Ba | 16 | 31.1 | 2.59 | 9.1 |
| 1L183-1 | | 0.24 Ba | 16 | 26.3 | 2.43 | 17.3 |
| 1L162-1 | Al$_2$O$_3$ | 2.06 Ca | 16 | | 2.94 | 10.0 |
| 1L162-2 | | 2.06 Ca | 16 | 7.4 | 3.13 | 5.2 |
| 1L171-1 | | 0.96 Ca | 16 | | 2.54 | 18.4 |
| 1L171-2 | | 0.96 Ca | 16 | | 2.61 | 11.1 |
| 1L170-1 | | 0.49 Ca | 16 | 5.2 | 3.09 | 4.7 |
| 1L170-2 | | 0.40 Ca | 48 | | 2.91 | 13.1 |
| 1L178-1 | | 0.25 Ca | 16 | 5.6 | | |
| 1L176-1 | AlN | 2.06 Ca | 16 | 52.5 | 2.37 | 20.8 |
| 1L173-1 | | 0.96 Ca | 16 | 50.8 | 2.40 | 18.5 |
| 1L174-1 | | 0.49 Ca | 16 | 49.3 | 2.23 | 28.1 |
| 1L179-1 | | 0.25 Ca | 16 | 45.9 | 2.15 | 26.8 |

EXAMPLE 25

This example shows that Li can be used as a primary dopant for the growth of aluminum nitride composite structures. However, this example is not limited to showing the use of Li as a primary dopant. It also illustrates other significant aspects of the present invention.

An aluminum alloy ingot with a composition of Al-2%Li-0.5%Si-8%Ni was placed in a loose bed of E1 Alundum (⅜ 90-grit, ⅓ 220 grit, ⅓ 500-grit) in a Grafoil ™ box. A 1.25" diameter, ½" high preform of 95% AlN (grade A-200, Advanced Refractory), 5% Si$_3$N$_4$ (Atlantic Equipment Engineers) was pressed without any binder at 5000 psi. The preform was placed above the ingot, and the ingot/preform pair were embedded in additional E1 Alundum. Ni powder was placed between the ingot and the preform as an initiator. The Grafoil ™ box was placed in an evacuable furnace. The furnace was evacuated and back-filled with N$_2$ at room temperature. A nitrogen gas flow rate of 2500 cc/min. was maintained throughout the run. The furnace temperature was increased to 900° C. at 150° C./hour, maintained at that temperature for 20 hours, and then lowered at a rate of 150° C./hour. This procedure produced a well-defined aluminum nitride composite, with growth throughout the preform, using Li as the primary dopant.

Li-doped aluminum will also grow into TiB$_2$ filler. A TiB$_2$ 1.5"×0.75"×0.375" preform was prepared using Darvan C sediment casting. Two ingots 1"×2"×0.5" were prepared and coupled to the preforms, with Ni powder used as an initiator between the ingot and the preform. The first ingot was an Al-2%Li alloy, weighed 41.99 gms, and had 0.38 gms of Ni powder on its surface as the initiator. The second ingot was a Al-2%Li1%Si alloy, weighed 42.65 gms, and used 0.31 gms of Ni powder. The coupled ingot/preform pairs were placed in B$_4$C bedding in a Grafoil ™ box, which in turn was placed in a 6" alumina boat. The boat was placed in an evacuable furnace. The furnace was evacuated and back-filled at room temperature. The furnace temperature was then raised to 1000° C. at 150° C./hour, maintained at 1000° C. for 5 hours, and then lowered at 150° C., in a 100% nitrogen atmosphere. A nitrogen flow rate of 1000 cc/min. was maintained throughout the run. Ceramic matrix growth was observed through the preform, and along its sides for both the Al-2%Li and Al-2%Li-1%Si ingots.

EXAMPLE 26

This example illustrates the use of microstructure modifiers in a parent metal aluminum alloy to improve the hardness and microstructure of the ceramic matrix composite. However, this example is not limited to demonstrating the effect of the use of microstructure modifiers. It also illustrates other aspects of the present invention.

Figure 14A:
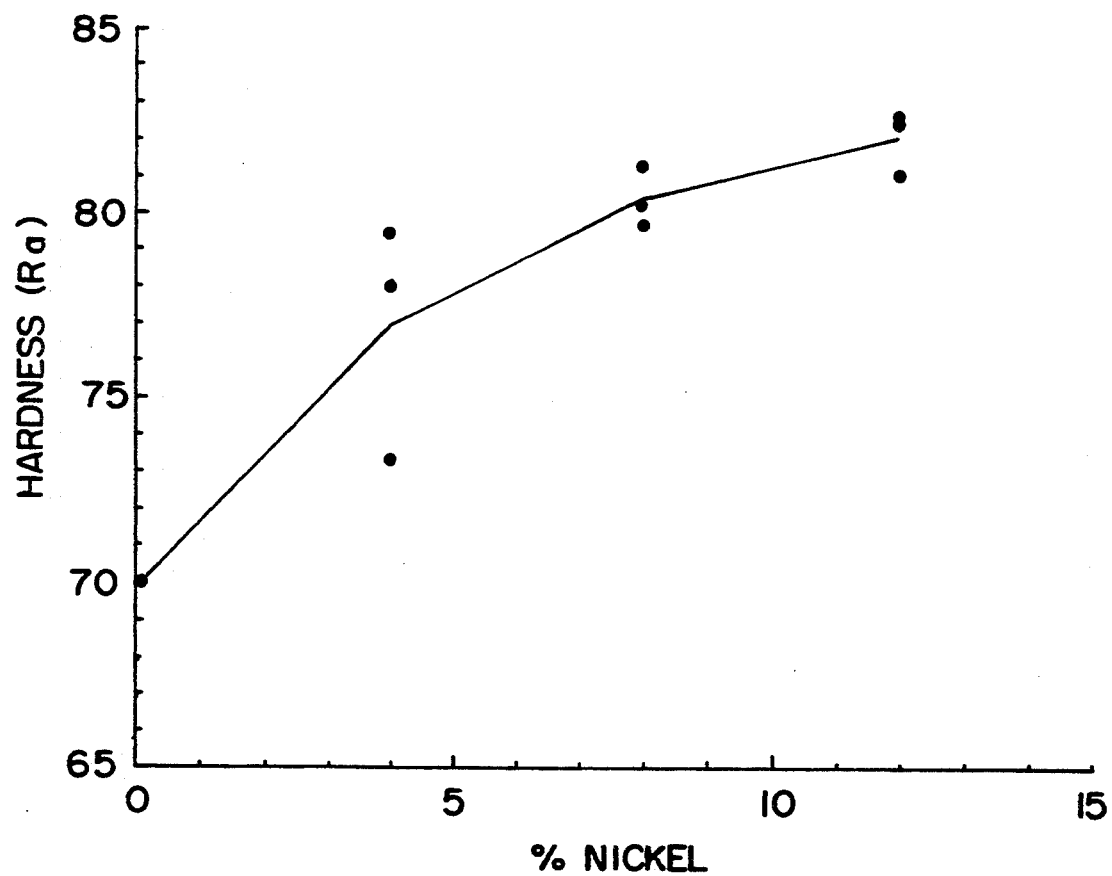
FIG. 14a shows the effect of increasing the transition metal content of the alloy on the hardness of the composite, using the growth method described in Example 5.
Figure 14C:
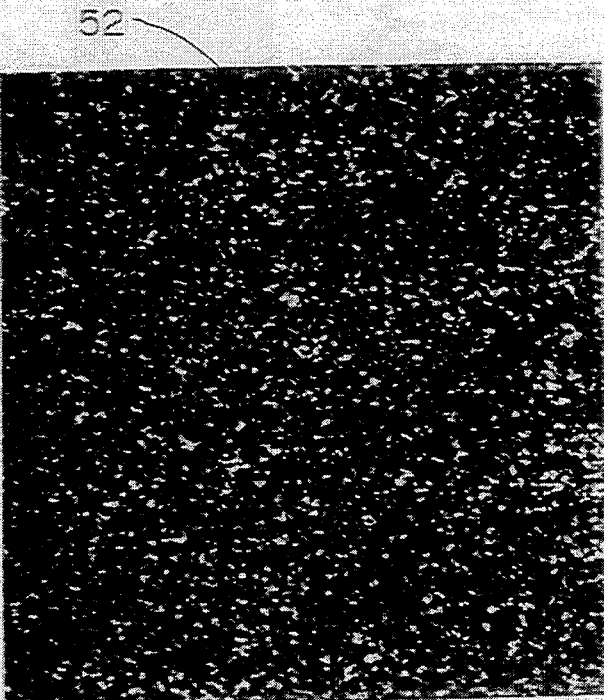
FIGS. 14b and 14c show the effect of increasing the transition metal content of the alloy on the microstructure of the composite, using the growth method described in Example 5.
Figure 14B:
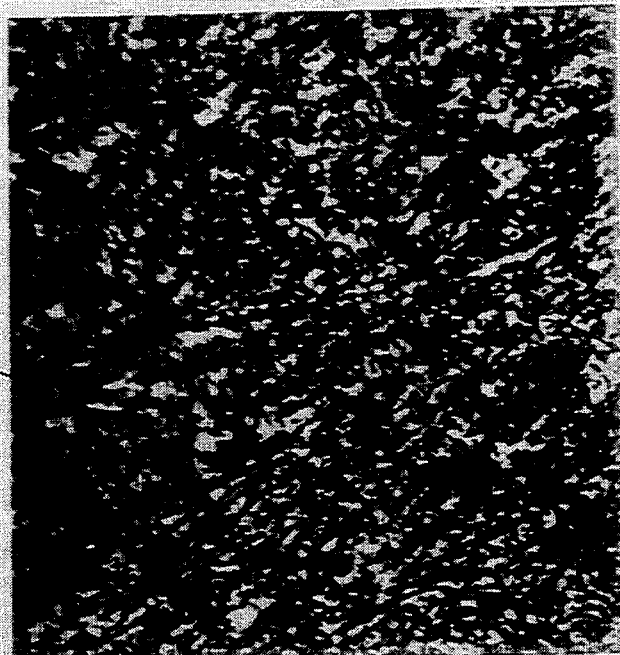
Figure 15:
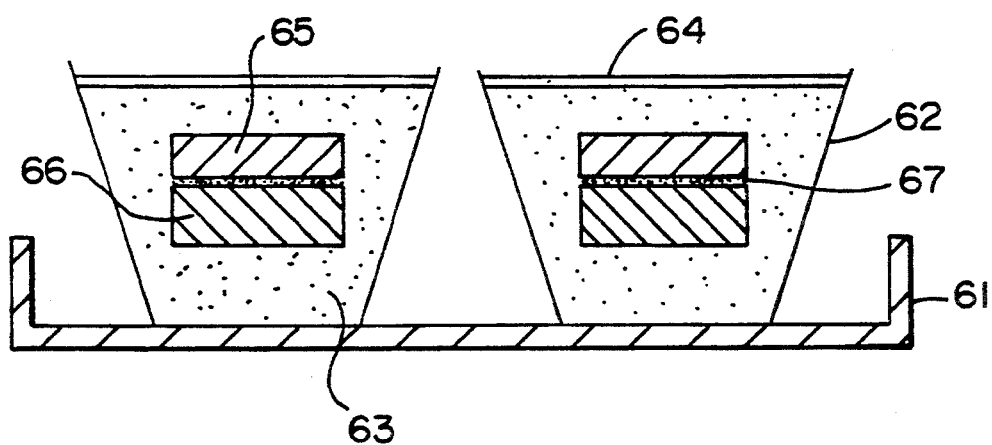
FIG. 15 is a sketch of the experimental lay-up, showing a preform/alloy pair buried in a $B_4C$ bedding, used to grow the composites in Example 26.
Figure 16A:
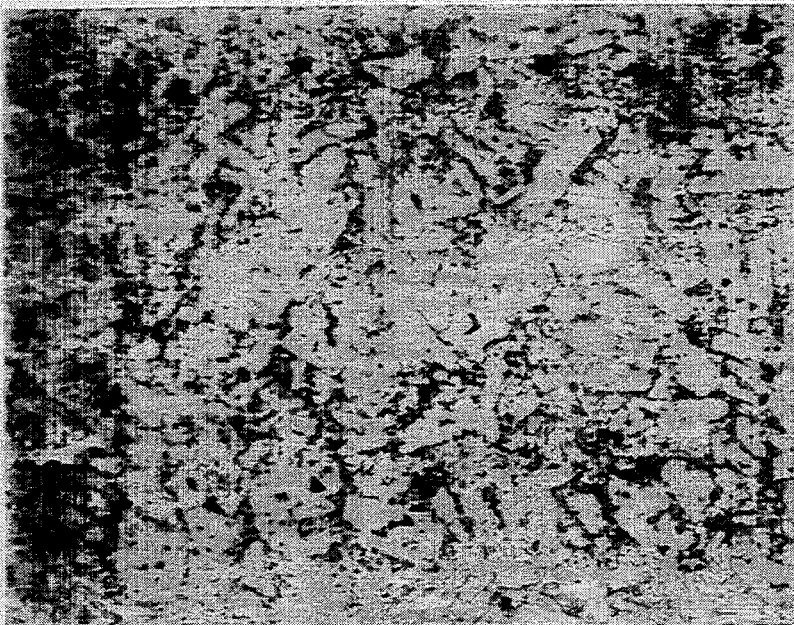
FIGS. 16a, 16b, 16c, 16d and 16e show the effect of increasing the silicon nitride content of the preform on the microstructure of the composites grown according to the method described in Example 31.
Figure 16B:
Figure 16C:
Figure 16D:
Figure 16E:

The effect of Ni additions to the hardness of aluminum nitride matrix-only growth is shown in FIG. 14a. FIG. 14a shows the Rockwell hardness of Al-3%Sr-1%Si-x%Ni as a function of the alloyes nickel content. FIGS. 14b and 14c show comparison of the microstructure of matrix-only AlN grown without the use of a transition metal modifier (alloy content Al-3%Sr-1%Si) to the microstructure of AlN grown with 8% Ni included in the alloy as a microstructure modifier. FIGS. 14b and 14c shows the AlN ceramic 51 and the aluminum alloy 52. FIG. 15 is a schematic of the lay-up used to grow these composites. It shows an Al$_2$O$_3$ tray 61, Al$_2$O$_3$ crucible 62, B$_4$C mesh bedding 63, a steel mesh cover 64, preforms 65, aluminum alloys 66, and Ni initiators 67.

The use of alloys containing Ni for the growth of aluminum nitride composites according to the methods of the present invention is demonstrated in Examples 29 through 30 of this specification.

EXAMPLE 27

This example illustrates the use of Fe as a microstructure modifier. However, this example is not limited to demonstrating the use of Fe as a microstructure modifier. It also illustrates other significant aspects of the present invention.

Two 2"×2"×0.5" ingots, composed of Al-3%Sr-1%Si-3%Fe and Al-3%Sr-1%Si-9%Fe, respectively were grown into 95% AlN (A-200, Advanced Refractory), 5% Si$_3$N$_4$ preforms. The preforms were prepared by slip casting, using ethanol-0.75% PVPK 30 (polyvinyl pryolene, 30 molecular weight, GAF Corp.). Fe was used as an initiator between the alloy and the preform.

The ingot/preform pairs were placed in B$_4$C beddings in alumina boats in an evacuable furnace. The furnace was evacuated and back-filled at room temperature. A nitrogen gas flow rate of 1000 cc/minute was maintained throughout the run. The furnace temperature was increased to 1050° C. at 150° C./min., maintained at 1050° C. for 15 hours, and then reduced at 150° C./hour. The aluminum nitride grew into the preforms as a ceramic matrix, with heavy overgrowth. The Rockwell hardness of both the 3% and 9% Fe composites was about 85 R$_A$, well above the hardness of composites grown without a microstructure modifier.

EXAMPLE 28

This example illustrates the fabrication of AlN preforms using slip casting. However, this example is not limited to illustrating the use of slip casting for preform fabrication. It also shows other significant aspects of the present invention.

Preforms were prepared by slip casting using isopropanol or ethanol as the solvent, and phosphate ester (Emphos 21-A, Witco Chemical Co.) or Mehaden Fish Oil (SpencerKellogg Co.) as the dispersant. The slip was poured into a rubber frame that rested on a plaster mold. The filler was AlN (A-200, Advanced Refractory). Dow XUS.30303 was used as the binder. These preforms exhibited adequate green strength, and smooth surfaces.

Low viscosity slips should produce the best preforms, by improving casting behavior, producing even surfaces, and allowing complex shapes to be cast. Table 28 summarizes the development of low viscosity slips.

Aluminum nitride composites were grown into these preforms using Al-2%Sr-0.5%Si-8%Ni alloys. The growth was planar and uniform.

TABLE 28

AlN Slips

| SOLVENT | BINDER | DISPERSANT | AMOUNT OF DISPERSANT | MINIMUM VISCOCITY (cps) |
|---|---|---|---|---|
| Ethanol | No | — | — | 6000 |
| Ethanol | Yes | — | — | 5500 |
| Ethanol | No | fish oil** | 0.14 ml | 5200 |
| Ethanol | No | phosphate ester*** | 0.34 ml | 2850 |
| Ethanol | Yes | phosphate ester | 1.2 ml | 1400 |
| Ethanol | Yes | phosphate ester | 1.2 ml | 1400© |
| Isopropanol | No | — | — | 2650 |
| Isopropanol | Yes | phosphate ester | 1.2 ml | 400 |

*.125 wt. % Dow XUX binder added to slip
**Mehaden Fish Oil - Spencer Kellog Co.
***Witco Co. Emphos 21-A
© order of addition changed when making slip
All slips were made with 44 vo. % solids
Solid is 98% A-200 AlN + 2% Starck LC12 Si2N4

EXAMPLE 29

This example illustrates methods for forming thin AlN preforms and separating the composite from its bedding after growth at elevated temperatures. However, this example is not limited to illustrating the formation of thin preforms or composite removal. It also demonstrates other aspects of the present invention.

The filler material was 92% AlN (A-200, Advanced Refractory), 8% Si$_3$N$_4$ (Kemanord P95) powder. As shown in Table 29, zero, two, or four per cent by weight aluminum powder (AESAR 325 mesh) was used as the binder, Ethanol was used as a solvent at 5, 7.5 or 10%, and Dow XUS CIMERAC® 40303 binder was used at concentrations of 0., 0.1875, and 0.375%. The powders were first mixed on a ball mill. The binder and ethanol solution were also separately mixed on the ball mill, if needed. The binder/ethanol mixtures were then mixed with the ceramic powders using a GEMCO mixer. The preforms measured 3"×3"×0.2". The preforms were all pressed to 5,000 psi, and dried at 55° C. overnight to remove the ethanol. The resulting green densities are shown in Table 29, together with comments on the quality of the preform.

Five preforms prepared according to the above procedures were used with Al-3%Sr-1.5%Si-8%Ni alloys to grow aluminum nitride composite structures. These preforms contained 4% Al/7.5% ethanol/0.375% Dow, 4% Al/5% ethanol/0.375% Dow, 4% Al/10% ethanol, 4% Al/7.5% ethanol/0.375% Dow, and 4% Al/10% ethanol, respectively. The alloy/ingot pairs were placed in a bedding of 70% Alcan unground aluminum powder and 30% Al$_2$O$_3$/NiAl$_2$O$_4$ prepared according to the method described in Example 35. Ni powder was placed between the preform and the ingot as a growth initiator. The materials were placed in an evacuable furnace. The furnace was evacuated and back-filled with N$_2$ at room temperature, then the furnace temperature was increased to 1000° C. at a rate of 150° C./hour under a 2500 cc/min. flow of N$_2$. The furnace was maintained at 1000° C. for 20 hours. The furnace was allowed to cool down to 800° C., and the aluminum nitride composite was removed from its bedding. This procedure of removing the composite at elevated temperatures is termed "hot de-bedding." Good quality aluminum nitride composites were obtained for all four specimens.

TABLE 29

THIN AlN* PREFORMS

| Batch | WT. % Al | Wt. % Ethanol | Wt. % Dow XUS | Green Density g/cc | Comments |
|---|---|---|---|---|---|
| 1 | 0 | 5 | 0 | 1.84 | Weak |
| 2 | 0 | 10 | 0.375 | 1.74 | Good |
| 3 | 4 | 10 | 0 | 1.73 | Weak |
| 4 | 0 | 5 | 0.375 | 1.77 | Good |

TABLE 29-continued

THIN AlN* PREFORMS

| Batch | WT. % Al | Wt. % Ethanol | Wt. % Dow XUS | Green Density g/cc | Comments |
|---|---|---|---|---|---|
| 5 | 4 | 5 | 0.375 | 1.76 | Weak |
| 6 | 4 | 5 | 0 | — | Ongoing |
| 7 | 2 | 5 | 0.1875 | — | Ongoing |
| 8 | 0 | 7.5 | 0.1875 | 1.84 | Good |
| 9 | 4 | 7.5 | 0.375 | — | Ongoing |

*92% A-200 AlN + 8% Kemanord P95 Si3N4
**Measured after drying
All preforms pressed at 5 kpsi

EXAMPLE 30

This example demonstrates the use of $Si_3N_4$ powder as a filler material. $Si_3N_4$ is a reactive filler, i.e., the aluminum alloy reacts with the $Si_3N_4$ as it infiltrates the filler, producing AlN:Si. It also shows the effect of $Si_3N_4$ particle size upon the hardness of the grown composite. This example is not limited to showing the use of $Si_3N_4$ as a filler material, however. This example also illustrates other significant aspects of the present invention. Preforms measuring 1" in diameter by approximately 0.5" thick were prepared by pressing dry-blended powder mixtures of $Si_3N_4$ and 1% Al (325 mesh, AESAR) at a pressure of 5000 psi, with the Al functioning as a binder. Parent metal ingots weighing 21–25 gms, with compositions of Al-3%SR-1%Si-8%Ni, were coupled to preforms weighing 12.5–12.8 gms, with Ni powder (0.12–0.31 gms, type 123, Inco) between the ingots and the preforms as an initiator. The preform/alloy pairs were completely buried in $B_4C$ powder(320 mesh, ESK) in an upward growth orientation, in $Al_2O_3$ crucibles. The tops of the crucibles were covered with steel mesh. These lay-ups were placed on an $Al_2O_3$ tray in an evacuable furnace, two at a time. The furnace was evacuated and then backfilled with nitrogen at room temperature. The furnace atmosphere was maintained as $N_2$, with a flow rate of 1200 cc/min. The furnace temperature was increased to 1050° C. at a rate of 200° C./hour. The furnace temperature was maintained at 1050° C. for 30 hours, and then it was reduced at a rate of 200° C./hour. The types, sources and mean particle sizes of the $Si_3N_4$ powders used are listed in Table 30. Table 30 also describes the morphology of the composites grown in these runs, and the Rockwell hardness $R_A$ of the composites grown. The $Si_3N_4$ powders were obtained from Atlantic Equipment Engineers (1–5 microns, lot 058-149), Starck LC-1 (lot S-0479A), Starck S (lot S-1014A), Starck LC12 (lot S-0479C), Elkem Regular (lot JMSN-50-3-8), Elkem High Purity (lot JMSN-50-22), Kemanord S85 (drum M-1955), Kemanord S95 (drum M-1956), Kemanord P-95 (drum M-1958), and Kemanord P95 (Drum M-1957), as listed in Table 30.

TABLE 30

| Si3N4 Type | Growth Morphology | Hardness |
|---|---|---|
| ABE Si501 | Nodula | 82.6 + 1.6 |
| Starck LC1 | Ash Tray-Like | 83.8 + 1.1 |
| Starck LC12 | Ash Tray-Like | 85.9 + 1.0 |
| Starck S1 | Excellent | 70.0 + 0.8 |
| Starck S | Excellent | 83.3 + 0.8 |
| Elkem Reg. | Excellent | 81.3 + 1.5 |
| Elkem Hi. Pur. | Excellent | 80.6 + 1.4 |
| Kemanord S85 1955 | Excellent | 81.0 + 1.6 |
| Kamanord S95 1956 | Excellent | 82.6 + 1.5 |
| Kemanord P95 Gr. | Excellent | 81.1 + 0.9 |

TABLE 30-continued

| Si3N4 Type | Growth Morphology | Hardness |
|---|---|---|
| 1958 Kamanord P95 1957 | Excellent | 83.8 + 0.7 |

EXAMPLE 31

This example shows that the hardness of the composite structure can be increased by adding $Si_3N_4$ powder to $TiB_2$ filler. This example is not limited to showing the use of $Si_3N_4$ additions to fillers. It also illustrates other significant aspects of the present invention.

Preforms measuring 1" in diameter by 0.5" thick were made by pressing to 5000 psi dry-blended powder mixtures of $TiB_2$ (Union Carbide HCT-30), 10% Fe (Atlantic Equipment Engineers, 325 mesh), and $Si_3N_4$ powder (Atlantic Equipment Engineers 1–5 Micron). The $Si_3N_4$ powder content was varied from 0 to 20%, with the $TiB_2$ making up the balance of the filler. Aluminum alloy ingots (Al-3%Sr-1.5%Si-12%Ni) measuring 1"×1"×0.5" were coupled to the preforms, with Ni powder (Atlantic Equipment Engineers, 325 Mesh) as the initiator between the ingot and the preform. The preform/ingot pairs were completely buried in 320 mesh $B_4C$ in an upward growth orientation, and were placed in an evacuable furnace. The furnace was evacuated, and back-filled with $N_2$. The furnace temperature was maintained at 1050° C. in an atmosphere of flowing nitrogen. After processing, the hardness of each of the resulting composites was measured. The hardness of the materials increased from about $R_A = 79.7$ for 0% $Si_3N_4$ about 84.7 for 20% $Si_3N_4$ additions.

EXAMPLE 32

This example shows how relatively large 4"×4"×1" preforms can be fabricated by adding binders to dry blended powders. However, this example is not limited to demonstrating preform fabrication. It also illustrates other significant aspects of aluminum nitride composite growth.

Fillers consisting of 95% AlN (Grade A-200, Advanced Refractory), 5% $Si_3N_4$ (Grade S, Starck) were mixed with additions of 1% Acrawax C (Lonza) and 1% Al powder (325 mesh, AESAR). Acrawax is ethylene-bis steramide. The original preform size was 4.25"×4.25"×1". The preform was pressed to 4000 psi. The parent metal alloy used for this experiment was Al-2%Sr-1.5%Si-8%Ni. The alloy and the preform were placed in a bed of 90% E1 Alundum mixed with 10% $TiO_2$ in a steel boat. Ni powder (Inco 123, 325 mesh) was placed between the alloy and the preform. Two preform/alloy combinations were placed in the boat. The boat was placed in an evacuable furnace. The furnace was evacuated and then back-filled with $N_2$ at room temperature. A flow rate of 4,000 cc/min of nitrogen was maintained throughout the runs. The furnace was heated to 300° C. at 200° C./hour, allowed to soak at 300° C. for 8 hours, then ramped up to 975° C. at 100° C./hour. The aluminum nitride oxidation reaction product was grown into the preform at 975° C. under 100% $N_2$ for 75 hours. The furnace temperature was reduced at 200° C./hour to 700° C., and the boat was removed from the furnace. The preform maintained its integrity, and excellent ceramic composites were obtained. The experiment was repeated using a binder consisting of 1% Al (325 mesh, AESAR), 1% Acrawax C (Lonza), and 1% 200-mesh Al-3%SR-1%Si-8%Ni powder. Again, the preform integrity was good, and excellent ceramic composites were obtained.

EXAMPLE 33

This example shows that Al powders can be used as preform binders without degrading the quality of the composite formed. However, this example is not limited to showing the use of aluminum binders. It also illustrates other aspects of the present invention.

Al powder was used as the only binder with 100% AlN (Grade A-200, Advanced Refractory) filler for 1" diameter, 0.5" thick preforms. A series of preforms were prepared, containing 0%, 1%, 2%, and 3% Al (AESAR, 325 mesh), respectively. The green density of the AlN preforms was 1.91 gms/cc for the 0% Al preform, 1.91 gms/cc for the 1% Al preform, 1.90 gms/cc for the 2% Al preform, and 1.86 gms/cc for the 3% Al preform.

The preforms were coupled to aluminum alloy ingots (Al-2%Sr-1.5%Si8%Ni) and completely buried in $B_4C$ (320 grit, ESK), with Ni powder (Inco 123) between the alloy and the preform, in alumina crucibles. Two crucibles were placed in a furnace at a time. The furnace was evacuated and back-filled with nitrogen at room temperature. The 100% nitrogen growth atmosphere was maintained with a gas flow rate of 1200 cc/minute. The furnace was heated to 1000° C. at 200° C./hour, held at 1000° C. for 30 hours, and then the temperature was reduced at 200° C./hour. All of the samples grew well, without any preform cracking. These composites, all grown with 0%–3% aluminum powder in the preform, had essentially the same Rockwell ($R_A$) hardness, 81.7–82.0. Thus the use of Al powders in the preforms resulted in excellent preform performance was obtained without degrading the quality of the composite grown into that preform.

EXAMPLE 34

This example shows that Ni and $Al/Si_3N_4$ powders can be used to initiate the growth of oxidation reaction products into aluminum nitride preforms. However, this example is not limited to showing the use of Ni and $Al/Si_3N_4$ powders as initiators. It also illustrates other significant aspects of the present invention.

An Al-3%Sr-1.25%Si-8%Ni ingot was coupled to a preform prepared from 95% AlN (Grade A-200, Advanced Refractory), 5% $Si_3N_4$ (Atlantic Equipment Engineers). The preform was pressed to 5000 psi, without the use of a binder. The initiators were placed between the alloy and the preform. Half the surface was covered with Ni powder (Inco 123), and half with a 1:2 mixture of aluminum powder (5052 aluminum, 80 and 200 mesh) and $Si_3N_4$ powder (Elkem high purity). The alloy/preform pairs were placed in a sediment cast bed of E1 alundum (⅓ 90, ⅓ 220, ⅓ 500 grit, with ethanol and ¼% Dow binder), in an evacuable furnace, in a Grafoil ™ box. This layup was buried in a loose bed of 90-grit E1 alundum. The furnace was evacuated and then backfilled with $N_2$ at room temperature. The furnace temperature was ramped up to 1000° C. at 150° C./hour, maintained at 1000° C. for 10 hours, and then ramped down at 150° C./hour. An $N_2$ flow rate of 2000 cc/min. was maintained throughout the run. The composite grew smoothly and uniformly. There was no evidence of any significant difference in growth or initiation rate between the two types of initiators.

EXAMPLE 35

This example shows that powder mixtures of $Al_2O_3$ and $NiAl_2O_4$ provide a suitable bedding for the growth of aluminum nitride composites. It also shows that the $Al_2O_3/NiAl_2O_4$ mixture can be used as a barrier for defining the shape of the aluminum nitride composite. However, this example is not limited to showing the use of powder mixtures as beddings and barriers for aluminum nitride growth. It also discloses other significant aspects of the present invention.

The $Al_2O_3/NiAl_2O_4$ mixture is prepared according to the following procedure. Seven pounds of 1" alumina spheres and five pounds of 2" alumina spheres are mixed with eight kilograms of Alcan C-75 regular grind alumina and 2 kilograms of Ni powder (Inco 123, 3–7 micron powder). The mixture is milled overnight for 15 to 20 hours. The powder is then poured through a large household sifter into alumina boats. The boats are then stacked into a furnace. The furnace vents are closed, and the furnace temperature is increased to 500° C. over five hours. The temperature is held at 500° C. for five hours, and then raised to 1300° C. over five hours. The temperature is held at 1300° C. for 10 hours, then the furnace is shut off. The material is then ground and screened through a 100 mesh sieve. This material is then mixed with Alcan C75 alumina in a ratio of 3:7 to produce the $Al_2O_3/NiAl_2O_4$ mixture.

A 2"×2"×⅜" preform was prepared by cold pressing 95% AlN (A-200, Advanced Refractory) mixed with 5% $Si_3N_4$ (Atlantic Equipment Engineers) at 5000 psi without any binder. The ingot composition was Al-2%Sr-1%Si-8%Ni. Ni powder initiator was placed between the ingot and the preform. The alloy surface was grit-blasted. The ingot/preform pair was placed in a bedding of the $Al_2O_3/NiAl_2O_4$ mixture, in a Grafoil ™-lined container. The container was placed in a furnace which was evacuated and backfilled with nitrogen at room temperature. An $N_2$ flow rate of 2500 cc/min was established, and the furnace temperature was raised to 1000° C. at a rate of 150° C./hour. The temperature was maintained at 1000° C. for 30 hours, and then lowered at 150° C./hour.

The bedding worked very well as a barrier, with little growth from the carcass, and excellent growth into the preform. A second set-up, run under identical conditions but using the $Al_2O_3/NiAl_2O_4$ mixture, mixed again with C75 Alcan alumina in a 3:7 ratio, also worked very well as a barrier and with excellent growth into the preform.

This example shows how aluminum nitride composite structures with well-defined shapes can be grown using loose oxide powder beddings. The use of loose oxide powders as beddings and barriers also allows for the release of the product after growth.

EXAMPLE 36

This example shows that Fe can be used as an initiator for aluminum nitride composite growth. However, this example is not limited to showing the use of Fe as an initiator. It also discloses other significant aspects of the present invention. Aluminum alloy ingots, 2"×2"×0.5" with compositions of Al-3%Sr-1%Si-4%Ni were grown into two preforms: (1) 100% AlN (H. Starck, Grade B) and (2) 95% AlN (A-200, Advanced Refractory), 5% $Si_3N_4$. The preforms were slip-cast, using hexane. Fe was added as an initiator between the ingot and the preform. The alloy surface was grit-blasted. The alloy/preform pairs were placed in an evacuable furnace in a $B_4C$ bedding. The furnace was evacuated and back-filled with $N_2$ at room temperature. The furnace temperature was raised to 1050° C. at a rate of 150° C./hour, maintained at 1050° C. for 15 hours, and lowered at 150° C./hour. A nitrogen gas flow of 2000 cc/min was maintained throughout the run. The aluminum nitride grew uniformly, producing a composite with a smooth, even growth front.

The experiment was essentially repeated using Fe as the microstructure modifier as well as the initiator. This run used 2"×2"×0.5" ingots with the composition Al-3%Sr-1%Si-6%Fe, and the furnace was maintained at 1050° C. for 40 hours. Two preforms were used. The first was 95% AlN (Advanced Refractory, Grade A-200) and 5% $Si_3N_4$. It was slip cast using ethanol and PVPK (30 molecular weight, GAF Corp.). The second was H. S. Starck "A" AlN. This preform was slip cast in hexane. Some growth was observed for both preforms.

EXAMPLE 37

This example illustrates the use of 380M aluminum powder as an initiator. However, this example is not limited to showing the use of aluminum powder as an initiator. It also shows other significant aspects of the present invention.

An Al-2%Sr-1.5%Si-8%Ni ingot was coupled with a 95% AlN (Grade A-200, Advanced Refractory), 5% $Si_3N_4$ (Atlantic Equipment Engineers) preform. Half the surface of the alloy was covered with 380M aluminum powder as the initiator, the other half was covered with Ni powder as the initiator. The ingot/preform pair was placed in a bed of E-1 alundum ($\frac{1}{3}$ 90 grit, $\frac{1}{3}$ 240 grit, $\frac{1}{3}$ 500 grit) in an evacuable furnace. The furnace was evacuated and back-filled with $N_2$ at room temperature. The furnace was flushed with $N_2$ at a flow rate of 2000 cc/min. throughout the run. The furnace temperature was raised to 1000° C. at 150° C./hour, maintained at 1000° C. for 10 hours, and lowered at 150° C./hour. There was no significant differences between the growths using Ni or Al powders.

EXAMPLE 38

This example illustrates the post-growth processing of aluminum nitride composite structures by further nitriding of the composite. However, this example is not limited to showing the post-growth nitridation of aluminum nitride composite structures. It also demonstrates other aspects of the present invention.

Aluminum nitride composites were grown into AlN filler. The composites were grown from ingots with the composition Al-2.5%-4%Sr-1.75-3%Si-8%Ni. Ni powder on the surface of the alloy was used as an initiator. The preforms were prepared from 95% AlN powder (Grade A-200, Advanced Refractory) with 5% $Si_3N_4$ (Kemanord S95C, 5 micron average particle size) and trichloroethane (10% by weight of the preform) was used as the solvent. After growth, the tiles were broken into section. One section from each tile was coated with an aerosol graphite (DAG), another was not. Both were placed in an evacuable furnace on a bedding of the $Al_2O_3/NiAl_2O_4$ mixture described in Example 35. The furnace temperature was raised to 1000° C. at 150° C./hour, and maintained at 1000° C. for 80 hours, and an $N^2$ flow rate of 2500 cc/min. Cross-sectional analysis of the tiles after processing revealed additional nitriding of the surface layers of the tiles.

EXAMPLE 39

This example illustrates the use of solvents in preform preparation. However, this example is not limited to the illustration of solvents in preform preparation. It also demonstrates other aspects of the present invention.

The preforms were prepared from 99% AlN powder (Grade A-200, Advanced Refractory) and 1% $Si_3N_4$ (Atlantic Equipment Engineers). Ethanol had previously been demonstrated to be an effective solvent for the preparation of AlN preforms. These runs investigated whether methylene chloride or trichloroethane could also serve as solvents. The preforms were prepared with 10% methylene chloride or trichloroethane solvent. The powders were mixed by ball milling for one hour. The wet preforms were pressed at 2,500 psi, and dried at 90° C. Al-2.5%Sr-1.75%Si-8%Ni ingots were coupled to the preforms with Ni powder as an initiator between the ingot and the preform, and placed on a bedding of the $Al_2O_3/NiAl_2O_4$ powder mixture described in Example 35. The preforms were fired in 2500 cc/min. of flowing $N_2$ for 10 hours, then were removed from their bedding at 800° C. Good aluminum nitride composite growth was obtained for preforms prepared using either methylene chloride or trichloroethane as the solvent.

EXAMPLE 40

This example demonstrates that increasing the silicon content of an Al-2%Sr-x%Si-8%Ni alloy, and increasing the $Si_3N_4$ content of an AlN preform both increase the hardness of the aluminum nitride composite structure. However, this example is not limited to demonstrating the effects of Si and $Si_3N_4$ on the quality of the composite grown. It also demonstrates other aspects of the present invention.

Preforms measuring 1" in diameter and 0.5" thick were prepared by pressing dry-blended powders of AlN (Grade A-200, Advanced Refractory) and 0%, 1%, and 3% by weight $Si_3N_4$ (Starck, Grade LC12) at 5,000 psi. Alloy ingots with Al-2%Sr-x%Si-8%Ni were prepared with x=0.0%, 0.5%, 1.0%, 1.5%, 2.0%, 2.5%, and 3.0%. The alloys were coupled to the preforms using Ni powder (Inco 123) as the initiator. The preform/alloy pairs were completely buried in $B_4C$ (320 grit, ESK) bedding in alumina crucibles, and were brought to 1000° C. for 30 hours in $N_2$ at a flow rate of 1200 cc/min.

Figure 17:
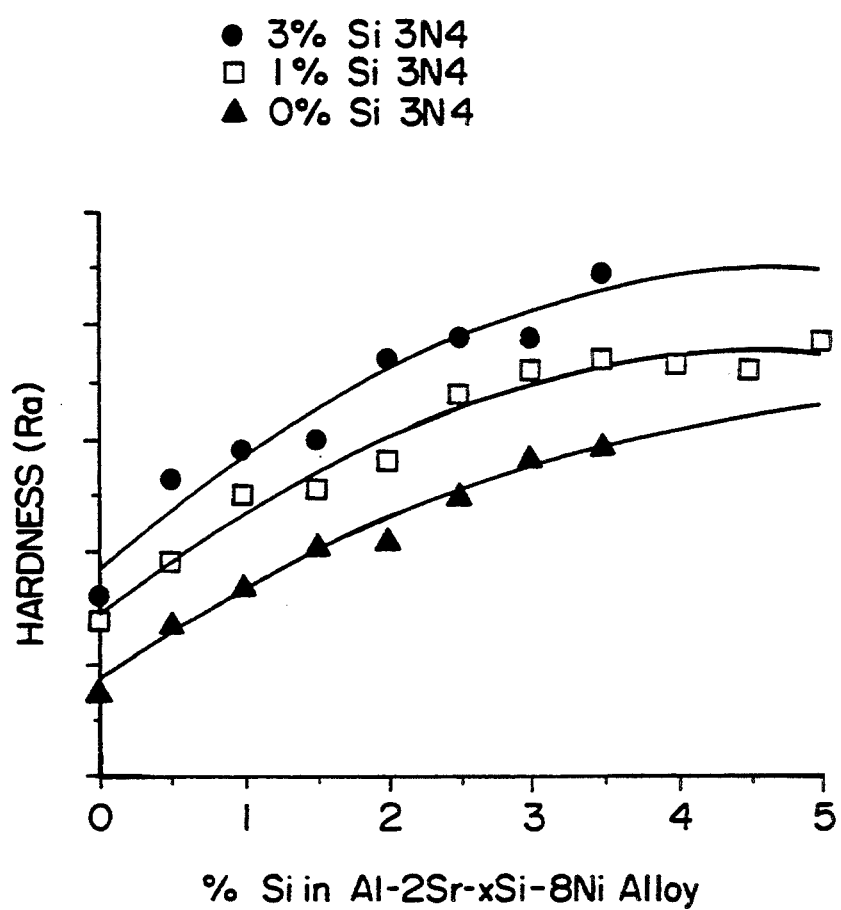
FIG. 17 shows the effect of increasing the Si content of the alloy and the $Si_3N_4$ content of the filler on the hardness of the composite grown according to the method described in Example 39.
Figure 18A:
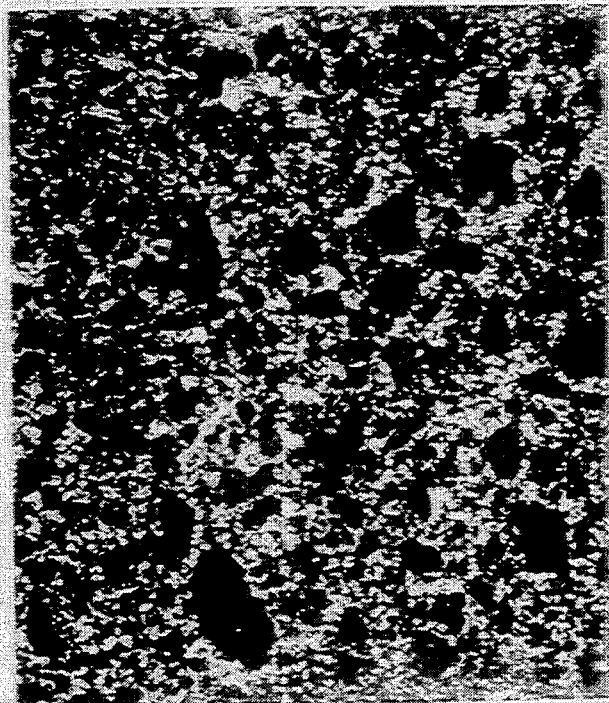
FIGS. 18a and 18b show the effect of increasing the Si content of the alloy on the microstructure of the composite grown according to the method described in Example 39.
Figure 18B:

After growth, the Rockwell hardness $R_A$ of the composites was measured. The results are shown in FIG. 17. This figure shows that increasing the Si content of the alloy, and increasing the $Si_3N_4$ of the preform results in composites with a greater hardness as measured on the Rockwell scale. FIGS. 18a and 18b are a comparison of the microstructure of a composite grown without Si in the alloy to a composite grown with 5% Si in the alloy. These micrographs show an aluminum nitride ceramic matrix 81, AlN filler 82, and $Si_3N_4$ particles 83 forming the aluminum nitride composite structure. Both composites were grown from preforms containing 1% $Si_3N_4$. These micrographs show that increasing the Si content of the alloy results in a finer microstructure for the composite.

EXAMPLE 40

This example shows that by applying protective coatings to fabrics such as Nicalon 12 HSW, aluminum nitride composites can be produced with high flexural strength. However, this example is not limited to demonstrating the production of fiber-reinforced composites. It also illustrates other significant aspects of the present invention.

Figure 19:
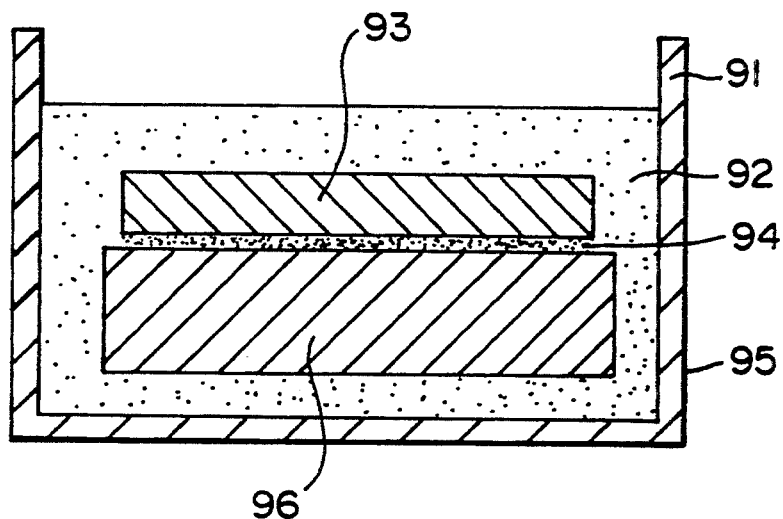
FIG. 19 is a sketch of the lay-up used for growth into Nicalon fabric, according to the method described in Example 40.
Figure 20:
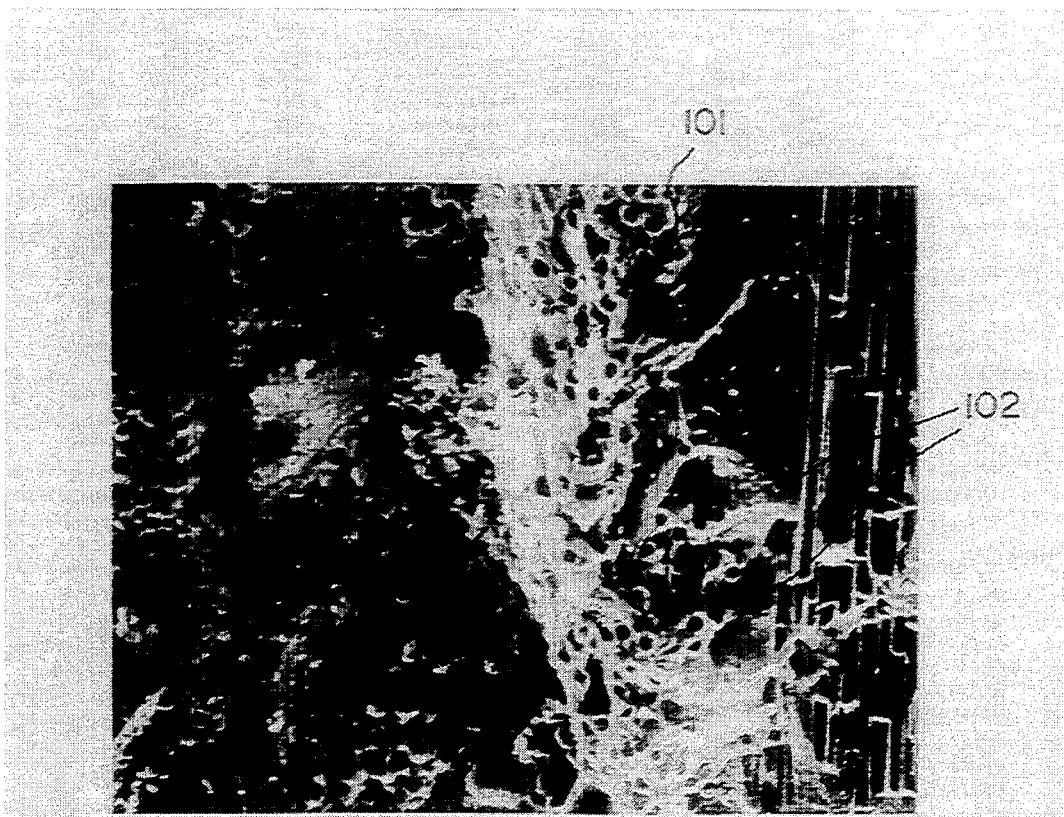
FIGS. 20, 21, 22 and 23 are micrographs of the fracture surface of Nicalon/AlN composites grown according to the method of Example 40.
Figure 21:
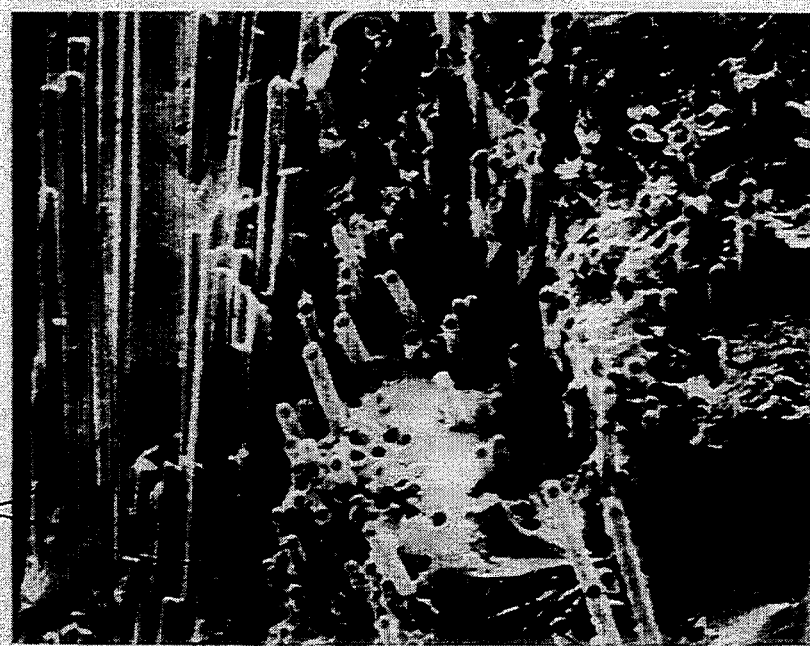
Figure 22:
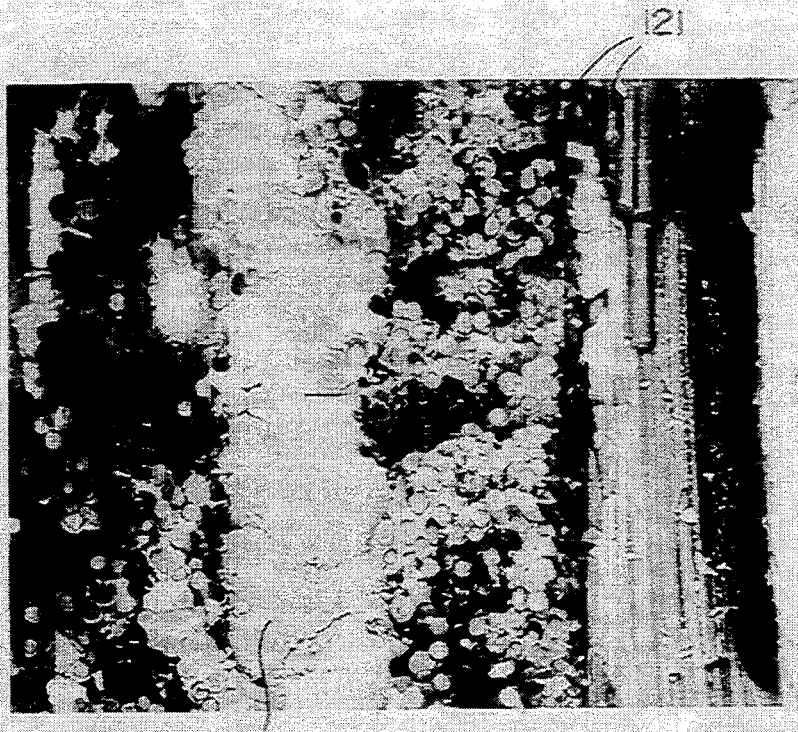
Figure 23:
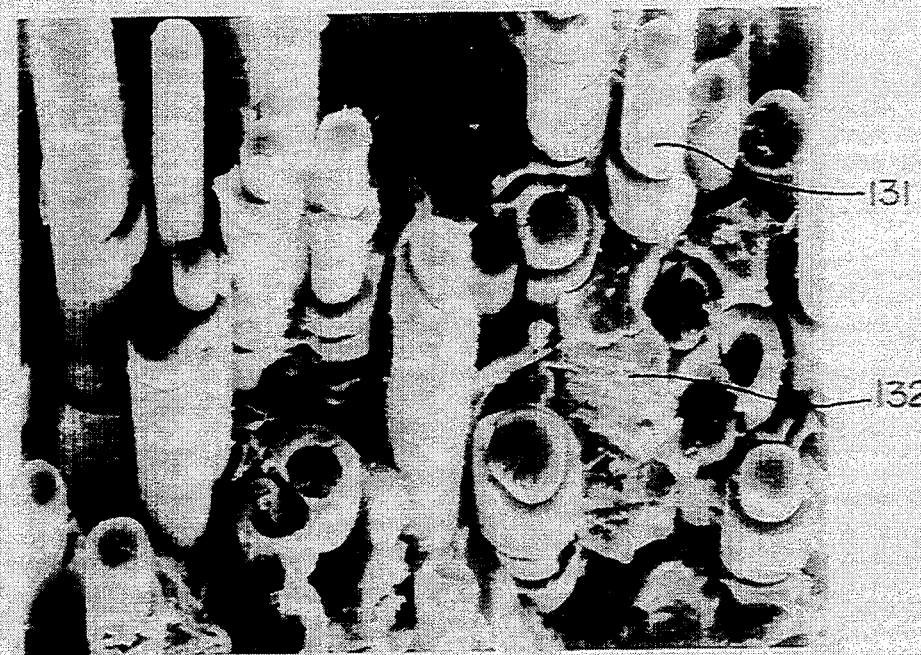
Figure 24A:
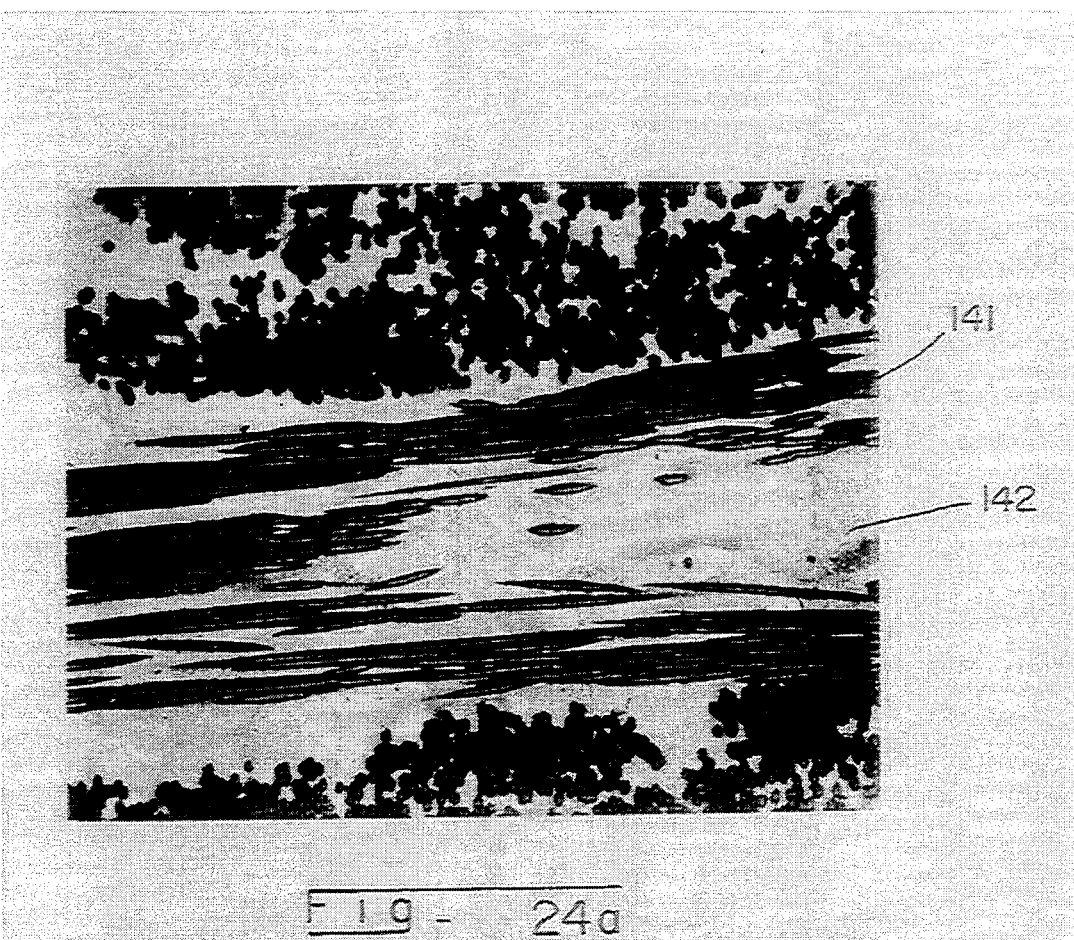
FIGS. 24a and 24b show the microstructure of a Nicalon/AlN composite grown according to the method of Example 40.
Figure 24B:
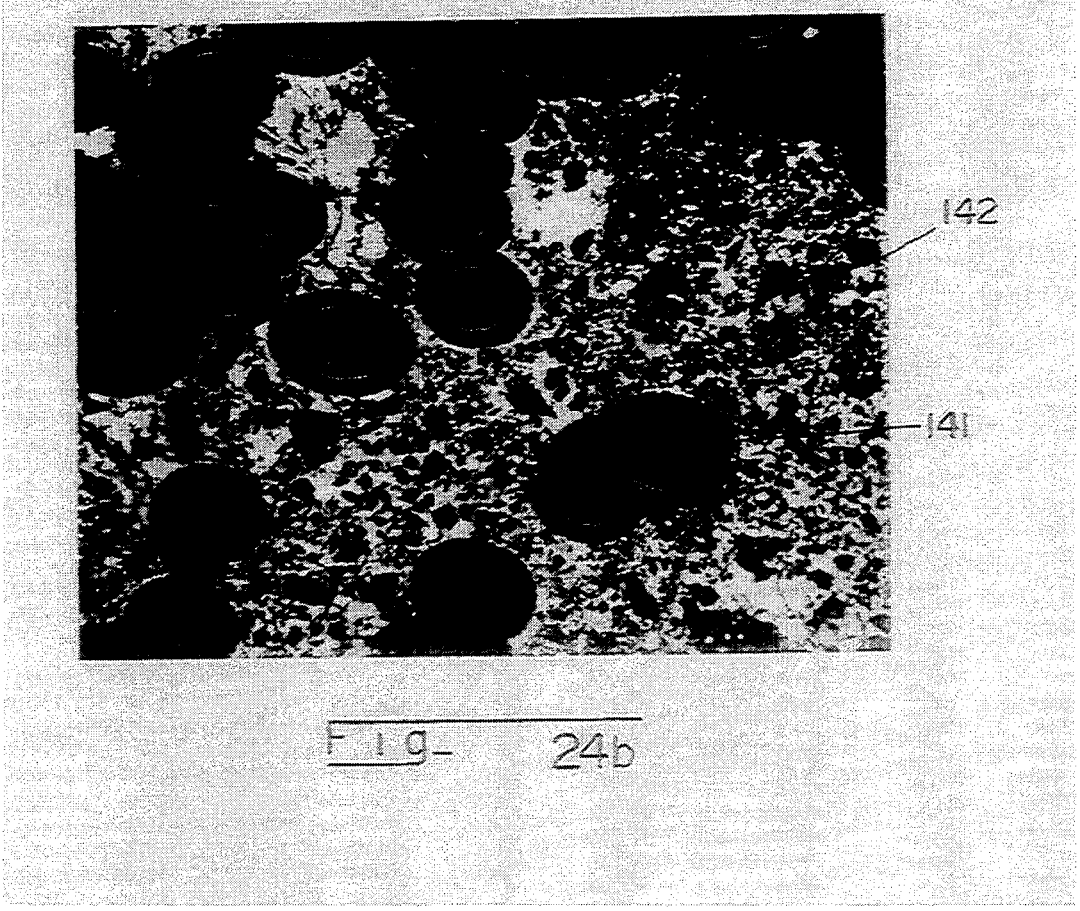

The first step in this process is to use chemical vapor deposition to apply a protective coating to the Nicalon fabric. Several different coatings were used, including a 0.3-micron BN/2-micron SiC/0.3-micron BN coating, and coatings using $TiB_2$ in combination with BN and SiC. The preforms were made by stacking eight layers of Nicalon fiber on top of each other, with each layer rotated by 90° with respect to the previous layer. The preforms were placed on top of the aluminum ingots with a layer of powdered Mg used as the initiator. FIG. 19 is a schematic of the lay-up used for the growth of aluminum nitride into Nicalon fabric, showing a graphite boat 91, SiC bedding 92, the layered Nicalon preform 93, Mg powder initiator 94, the aluminum alloy parent metal 95, and barrier layers 96. The aluminum alloys used included Al-3%Sr and Al-3%Li-3%Mg-12%Si. The alloy/preform pairs were placed in beds of SiC with either wollastonite ($CaSiO_3$) or the $Al_2O_3$/$NiAl_2O_4$ mixture described in Example 14 as a barrier. The materials were fired at 800° C. for 87 hours, then removed from their bedding at an elevated temperature. FIGS. 20–23 are micrographs of fracture surfaces of Nicalon/AlN composite structures grown from Al-3%Sr alloys at 850° C. FIG. 20 shows Nicalon fibers 101, and the ceramic matrix 102. FIG. 21 shows Nicalon fibers 111 and the ceramic matrix 112. FIG. 22 shows Nicalon fibers 121 and ceramic matrix 122. FIG. 23 shows the Nicalon fibers 131 and the ceramic matrix 132. FIG. 24a and 24b are micrographs illustrating the microstructure of a Nicalon/AlN composites grown from an Al-3%Sr alloy at 800° C., showing the Nicalon fibers 141 and the ceramic structure 142. The Nicalon fiber was coated with a BN/SiC/BN protective coating.

The highest flexural strength was obtained for the fibers with the coating of 0.3 microns of BN, 2 microns of SiC, and then another 0.3 microns of BN. However, improved flexural strength was also obtained by applying BN/Si C/Ti $B_2$ and BN/Ti $B_2$ coatings.

EXAMPLE 41

This example demonstrates that Ni, NiAl, NiCrAl, Mg, 380M powder, $Si_3N_4$, Zr, 325 mesh Al, Cr, and Fe. However, this example is not limited to showing that these elements and compounds can be used as initiators for aluminum nitride composite growth. It also demonstrates other aspects of the present invention.

Aluminum nitride composites were grown into 98% AlN (Advanced Refractory, Grade A-200), 2% $Si_3N_4$ (Starck LC12) preforms using Ni, NiAl, NiCrAl, Mg, 380M powder, $Si_3N_4$, Zr, 325 mesh Al, Cr, and Fe as initiators.

Four alloy compositions were used in these runs: Al-2%Sr-1%Si-8%Ni; Al-2%Sr-1.25%Si-8%Ni; Al-2%Sr-1.5%i/8%Ni; and Al-2%Sr-1.25%Si-6%Co. There were no distinguishable differences in the morphology of the composites grown for the latter three alloy compositions. However, the first alloy composition resulted in a metal-rich matrix.

The hardness of composites grown with SiC(black) 60 grit, Ni/SiC(black) 60 grit mixture, Al 5052/SiC(black) 60 grit mixture, 380M Aluminum/SiC(black) 60 grit mixture, SiC(green) 60 grit, $Si_3N_4$ (Starck LC12), Zr (50 mesh)/SiC(black) 60 grit, E38 60 grit, Mg (325 mesh)/SiC(black) 60 grit, E1 90 grit, Ni/SiC(black) 60 grit, and 380M aluminum ranged from $R_A = 84.7$ to 86.1.

EXAMPLE 42

This example shows the structure of an aluminum nitride composite grown into 95%AlN-5%$Si_3N_4$ filler. However, this example is not limited to the analysis of the structure of this composite. It also illustrates other aspects of the present invention.

Figure 25:
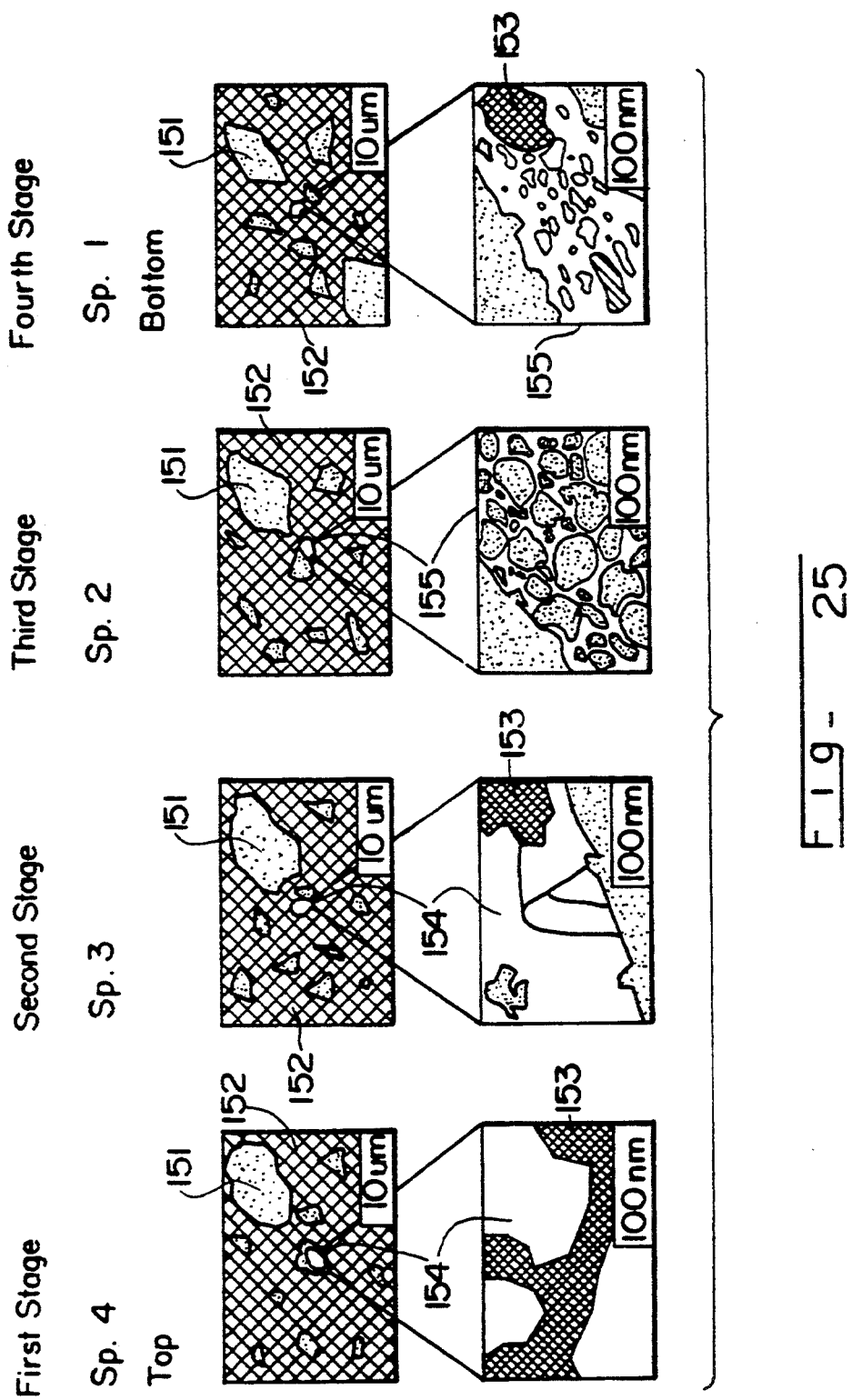
FIG. 25 shows the structure of specimens obtained from different parts of the composite, as described in Example 42.

An ingot with a composition of Al-3%Sr-1.25%Si-8%Ni was grown into the 95%AlN-5%$Si_3N_4$ filler at a temperature of 1000° C. for 50 hours in a nitrogen atmosphere. Specimens cut from four positions in the composite (ranging from the top, where the growth was initiated, to the bottom of the composite) were analyzed by optical microscopy, transmission electron microscopy, and x-ray diffraction. FIG. 26 is a comparison of the position and intensity of lines in the x-ray diffraction spectrum to standard spectra for AlN, Al, $Si_3N_4$, $Si_3N_4$ (beta), Si, $AlNi_3$, and $Al_2Si_2Sr$. FIG. 25 is a sketch summarizing the results of the analyses, showing a complex microstructure with 10 micron to 100 nm feature sizes. FIG. 25 shows the configuration of a typical aluminum nitride composite, including the AlN filler 151, regions of AlN/AlN fine grained composite 152, aluminum nitride ceramic matrix 153, $Si_3N_4$ particles 154, and aluminum alloy 155.

EXAMPLE 43

This example shows how the addition of alumina foam or SiC grit at the interface between the preform and the alloy facilitates the release of the composite after growth. However, this example is not limited to demonstrating the use of alumina foam or SiC grit as product releasers. It also illustrates other aspects of the present invention.

For the demonstration of the use of $Al_2O_3$ as a product releaser, the preform was prepared by pressing powdered mixtures of 95% AlN (Grade A-200, Advanced Refractory) and 5% $Si_3N_4$ (Siconide 595). The preform was coupled to an aluminum alloy ingot with the composition Al-2%Sr-1%Si-8%Ni. Ni powder was added at the interface between the alloy and the preform as an initiator. A layer of coarse $Al_2O_3$ foam was added to the interface as a product releaser. The coupled alloy/preform pair was placed in a bedding of 70% unground C75 alumina and 30% the $Al_2O_3$/$NiAl_2O_4$ mixture of example 14, in an evacuable furnace. The furnace temperature was raised to 1000° C. at a rate of 150° C./hour, held at 1000° C. for 35 hours, and then lowered at 150° C./hour, in a nitrogen gas flow rate of 2500 cc/min. The aluminum nitride ceramic grew into the 95%AlN/5%$Si_3N_4$ preform with good morphology. The composite was readily separated from the parent metal carcass at room temperature.

The demonstration of the use of SiC grit as a product releaser was carried out under the same conditions as the demonstration for the use of $Al_2O_3$ foam as a product releaser, with just three differences. The alloy used had a composition of Al-2%Sr-1.5%Si-8%Ni; a mixture of 95% SiC grit and 5% Mg powder was pressed into the surface of the preform as the product releaser; and a thin layer of preform material was added between the alloy and the SiC/Mg layer. The SiC grit was a mixture of 60 and 90 grit SiC, and the Mg was a mixture of 65 and 30 mesh. The aluminum nitride ceramic grew well into the preform, and the product separated readily from the parent metal carcass at room temperature.

EXAMPLE 44

This example demonstrates the use of Al and Mg powders as additions to preforms. However, this example is not limited to the demonstration of the use of metallic powders in preforms. This example also reveals other aspects of the present invention.

This example demonstrates the use of metallic additions to cold-pressed preforms of various compositions. The results of these demonstrations are summarized in Table 44. All the composites were grown using the same aluminum alloy (Al-3%Sr-1.25%Si-8%Ni), for the same temperature cycle (increase temperature to 900° C. at 150° C., remain at 900° C. for 5 hours, increase temperature to 1000° C., remain at 1000° C. for 50 hours, and then reduce the temperature at 150° C./hour), under the same ambient (2500 or more cc/min.). The bedding used throughout was a mixture of 90, 220, and 500 grit E-1 alundum. The beddings were enclosed in Grafoil TM boxes placed in steel boxes buried in 90-grit E-1 alundum. The major constituent of the preforms was AlN (Advanced Refractory, Grade A-200) with the remainder of the constituents as listed in Table 44.

Good growth was achieved for several combinations of preforms using Mg and/or Al additions to the preforms, as shown in Table 44.

TABLE 44

| Preforms With Metallic Additions | | | | | |
|---|---|---|---|---|---|
| ID | Filler Addition | Mg % | Al % | Green Density | Comments |
| 17971 | 5% AEE Si3N4 | 1.5 | — | 58% | good growth |
| 17972 | 5% AEE Si3N4 | 1.5 | — | 58% | good growth |
| 17973 | 5% AEE Si3N4 | — | 1.5 | 58% | e. growth |
| 17974 | 5% AEE Si3N4 | — | 1.5 | 58% | e. growth |
| 17991 | 1% LC12 Si3N4 | 1 | — | 58% | c. overgrowth |
| 17992 | 1% LC12 Si3N4 | 1 | — | 58% | c. overgrowth |
| 17993 | 1% LC12 Si3N4 | — | 1 | 58% | c. voids |
| 17994 | 1% LC12 Si3N4 | — | 1 | 58% | c. voids |
| 18011 | 1% LC12 Si3N4 | (1% Wax) | | 58% | u. growth |
| 18012 | 1% LC12 Si3N4 | (1% Wax) | | 58% | u. growth |
| 18013 | 5% AEE Si3N4 | 1 | | 58% | good growth |
| 18014 | 5% AEE Si3N4 | 1 | | 58% | good growth |
| 18031 | 1% Sic. Si3N4 | — | 2 | — | good growth |
| 18032 | 1% Sic. Si3N4 | — | 2 | — | good growth |
| 18033 | 1% Sic. Si3N4 | (1% wax) | | — | l. growth |
| 18034 | 1% Sic. Si3N4 | (1% wax) | | — | l. growth |
| 18051 | 5% AEE Si3N4 | 3 | 5 | — | l. growth |
| 18052 | 5% AEE Si3N4 | 1 | 3 | — | good growth |
| 18053 | 5% AEE Si3N4 | — | 2 | — | e. growth |
| 18054 | 5% AEE Si3N4 | — | 4 | — | e. growth |
| 18071 | 1% LC10 Si3N4 | 0.5 | 0.5 | 58% | c. overgrowth |
| 18072 | 1% LC10 Si3N4 | 0.5 | 0.5 | 58% | c. overgrowth |
| 18073 | 1% LC10 Si3N4 | 0.5 | — | 58% | c. overgrowth |
| 18074 | 1% LC10 Si3N4 | 0.5 | — | 58% | good growth |

Notes:
c.: centered
e.: edge
l.: layered
u.: uneven
AEE: Atlantic Equipment Engineers
Sic.: Siconide 595
LC10: Starck LC10
LC12: Starck LC12

EXAMPLE 45

This example demonstrates the growth of aluminum nitride ceramic matrix composites into Al$_2$O$_3$/AlN fillers. However, this example is not limited to the demonstration of growth into alumina/aluminum nitride fillers. This example also illustrates other aspects of the present invention.

Figure 27:
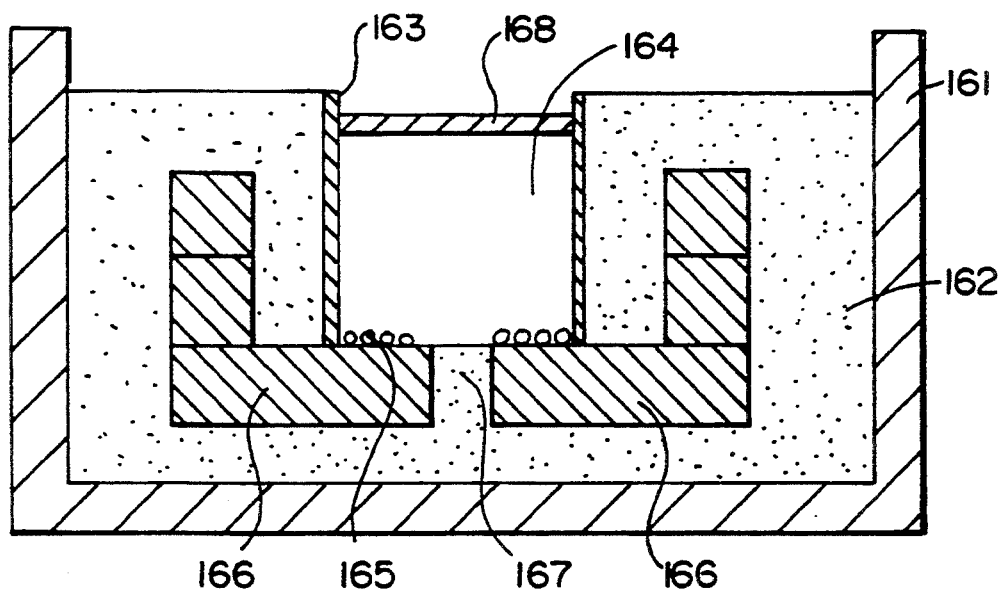
FIG. 27 is a sketch of an experimental lay-up for the aluminum nitride composite growth of Example 45.

The lay-up used for this demonstration is shown in FIG. 27. FIG. 27 shows steel boat 161, loose B$_4$C bedding 162, Grafoil TM box 163, loose alumina/AlN/Si$_3$N$_4$ filler 164, Ni initiator 165, aluminum ingots 166, a ¼" gap between the ingots 167, and a Fiberfrax cover 168. The two 3½"×1¾"×1" aluminum ingots 166 with the composition Al-3%Sr-1%Si-8%Ni were placed ¼" apart in steel boat 161 in 325-mesh B$_4$C bedding 162. The 85% Al$_2$O$_3$ (220 grit E-38 Alundum)/10% AlN (Advanced Refractory Grade A-200)/5% Si$_3$N$_4$ (Atlantic Equipment Engineers) filler 164 was placed in the 3"×3"×4" Grafoil½ box 3 above the ingots. Ni powder 165 (Inco 325 mesh) on the surface of the ingots was used as the initiator. The steel boat was placed in an evacuable furnace. The furnace was evacuated and back-filled with N$_2$ gas at room temperature. The furnace temperature was then increased at 150° C./hour to 900° C., held at 900° C. for 5 hours, increased to 1000° C. at 150° C./hour, held at 1000° C. for 50 hours, and then lowered to 32° C. at 150° C./hour. A nitrogen gas flow of 2500 cc/minute was maintained throughout the run.

Figure 28A:
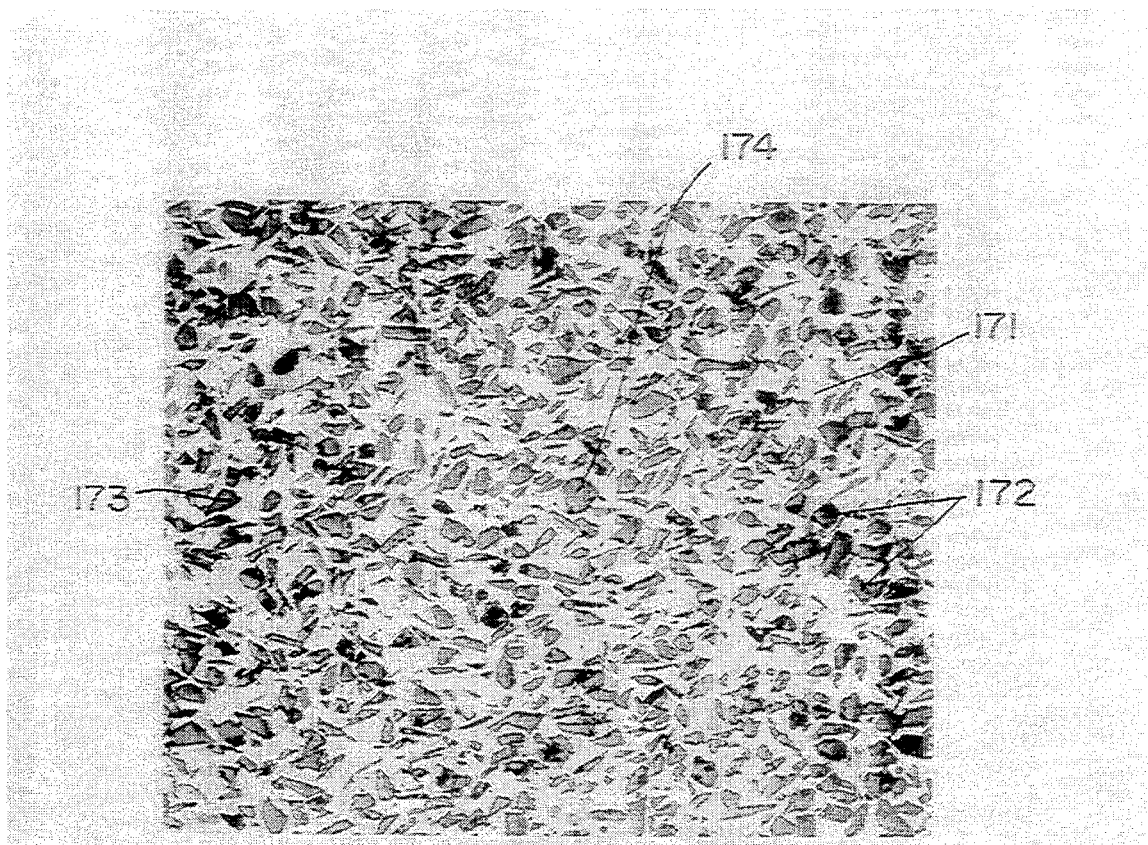
FIGS. 28a and 28b are micrographs of the structure of the aluminum nitride composites grown according to Example 45.
Figure 28B:
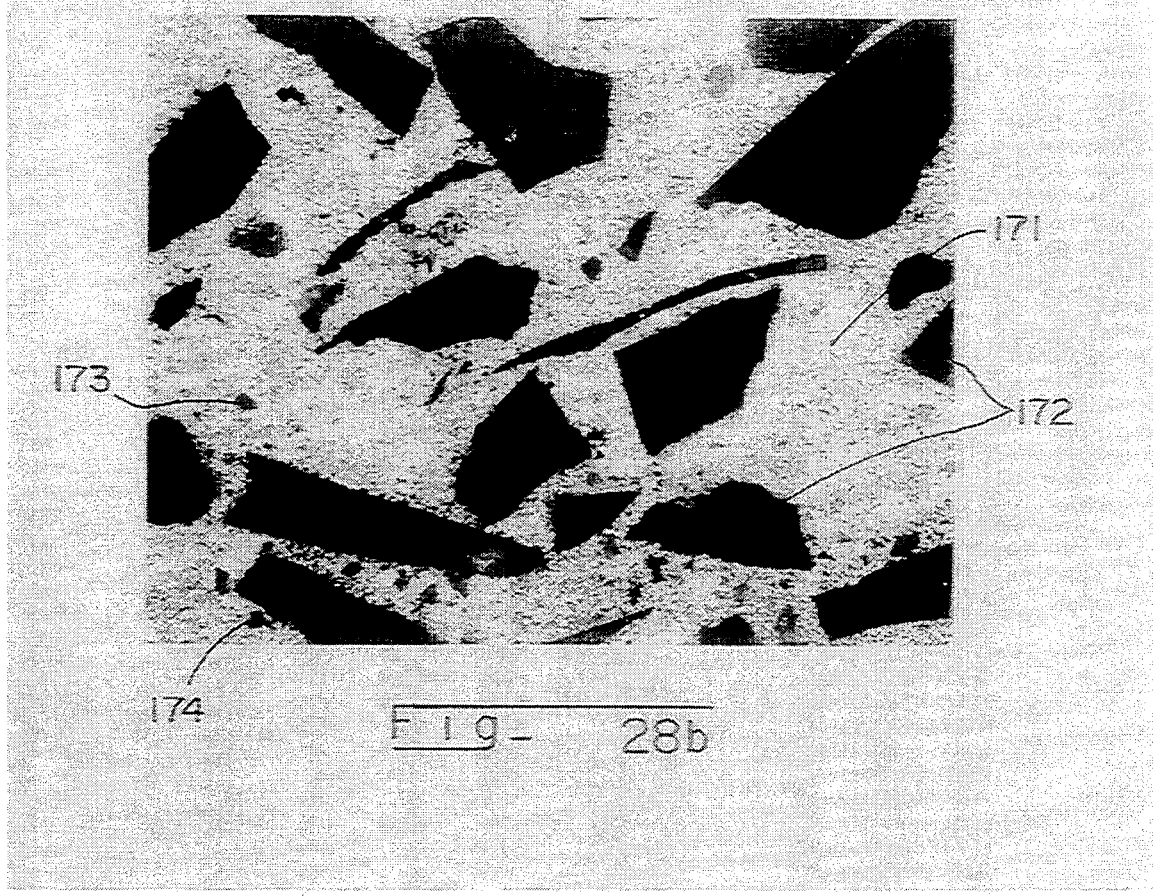

This run produced ¾" of ceramic matrix growth. The microstructure of the composite grown is shown in FIGS. 28a and 28b. FIGS. 28a and 28b show the aluminum nitride ceramic matrix 171, Al$_2$O$_3$ particles 172, AlN particles 173, and Si$_3$N$_4$ particles 174. The density of the composite grown was about 3.38 gms/cc, and its Rockwell hardness R$_A$ ranged from 72.4 to 79.2.

EXAMPLE 46

This example demonstrates the growth of aluminum nitride composite structures into B$_4$C fillers, and the use of post-growth processing to modify the properties of the material. However, this example is not limited to demonstrating growth into composite structures, or illustrating post-growth processing. This example also demonstrates other significant aspects of the present invention.

Two ⅛" bars of Al-5%g-3%Si were placed in a bedding of 100 grit B$_4$C, but with a ⅛" layer of 90 grit E-38 Alundum. The materials were placed in a retort in a furnace, with air circulation around the retort. The furnace temperature was increased to 1030° C. over 10 hours, maintained at 1030° C. for 36 hours, and then lowered over 5 hours to room temperature. Forming gas, at a flow rate of 200 cc/min., was maintained inside the retort. The temperature inside the retort was estimated to be about 1000° C. An aluminum nitride composite grew into the B$_4$C.

The aluminum nitride phase was found to be metal-rich. Its average Rockwell hardness R$_A$ was 66. A 4 mm×5 mm×25 mm sample from the composite was buried in a bedding of 90-grit E-38 alundum, and was heated in argon at 1500° C. for 24 hours, using an O$_2$ getter. The average Rockwell hardness R$_A$ of the heat-treated sample was 71.25. The sample was crushed and ground up in a Spex Mill. X-ray diffraction analysis of the ground-up powder showed that its major constituents include AlN, Al, B$_4$C, AlB$_{10}$, and B$_{12}$C$_2$Al.

What is claimed is:

1. A method for producing a self-supporting ceramic composite structure comprising (1) a ceramic matrix obtained by oxidation of an aluminum parent metal to form a polycrystalline material comprising (i) an aluminum nitride oxidation reaction product of said aluminum parent metal with a nitrogen-containing oxidant, and (ii) residual non-oxidized constituents of said aluminum parent metal; and (2) at least one filler embedded by said matrix, the method comprising the steps of:

(a) positioning said parent metal adjacent to a permeable mass of filler and orienting said parent metal and said filler relative to each other so that formation of said oxidation reaction product will occur in a direction towards and into said mass of filler;

(b) providing said parent metal with at least one primary dopant comprising at least one material selected from the group consisting of barium, strontium and gallium;

(c) heating said parent metal to a temperature above its melting point but below the melting point of its aluminum nitride oxidation reaction product to form a body of molten parent metal and reacting the molten parent metal with said nitrogen-containing oxidant at said temperature to form said aluminum nitride oxidation reaction product, and at said temperature maintaining at least a portion of said aluminum nitride oxidation reaction product in contact with and extending between said body of molten metal and said nitrogen-containing oxidant, to draw molten metal through the aluminum nitride oxidation reaction product towards the nitrogen-containing oxidant and towards and into the adjacent mass of filler so that fresh aluminum nitride oxidation reaction product continues to form within the mass of filler at an interface between the nitrogen-containing oxidant and previously formed aluminum nitride oxidation reaction product; and (d) continuing said reacting for a time sufficient to embed at least a portion of the filler within said polycrystalline material.

2. The method of claim 1 wherein said parent metal is also provided with at least one secondary dopant selected from the group consisting of silicon and germanium.

3. A method for producing a self-supporting ceramic composite comprising:

providing at least one filler material;

providing a first coating on said at least one filler material;

providing at least one additional coating in substantially continuous contact with said first coating on said filler material to form a multiply coated filler material comprising a plurality of layers of coatings terminating at an exterior coating;

positioning an aluminum parent metal adjacent to said multiply coated filler material and orienting said parent metal and said multiply coated filler relative to each other so that formation of an aluminum nitride oxidation reaction product will occur in a direction towards and into said filler;

heating said parent metal to a temperature above its melting point but below the melting point of its aluminum nitride oxidation reaction product to form a body of molten parent metal and reacting said body of molten parent metal with a nitrogen-containing oxidant at said temperature to form said aluminum nitride oxidation reaction product, and at said temperature maintaining at least a portion of said aluminum nitride oxidation reaction product in contact with and extending between said body of molten parent metal and said nitrogen-containing oxidant, to draw said molten parent metal through the aluminum nitride oxidation reaction product towards said nitrogen-containing oxidant and towards and into the adjacent multiply coated filler so that fresh aluminum nitride oxidation reaction product continues to form within said multiply coated filler at an interface between said nitrogen-containing oxidant and previously formed aluminum nitride oxidation reaction product; and continuing said reacting for a time sufficient to embed at least a portion of said multiply coated filler within said aluminum nitride oxidation reaction product, whereby said multiple coatings result in at least three zonal junctions and the zonal shear strength of one of the three zonal junctions is weak relative to the other zonal junctions and said exterior coating of said at least one additional coating being wettable by said parent metal and inhibiting degradation of said filler and said first coating.

4. The method of claim 3, wherein said first coating comprises boron nitride.

5. The method of claim 4, wherein said at least one additional coating comprises one additional coating comprising titanium diboride.

6. The method of claim 4, wherein said at least one additional coating comprises a coating of silicon carbide followed by said exterior coating selected from the group consisting of boron nitride and titanium diboride.

7. The method of claim 3, wherein at least one of said at least one filler material comprises a fiber.

8. The method of claim 7, wherein said at least one filler material comprises silicon carbide.

9. The method of claim 6, wherein a thickness of each of said boron nitride coatings is about 0.3 micron.

10. The method of claim 6, wherein a thickness of said silicon carbide coating is about 2 microns.

11. The method of claim 3, wherein said at least one filler material is provided as at least a portion of a permeable mass.

12. The method of claim 3, further comprising providing at least one dopant.

13. The method of claim 1, wherein said permeable mass comprises at least one preform.

14. The method of claim 12, wherein said at least one dopant is provided by at least one technique selected from the group consisting of (1) alloying said at least dopant with said parent metal, (2) applying said at least one dopant to at least a portion of a surface of said parent metal; and (3) admixing said at least one dopant in at least a portion of said permeable mass.

15. The method of claim 12, wherein said at least one dopant comprises at least one material selected from the group consisting of strontium, calcium, magnesium, cerium, lanthanum, gallium, barium and lithium.

16. The method of claim 15, wherein said at least one dopant further comprises at least one material selected from the group consisting of silicon, germanium, magnesium and boron.

17. The method of claim 1, wherein said at least one filler material comprises at least one material selected from the group consisting of oxides, carbides, borides and nitrides.

18. The method of claim 17, wherein said at least one filler material comprises at least one material selected from the group consisting of aluminum oxide, silicon carbide, silicon aluminum oxynitride, zirconium oxide, zirconium boride, titanium nitride, barium titinate and boron nitride, titanium diboride, aluminum nitride and silicon nitride.

19. The method of claim 1, wherein said temperature comprises a temperature selected from the group consisting of those temperatures between about 700° C. and about 1200° C.

* * * * *